Oct. 22, 1935.   H. C. ROBINSON ET AL   2,018,420
MERCHANDISE CONTROL SYSTEM
Filed Sept. 8, 1933   24 Sheets-Sheet 3

INVENTORS
HAROLD C. ROBINSON
LEITH JOHNSTON
ATTY.

Oct. 22, 1935.   H. C. ROBINSON ET AL   2,018,420
MERCHANDISE CONTROL SYSTEM
Filed Sept. 8, 1933    24 Sheets-Sheet 4
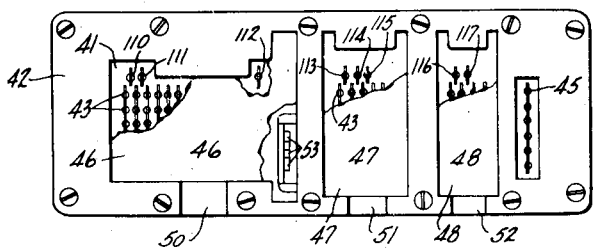
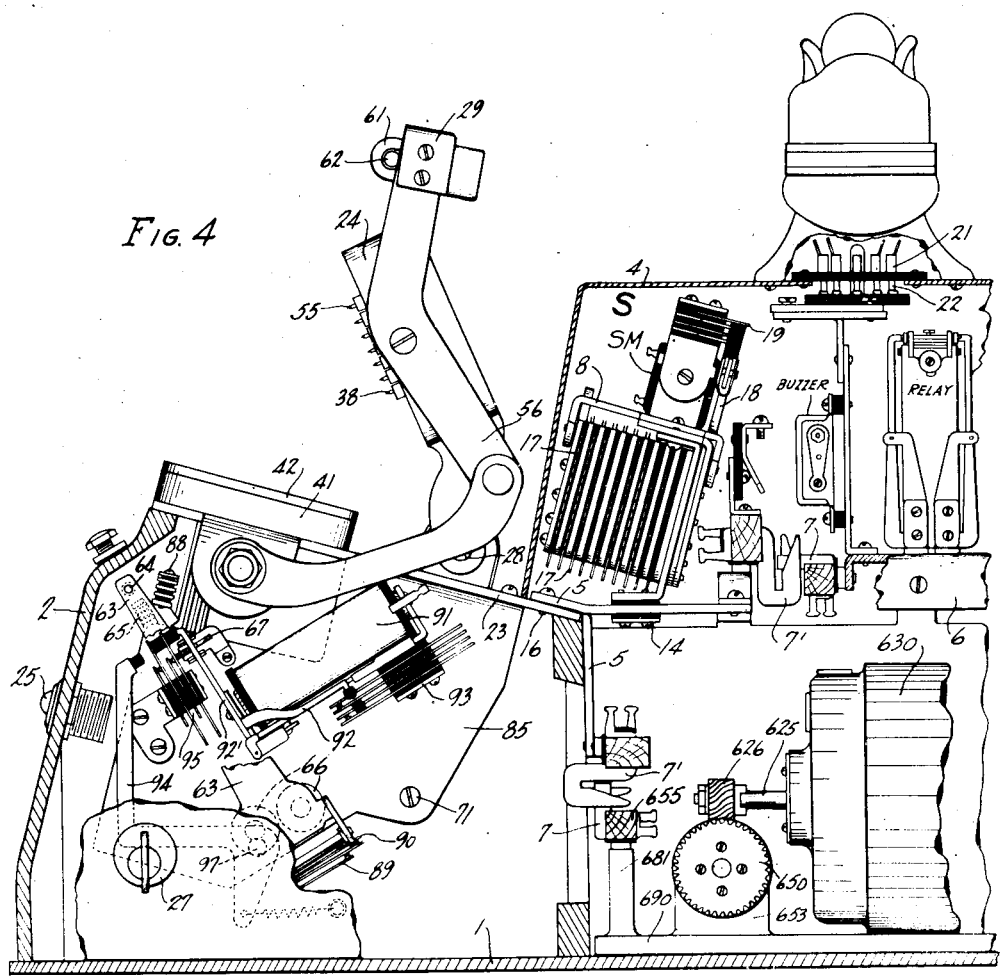
INVENTORS
HAROLD C. ROBINSON
LEITH JOHNSTON
ATTY.

Oct. 22, 1935. H. C. ROBINSON ET AL 2,018,420
MERCHANDISE CONTROL SYSTEM
Filed Sept. 8, 1933 24 Sheets-Sheet 5
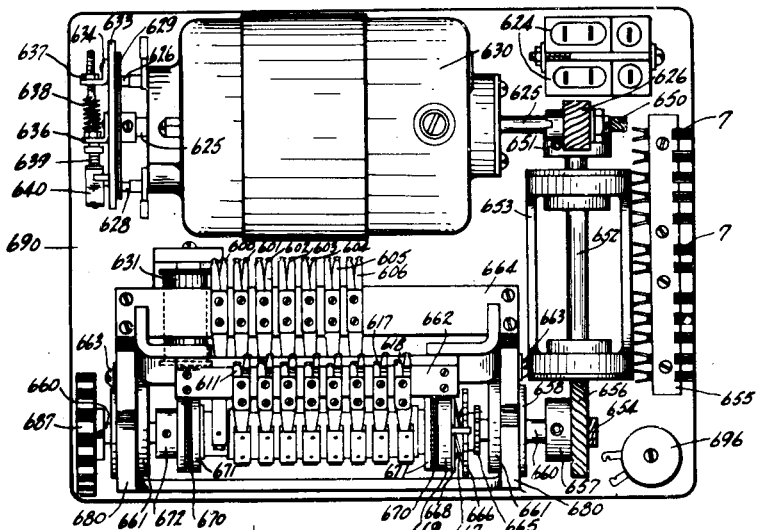
INVENTORS
HAROLD C. ROBINSON
LEITH JOHNSTON
ATTY:

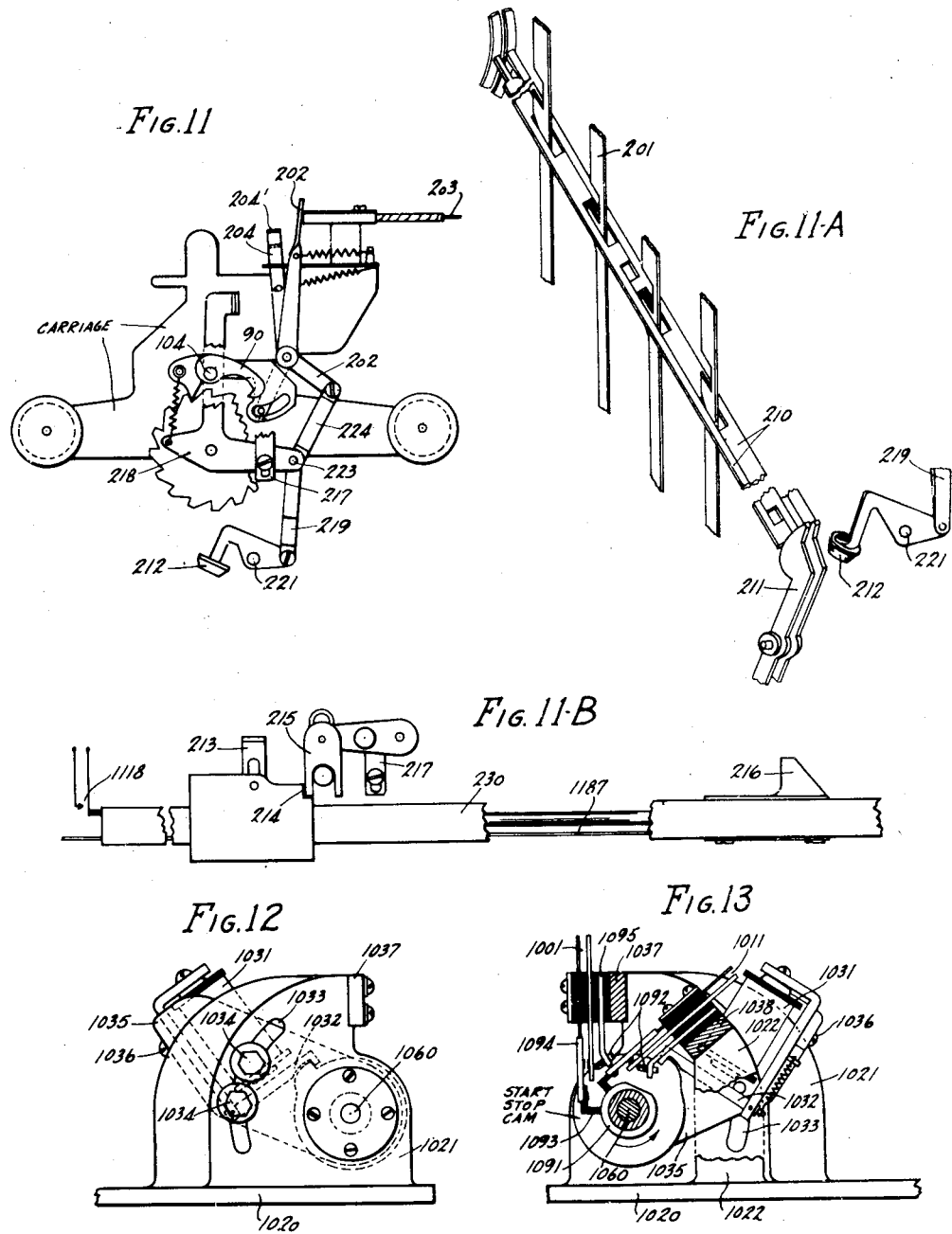

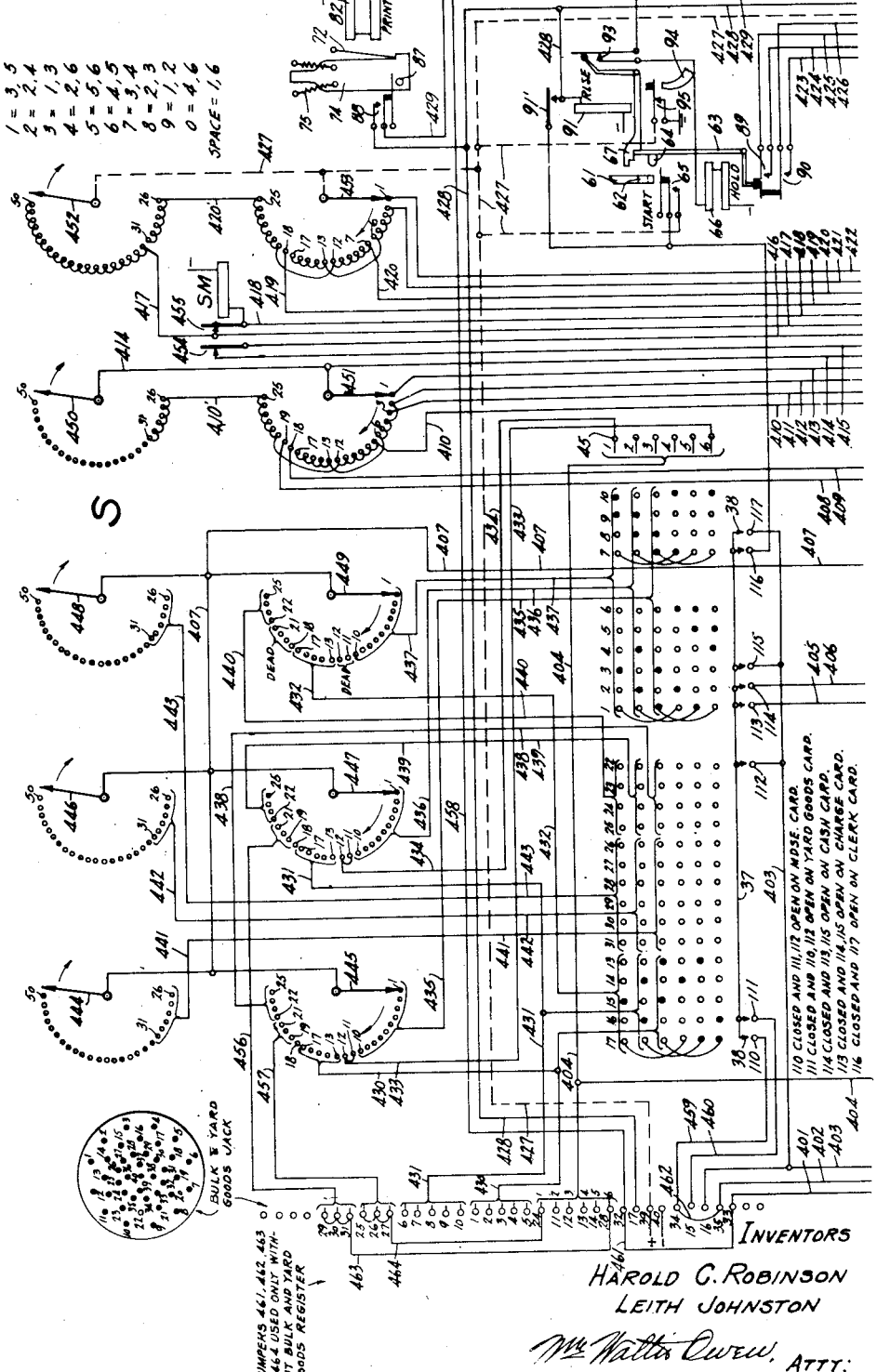

Oct. 22, 1935.  H. C. ROBINSON ET AL  2,018,420
MERCHANDISE CONTROL SYSTEM
Filed Sept. 8, 1933  24 Sheets-Sheet 8

INVENTORS
HAROLD C. ROBINSON
LEITH JOHNSTON
Wm Walter Owen. ATTY.

Oct. 22, 1935.  H. C. ROBINSON ET AL  2,018,420
MERCHANDISE CONTROL SYSTEM
Filed Sept. 8, 1933  24 Sheets-Sheet 9
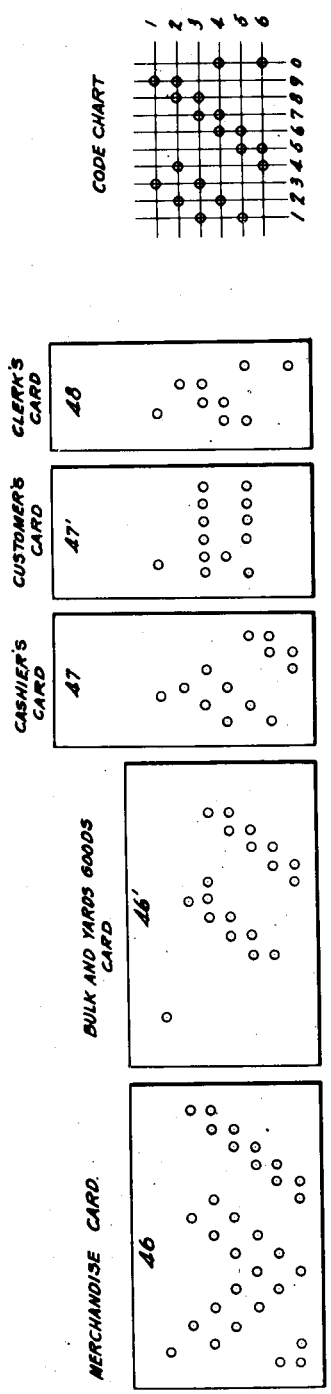
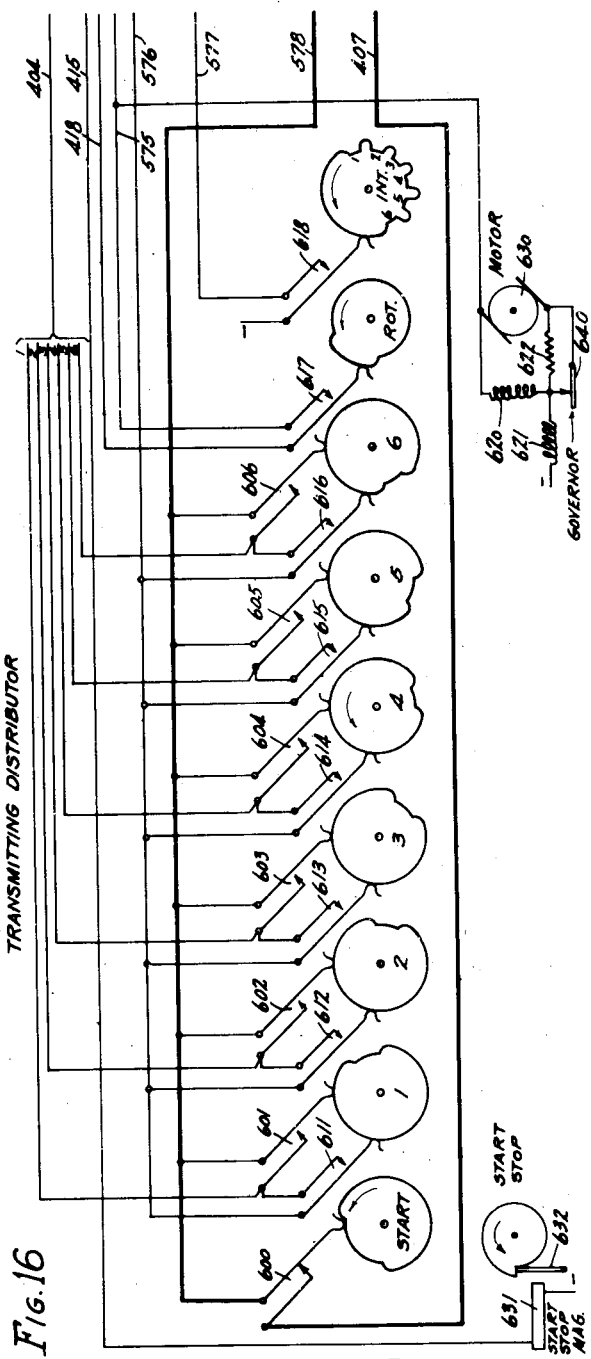
Fig.16
INVENTORS
HAROLD C. ROBINSON
LEITH JOHNSTON
Wm. Walter Owen. ATTY.

Fig. 17

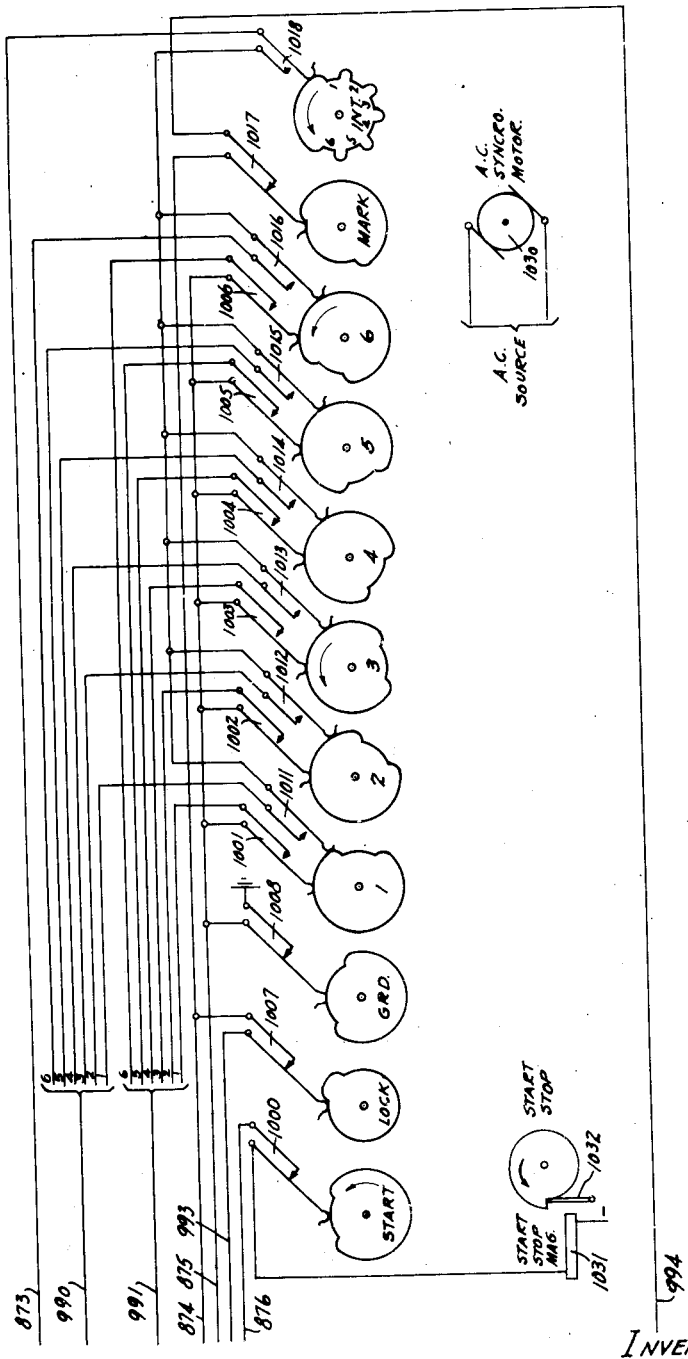

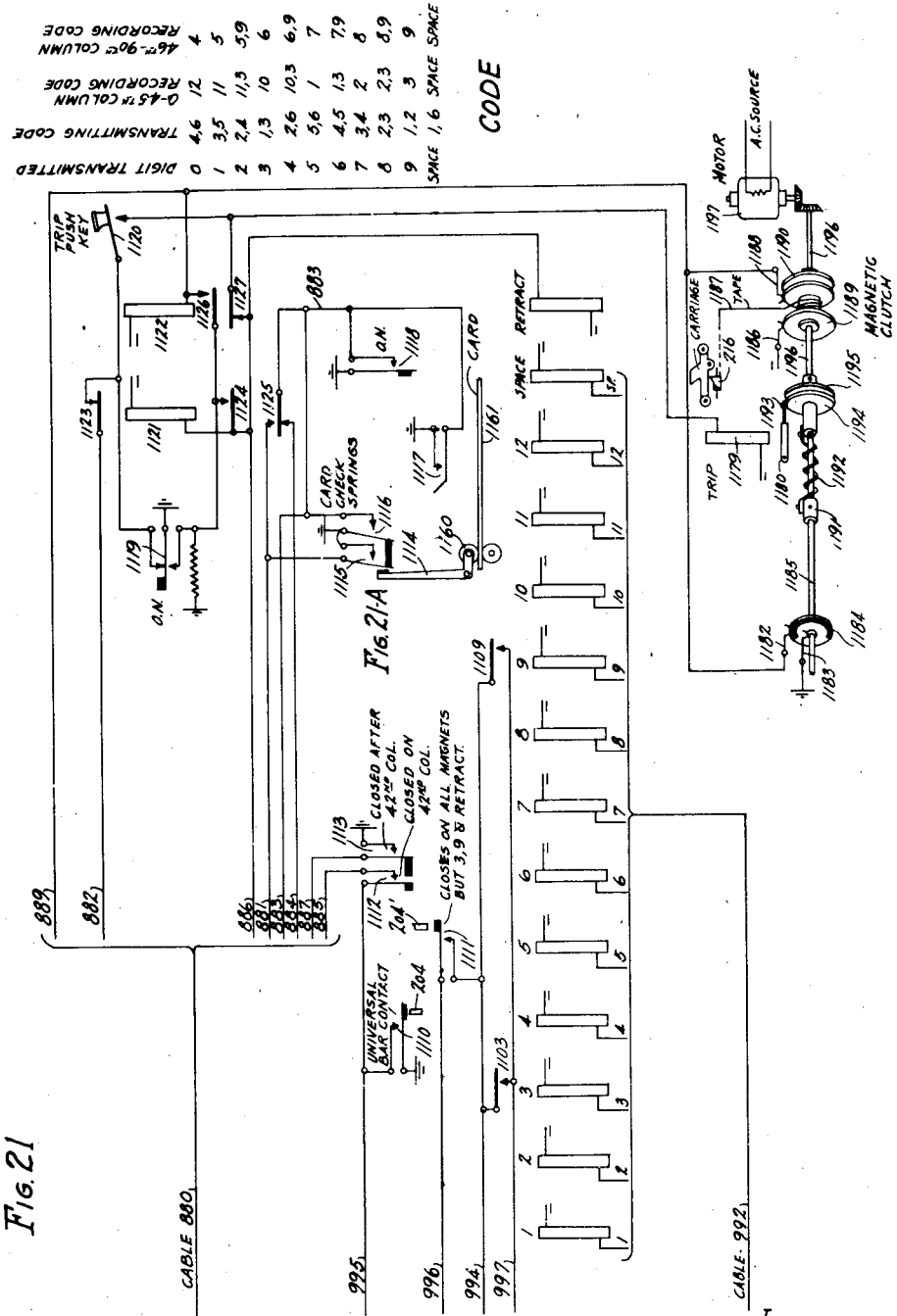

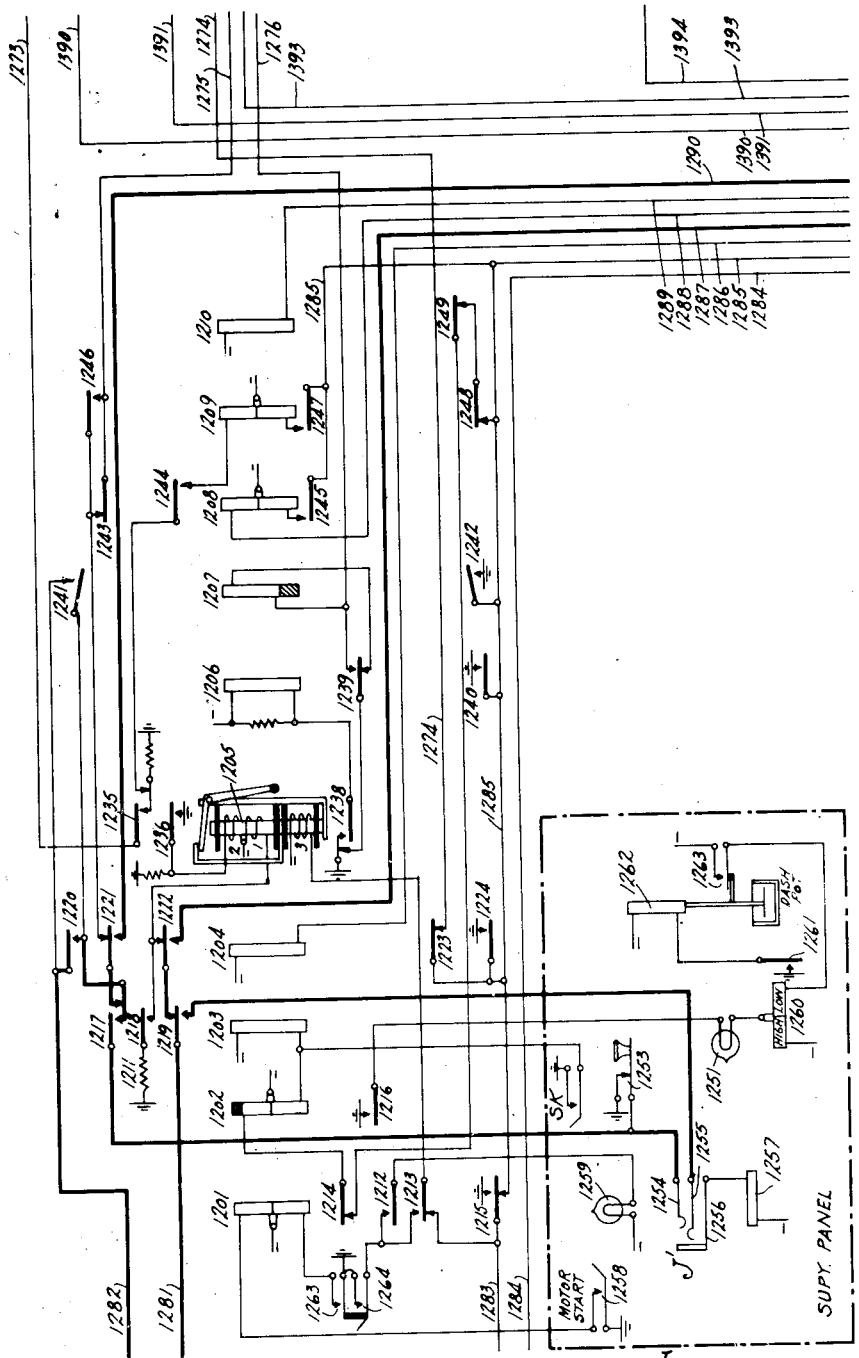

Oct. 22, 1935.         H. C. ROBINSON ET AL         2,018,420
                        MERCHANDISE CONTROL SYSTEM
                         Filed Sept. 8, 1933         24 Sheets-Sheet 16

*Inventors*
Harold C. Robinson
Leith Johnston
    Atty.

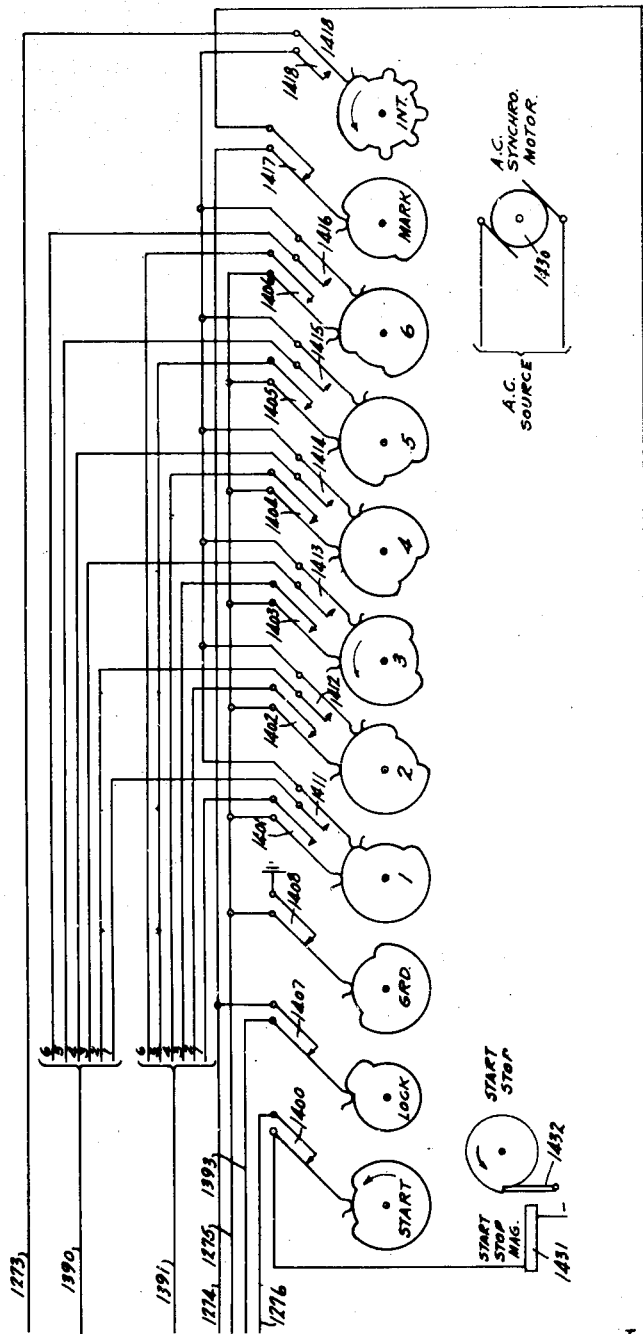

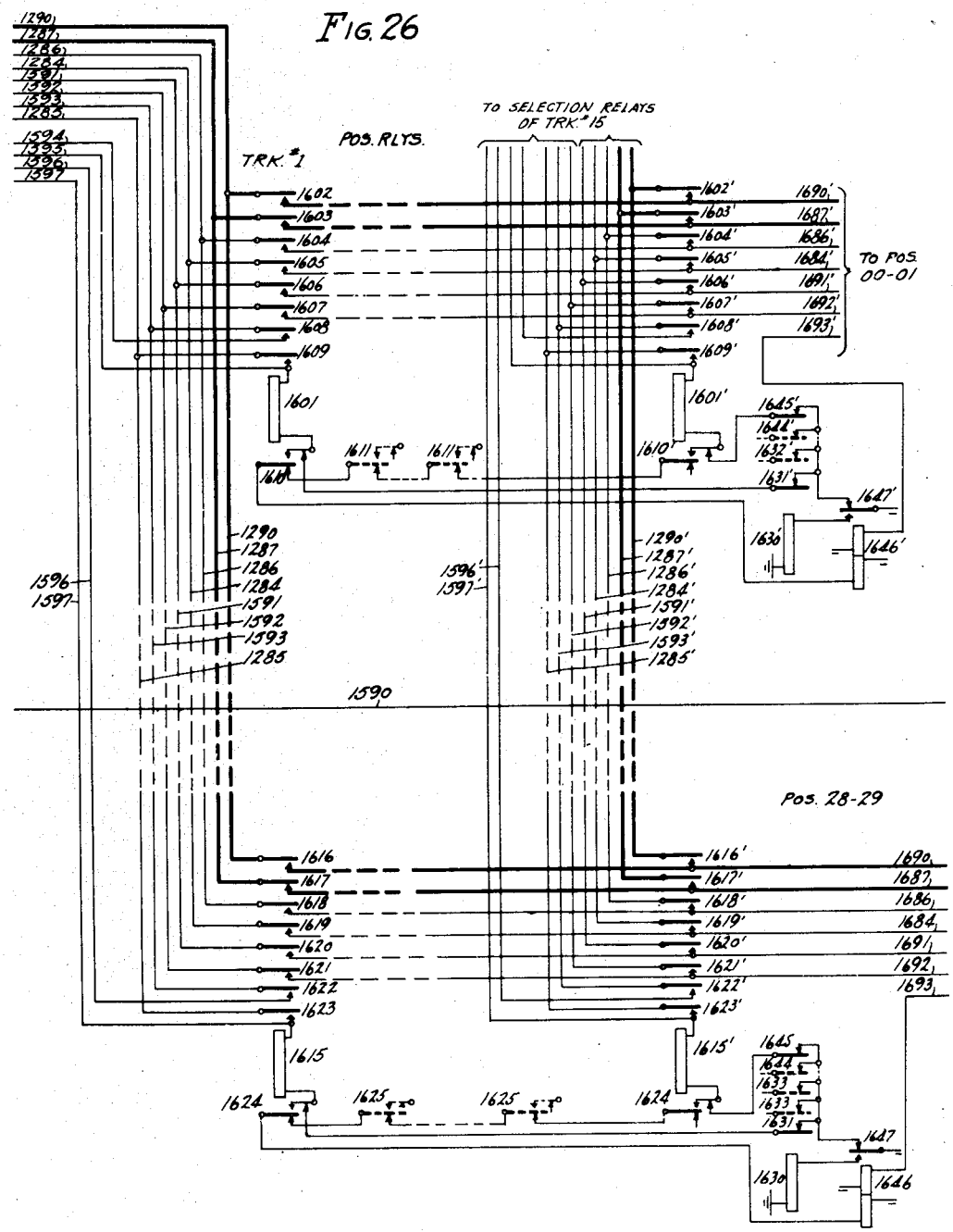

Oct. 22, 1935.  H. C. ROBINSON ET AL  2,018,420
MERCHANDISE CONTROL SYSTEM
Filed Sept. 8, 1933   24 Sheets-Sheet 20
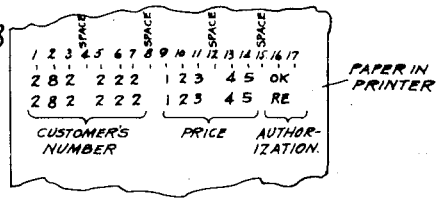
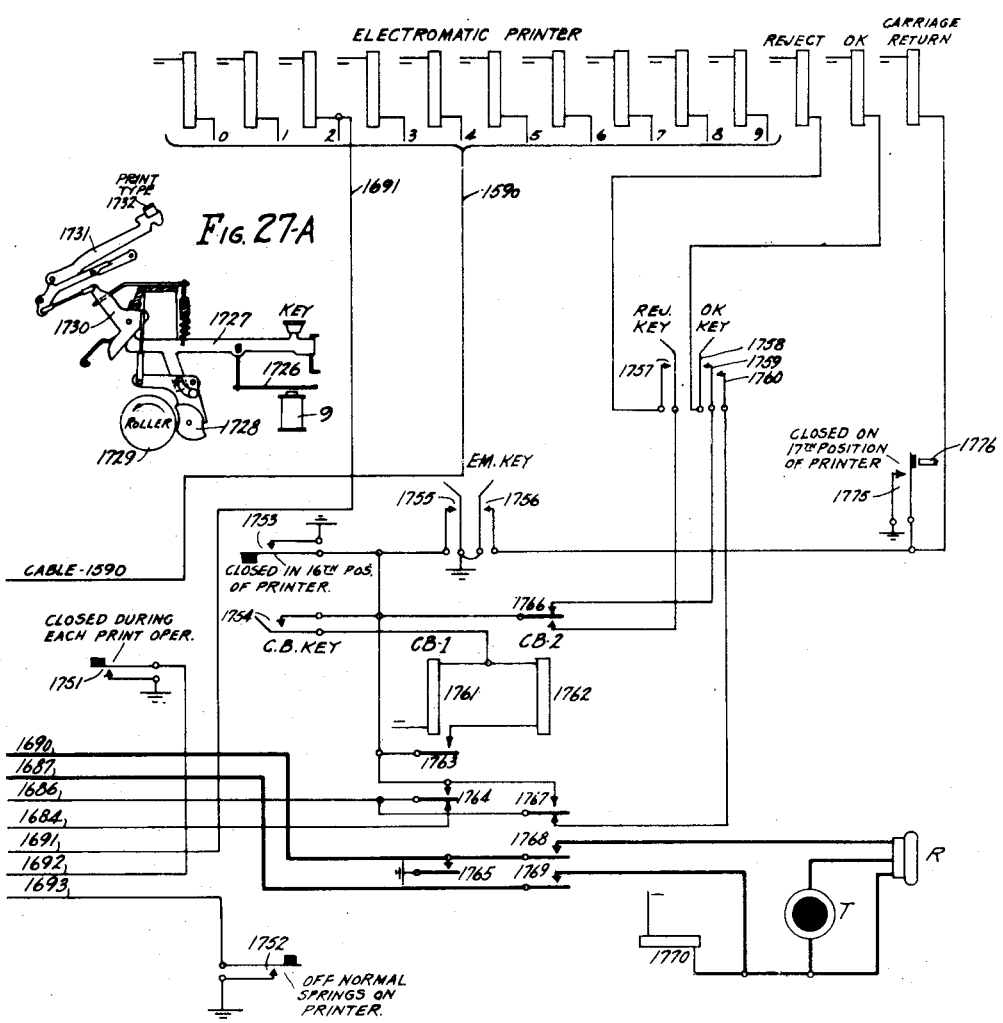
INVENTORS
HAROLD C. ROBINSON
LEITH JOHNSTON
Wm Walter Owen
ATTY.

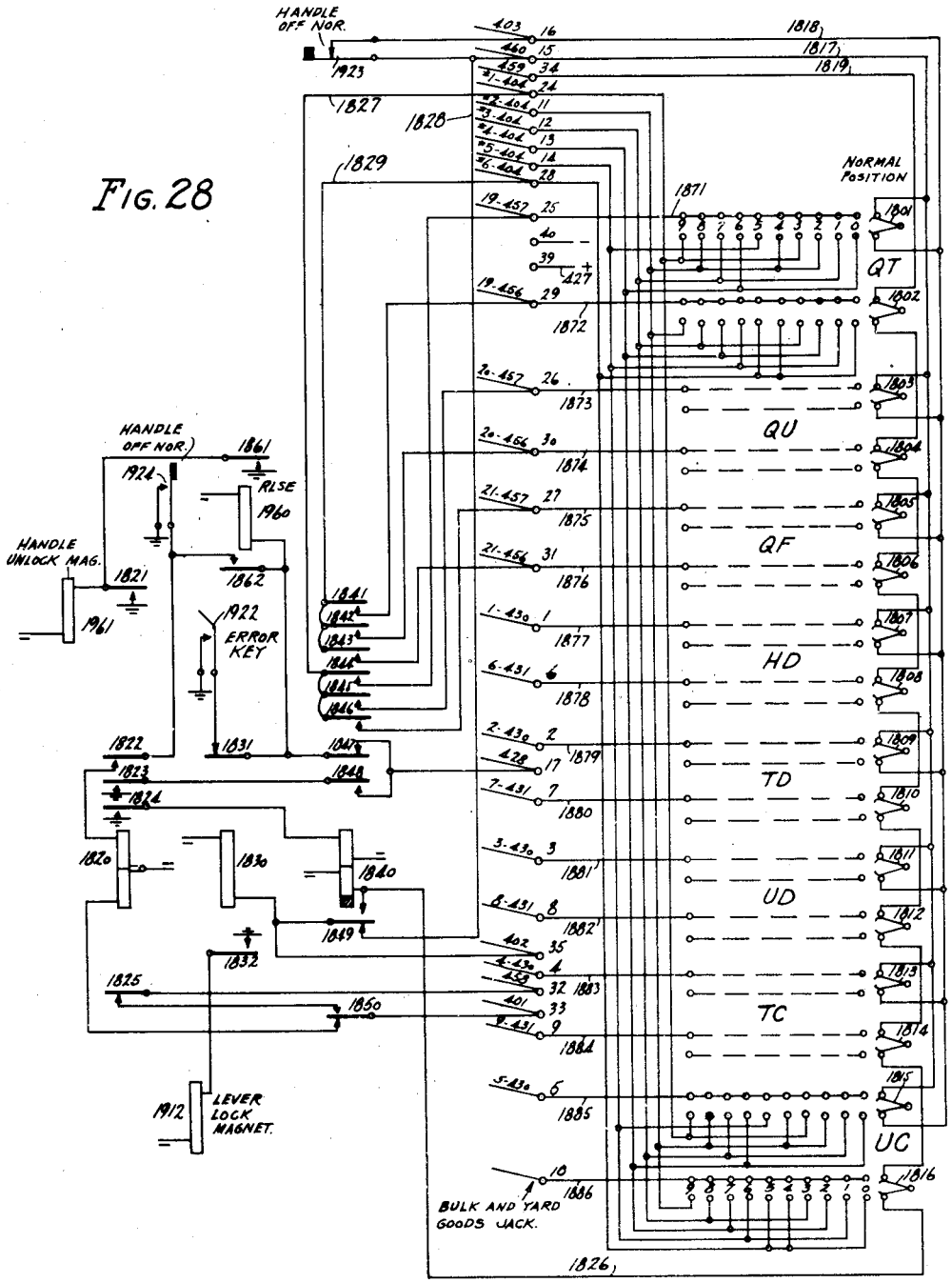

Oct. 22, 1935. H. C. ROBINSON ET AL 2,018,420
MERCHANDISE CONTROL SYSTEM
Filed Sept. 8, 1933 24 Sheets-Sheet 22
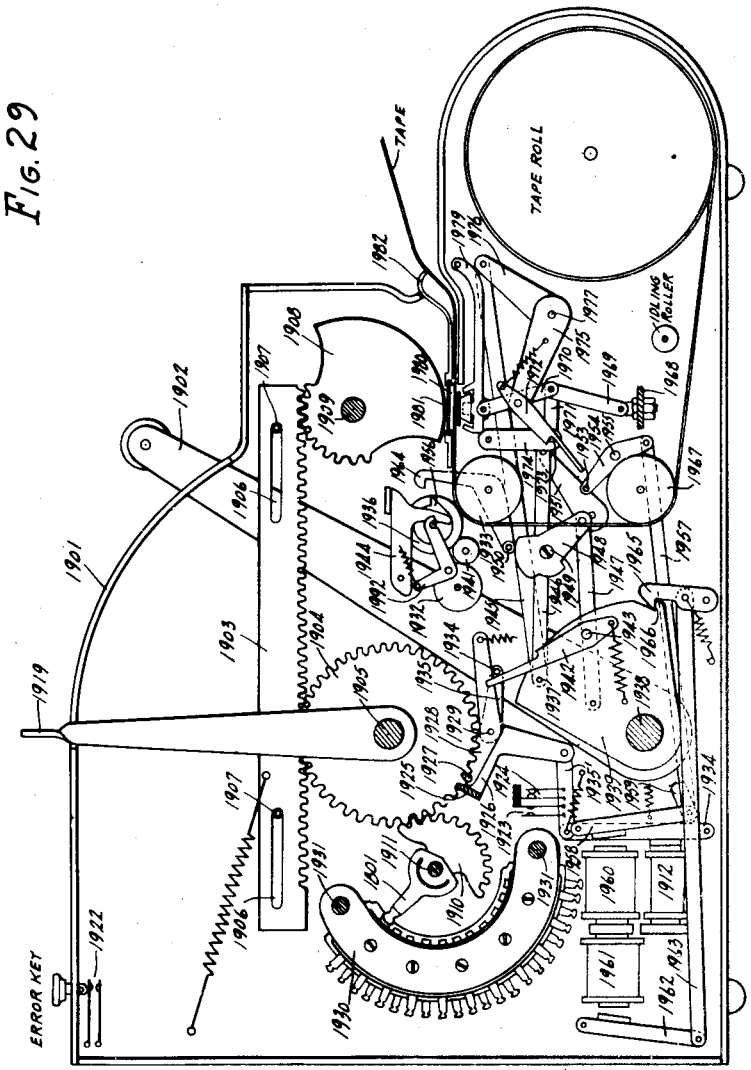
INVENTORS
HAROLD C. ROBINSON
LEITH JOHNSTON
ATTY:

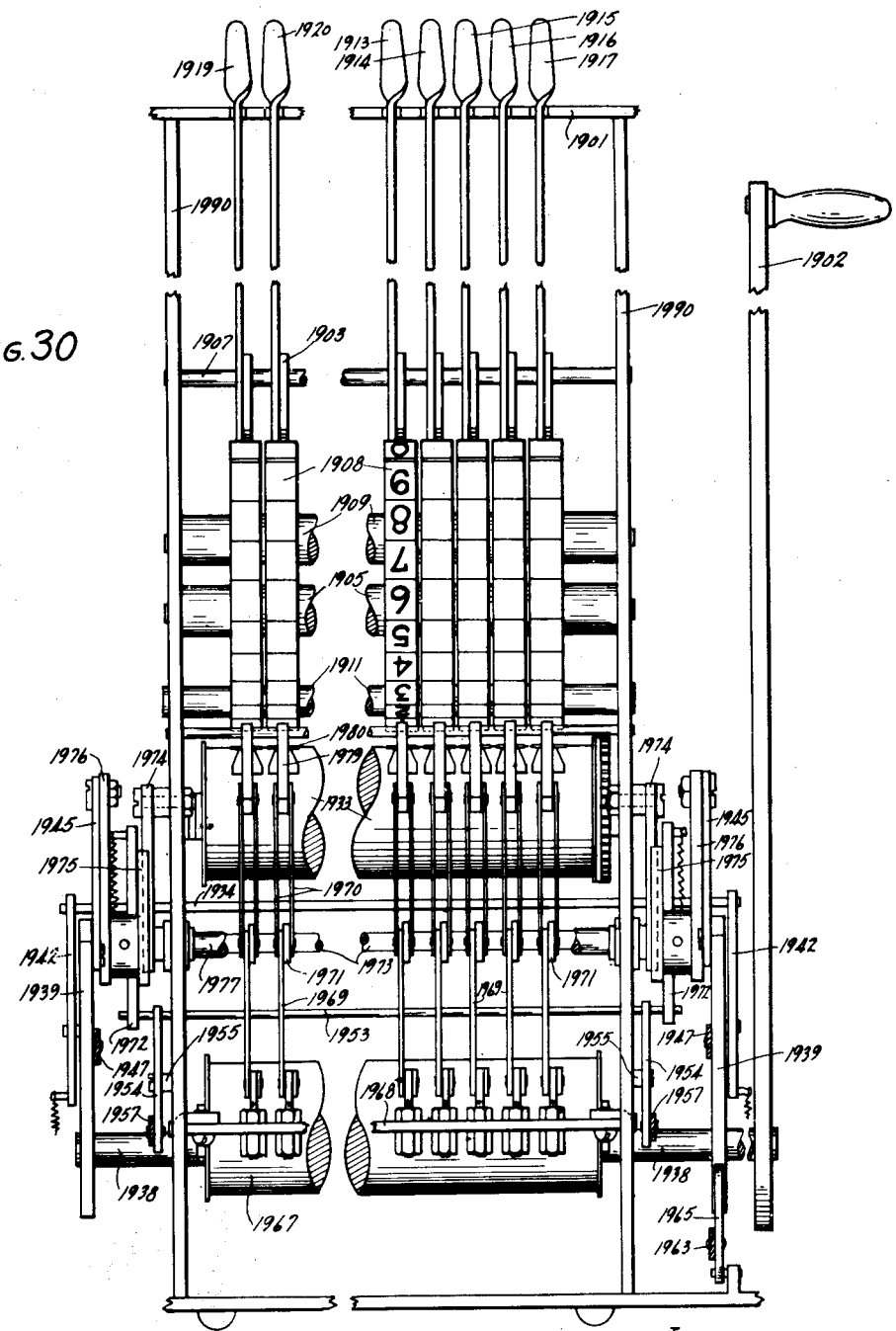

Oct. 22, 1935.  H. C. ROBINSON ET AL  2,018,420
MERCHANDISE CONTROL SYSTEM
Filed Sept. 8, 1933   24 Sheets-Sheet 24

INVENTORS
HAROLD C. ROBINSON
LEITH JOHNSTON
ATTY.

Patented Oct. 22, 1935

2,018,420

UNITED STATES PATENT OFFICE 2,018,420

MERCHANDISE CONTROL SYSTEM

Harold C. Robinson and Leith Johnston, Chicago, Ill., assignors to Associated Electric Laboratories, Inc., Chicago, Ill., a corporation of Delaware Application September 8, 1933, Serial No. 688,562

40 Claims. (Cl. 178—3)

The present invention relates to an electrically-controlled accounting system.

The system disclosed in the present application may be considered as an improvement on co-pending application Serial No. 275,643, filed May 7, 1928, and Patents Nos. 1,927,556 and 1,974,171, granted Sept. 19, 1933 and Sept. 18, 1934, respectively. This application and these patents disclose systems for automatically recording the sale of merchandise articles in the various departments or sales floors of a department store at a centrally-located accounting or auditing room.

The main object of the present invention is the provision of an improved transmitter and check-back arrangement using start-stop distributors in the type of system disclosed in the above-mentioned co-pending application and patents.

One of the features relates to the transmission and the concurrent check-back transmission of each code by the transmitting and receiving distributors during each revolution whereby the receiving distributor sends back to the transmitting distributor during corresponding revolutions of the cam shafts the same code it received.

Another feature relates to the checking arrangements for stopping further transmission of codes in case the transmitting distributor in a single revolution does not receive back from the receiving distributor the same code it transmitted to the receiving distributor.

A further feature relates to the checking arrangement for checking the correct operation of recorder magnets in accordance with the codes transmitted to a translating device.

Another feature relates to the improved mechanical details of the transmitting and receiving start-stop distributors.

A still further feature relates to the provision of an improved bulk and yard goods register for use in this type of system.

Another feature relates to the provision of means for completing a talking circuit over the transmitting conductors between the cashier at the sales position and an attendant in the switch room in case trouble occurs.

Further features, not specifically mentioned above, relate mostly to improved circuit arrangements and will be described more in detail by referring to the accompanying drawings comprising Figs. 1 to 32, inclusive.

Fig. 1 diagrammatically illustrates a one-line diagram of the complete system and Fig. 1—A is a key sheet for arranging the various sheets of circuit drawings.

Figs. 2, 3, 4, and 5 show different views of the transmitter with certain parts broken away to show the interior mechanism more clearly.

Fig. 4 shows the other side view of the transmitter with certain parts removed to show additional mechanism.

Fig. 5 shows a top view of the removed contact plate.

Fig. 6 shows a top view of the transmitting distributor.

Fig. 7 shows a front view of the transmitting distributor.

Fig. 8 shows a section of the transmitting distributor along the dot dash line shown in Fig. 7.

Fig. 9 shows an enlarged section of the interrupter cam shaft.

Fig. 10 shows an electrical centrifugal governor for regulating the speed of motor 630 shown in Fig. 6.

Figs. 11, 11—A and 11—B show certain mechanical changes in the Powers punch.

Fig. 12 shows an end view of a receiving distributor.

Fig. 13 shows a cross section of a receiving distributor.

Figure 15:
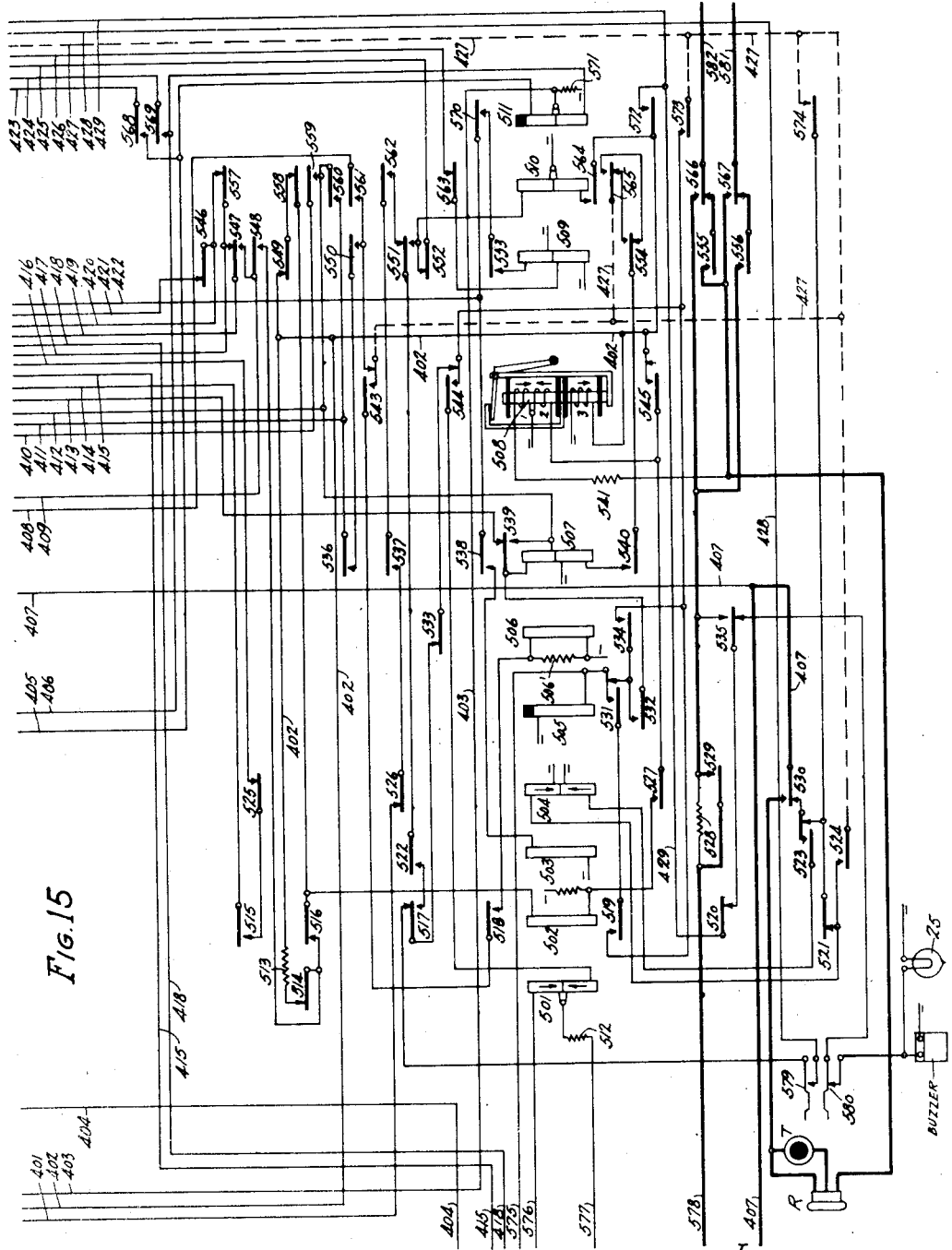

Figs. 14 and 15 show the detail circuits of the transmitter disclosed mechanically in Figs. 2, 3, 4, and 5.

Fig. 16 shows the circuits of the transmitting distributor mechanically shown in Figs. 6, 7, 8, 9, and 10. The upper portion of Fig. 16 shows the various types of cards and the code chart used in this system.

Figure 1:
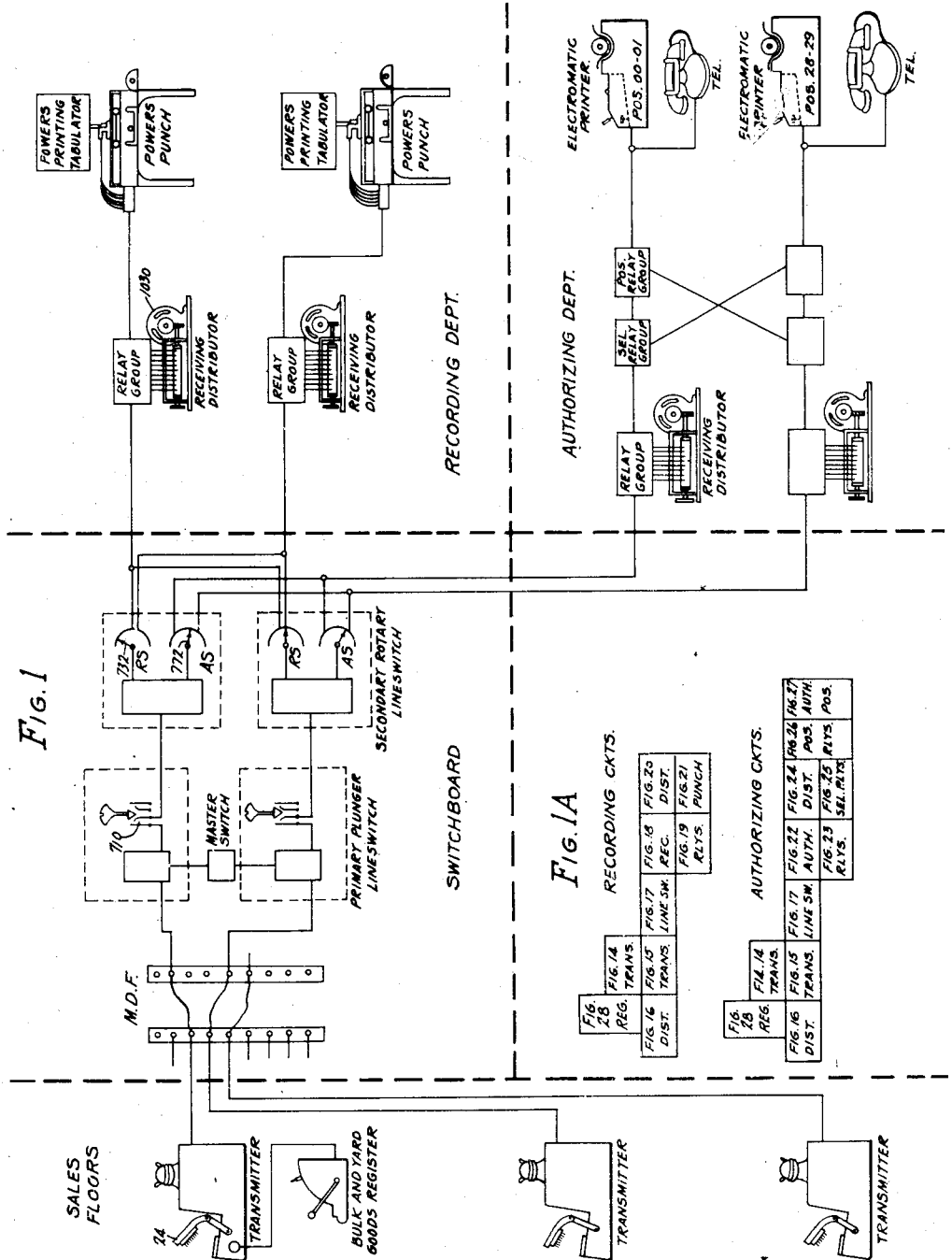
Figure 17:
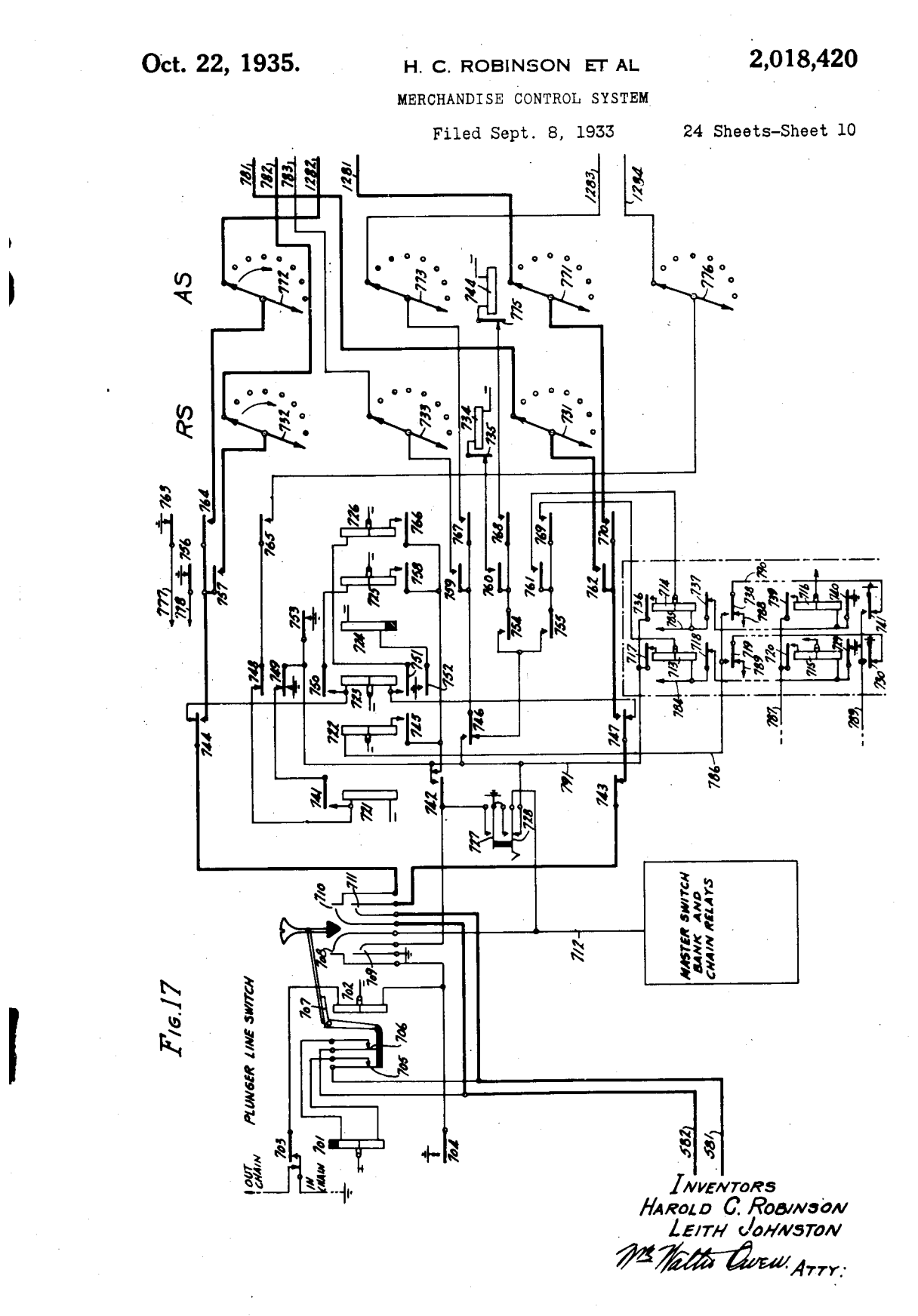

Fig. 17 shows a plunger line switch and associated master switch of the well known type commonly used in automatic telephone systems, and at the right shows two rotary step-by-step switches RS and AS of the type which advance their wipers on the deenergization of their respective motor magnets and which wipers remain in the position last used. The plunger lineswitch is individually connected to the transmitter circuits shown in Figs. 14 and 15. The rotary secondary lineswitch RS has access to recording trunks and the lineswitch AS has access to authorizing trunks as illustrated in Fig. 1.

Figure 18:
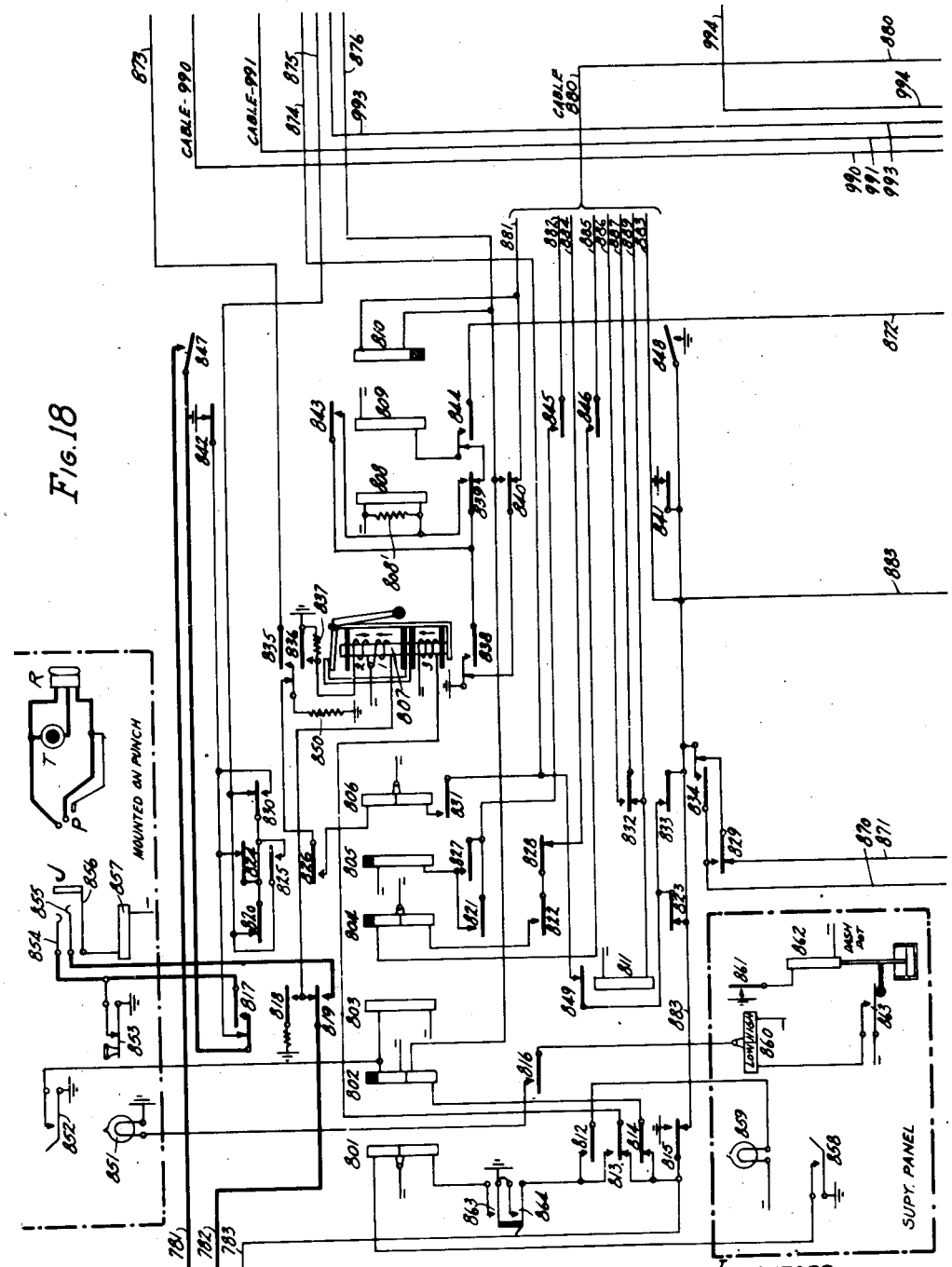

Fig. 18 shows the circuits of one of the recording trunks.

Figure 19:
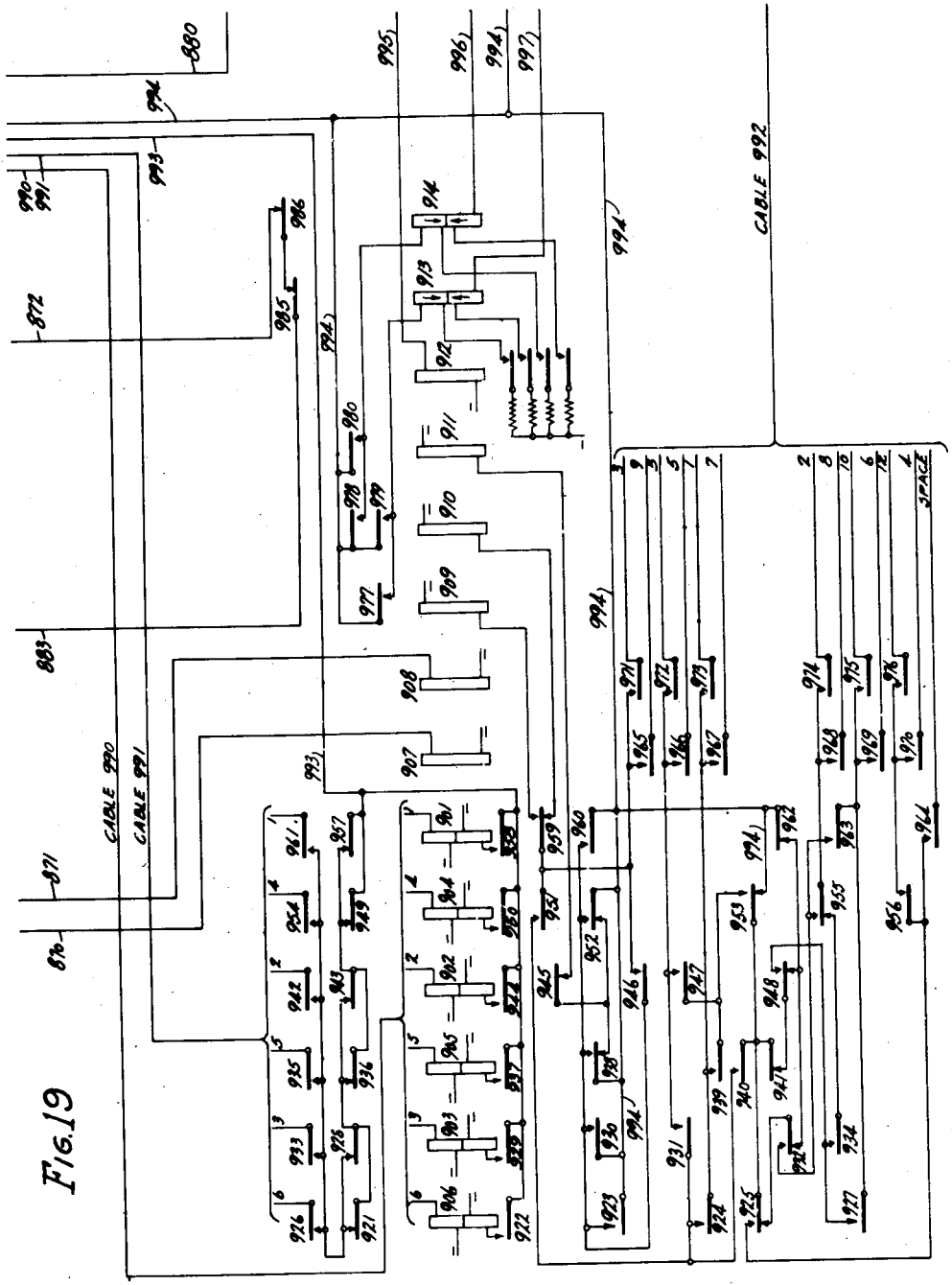

Fig. 19 shows a group of pick-up relays which are operated by the transmitted codes to control the retransmission of the same codes and to operate the punch magnets. Punch checking relays are shown to the right for checking the correct operation of the punch magnets in accordance with the operated pick-up relays.

Fig. 20 shows the circuits of the receiving distributor mechanically illustrated in Figs. 12 and 13.

Fig. 21 shows a Powers punch somewhat similar to the punch disclosed in Patent No. 1,305,557, issued to W. W. Lasker. To the right is shown the code transmitted for each digit and the magnet which is operated for each transmitted code dependent upon whether the punch carriage is operating in its first or second setting operation.

Fig. 21—A diagrammatically shows a card-check arrangement for indicating when a card is in punching position.

Fig. 22 shows the circuits of one of the authorizing trunks which are accessible to the authorizing secondary line switches AS.

Fig. 23 shows an authorizing pick-up relay group which is somewhat similar to the pick-up relay group shown in Fig. 19. This relay group is individual to the authorizing trunk shown in Fig. 22 and to the authorizing receiving distributor shown in Fig. 24.

Fig. 24 shows the circuits of one of the authorizing receiving distributors; the mechanical construction of which is illustrated in Figs. 12 and 13.

Figure 25:
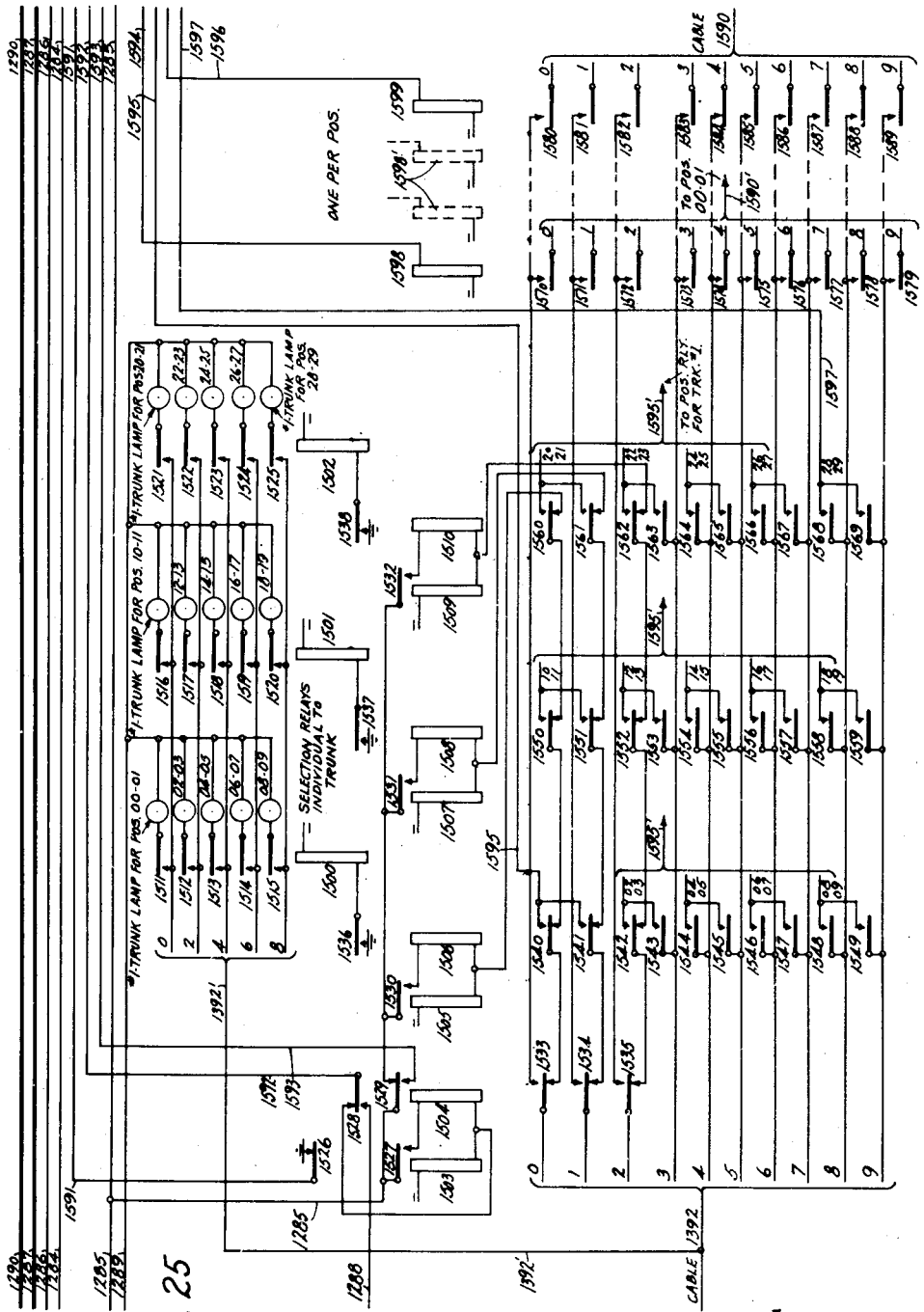

Fig. 25 shows a group of position selective relays individual to the authorizing trunk shown in Fig. 22 for selecting a particular credit or authorizing position in accordance with the first two digits transmitted. The upper portion of this figure shows all of the lamps individual to this trunk at the different credit positions; in this case trunk lamp #1. The relays 1598, 1598' and 1599 illustrate a relay for each credit position for connecting this particular trunk to any required credit position.

Fig. 26 illustrates the position cut-in relays for operatively connecting any authorizing trunk to any credit position.

The upper portion of Fig. 27 shows the numeral magnets for operating the numerical type bars of a printer at a credit position. This printer or typewriter is manufactured by the "Electromatic Typewriters Inc." of Rochester, New York, and is provided with electromagnets for operating the numeral keys. A publication in "Product Engineering", pages 513 to 516 of November 1930, discloses a somewhat similar typewriter. The manner in which the magnets operate the numeral levers is diagrammatically illustrated in Fig. 27—A, while Fig. 27—B illustrates the actual printing accomplished by the printer. The lower portion of Fig. 27 shows one of the credit positions including a number of control keys and relays and a telephone for talking to any cashier when a charge sale is rejected by the credit clerk.

Fig. 28 shows the circuits of the bulk and yard goods register mechanically illustrated in Figs. 29, 30, 31 and 32. This register, when required in certain departments, is plugged into the transmitter by means of a plug and jack arrangement diagrammatically illustrated by the jack terminals shown in Figs. 28 and 14.

Fig. 29 shows a side view of the bulk and yard goods register with certain parts omitted to more clearly show and describe the operations performed.

Fig. 30 shows a partial front view of the amount and price levers and the printing segments and their striking or printing bars.

Figure 31:
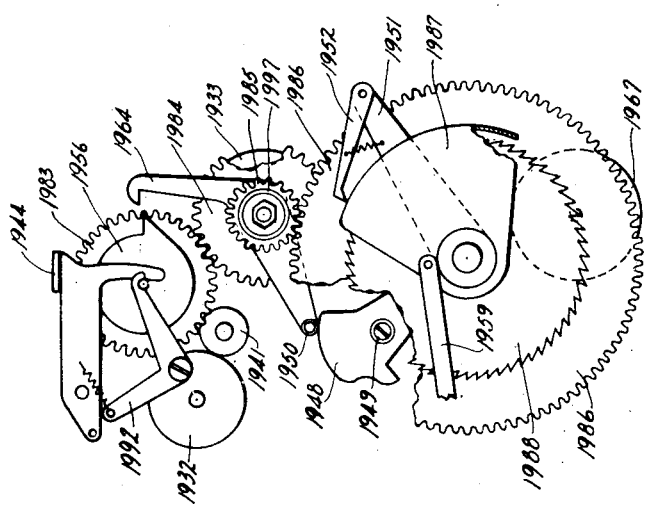

Fig. 31 shows a detail view of the date printing mechanism and the paper feeding mechanism partially omitted from Fig. 29 for clearness.

Figure 32:
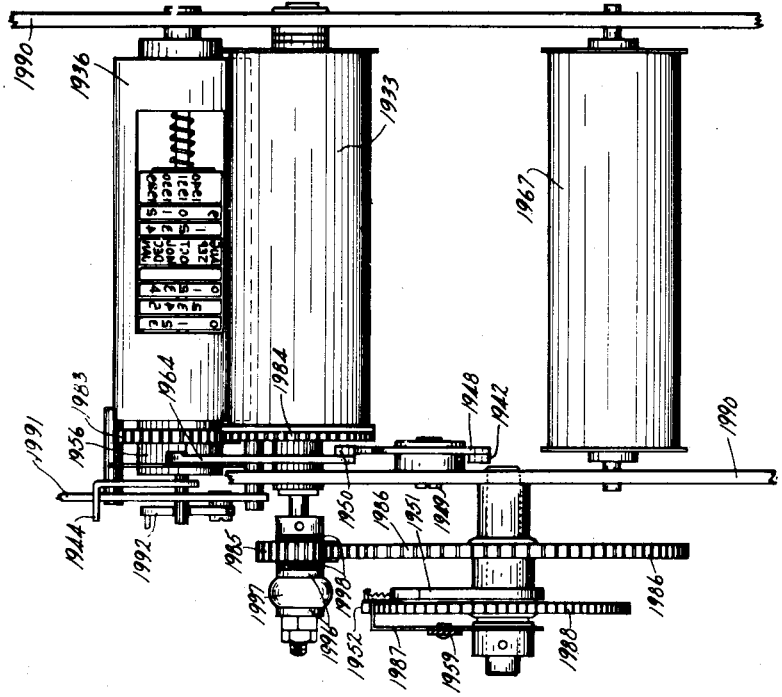

Fig. 32 shows a front view of the date printing and feeding mechanism shown in Fig. 31.

The current supply to the various magnets and relays shown in the drawings is indicated by negative and positive signs, such as − and the ground symbol designating the negative and positive poles, respectively, of a battery. It will be understood that while a plurality of current sources have been shown for convenience, there is but one battery. The negative pole of battery will be referred to hereinafter as "battery" and the positive pole as "ground". The battery connections to the various sales floors extend over a pair of wires from the switch room not shown in the drawings.

Before proceeding with the general description, it is belived advisable to explain how merchandise articles are marked. Each article of merchandise to be sold has an inventory card and a merchandise display card punched and printed with information relating to the article. The inventory card is punched in accordance with the article's cost price, its size, file, purchase date, and other necessary information, while the merchandise display card is double punched in code in accordance with the serial number of the article, its size, class, sales price, department number, and any other necessary information. The inventory card is then placed in the inventory file, while the merchandise display card accompanies the article to the proper sales department.

Each sales clerk and each cashier have identification cards double punched in code with their assigned number, and each customer having a charge account has a similar code-punched identification card.

The various cards, the code, and the above procedure are illustrated in the patent of M. L. Nelson, No. 1,927,556, granted Sept. 19, 1933.

*General Operation*

Referring now to Fig. 1, and in order to give a general description of the system, it will be assumed that a sales clerk has made a cash sale of some article. The clerk removes the merchandise display card from the article and gives this card with her own to the cashier who inserts three cards, the merchandise display card, the clerk's card, and the cashier's card in the transmitter. When the transmitter is closed, primary and secondary line switches automatically hunt for and connect the calling transmitter line to an idle recording trunk distributor. The motor and stepping switch in the transmitter are not operated to successively close the circuit connections made through the perforated holes in the cards in the transmitter, thereby transmitting codes to cause the punch to punch a new card, and the printing tabulator to print and add the transmitted record. Each transmitted code is automatically checked during each revolution of the distributors and in case of fault further transmission is automatically stopped. At the sales room the merchandise display card is automatically printed with the date of sale just prior to the automatic opening of the transmitter. The merchandise card is then given to the customer as her receipt. The printed record in the record room is printed on a tape and may be used for depleting the inventory file by removing the inventory cards corresponding to the printed record. The new card perforated by the punch in the record room is termed a "Sales audit and accounts receivable card" and can at any time thereafter be run through well known sorting and tabulating machines for determining any sales analysis desired.

It will now be assumed that a customer desires to make a purchase and charge it to her account. The customer gives her perforated charge card to the sales clerk, and the cashier then inserts the merchandise display card of the article to be charged, the customer's card, and the clerk's card in the transmitter and closes the same. The operation is different in this case from a cash sale because of the insertion of the customer's charge card in place of the cashier's card. Due to the perforations in the customer's card, a credit secondary line switch operates to connect the transmitter in use to an authorization trunk line. When this connection is made, the step-by-step switch in the transmitter controls the operation of relays to cause the selection of the proper credit clerk's position in accordance with the customer's number, and controls the operation of the printer at this position to print the customer's number and the price of the article. The credit clerk upon observing the customer's number and amount of sale will consult her records and determine whether the charge sale is O. K., or whether the sale should be rejected.

In case the customer's credit is good, the credit clerk will press the OK key, causing the printer to print an indication that she has approved this sale and causes the associated recording secondary lineswitch to connect the transmitter in use to an idle recording trunk. The authorization switch train is automatically released and the transaction now proceeds the same as a cash sale over the recording trunk.

In case the sale is to be rejected because the charge account has been closed, or for other reasons, the credit clerk will operate the callback key which operates a signal at the transmitter. The transmitter is held in locked position and cannot be released until the cashier removes the telephone handset from its cradle and talks to the credit clerk who then will press the reject key to cause the credit printer to print a reject indication on the printed record and to automatically open the transmitter. After talking with the credit clerk, the cashier will replace the handset and inform the customer of the rejection in accordance with the usual store procedure.

This system is also arranged to take care of bulk goods or goods sold by the yard. In this case a bolt of yard goods has a special perforated card with the required information perforated therein, which makes it necessary for the yard-goods register shown in Fig. 28 to be operated in accordance with the number of yards of goods sold, together with the price, before the transmitter will function to transmit the information. After the proper number of levers have been operated, the transmitter will function in the same manner as previously described. It should probably be mentioned that the transmitter will operate correctly without operating the yard-goods register provided a merchandise display card having the required perforations is inserted in the transmitter.

Having given a broad general description of the system, a description will now be given explaining the various detail mechanical and electrical operations performed.

*Mechanical description of the transmitter*

Referring now specifically to Figs. 2, 3, 4, and 5, the transmitter comprises a metal base plate 1 upon which is mounted the stationary casing 2, the upright plates 3, and the cover 4. The male jacks 7 are similar to the well-known type of jack used in mounting automatic telephone switches and fit into female jacks 7'. This jack arrangement permits the removal of a transmitter distributor or a relay group and the substitution of a new transmitting distributor or relay group without changing any of the permanently connected wires.

The rotary switch 8 is mounted on the plate 5 by means of machine screws 14. The rotary switch is similar to the rotary lineswitch used in telephone systems and comprises a stepping magnet SM which operates the pawl 18 and interrupter springs 19 to step the wipers, such as the wipers shown in Fig. 14, over the bank contacts, when the stepping magnet SM deenergizes. The plate 5 is also securely fastened to the plate 23 by means of machine screws 16. In the top of cover 4 there is mounted a well known monophone telephone set including the cradle assembly and hand phone. The talking connections between the monophone set includes the conducting sleeves 21 which are secured to the cover 4, but insulated therefrom. The conducting sleeves, such as 21, engage and slide over the conducting pins 22 for completing the telephone circuits in the manner illustrated.

The interior equipment of the transmitter, with the exception of the signal lamp assembly 25 and the lock key assembly 27, is mounted on plates 83, 85, and 86. The side plates 85 and 86 are in reality a single U-shaped plate fastened to the top plate 23 by machine screws. Top plate 23 is also attached to the stationary casing 2 by means of machine screws. This mounting arrangement permits the easy removal of the interior mechanism from the stationary casing 2 in case any repairs or inspection is needed.

A movable casing 24 is rotatable attached to the top plate 23 by means of the shaft 28. A handle 29 rotatably mounted on the movable casing 24 and top plate 23 is provided for moving the movable casing to its operated position. In the interior of the movable casing 24 there are two bakelite strips 30 held in place by screws 31, and upon these bakelite strips are mounted the metal strips 32, 33, and 37, there being a back strip 32 for each strip 33 or 37. Individually movable contact pins 34 and 38 are mounted between the metal strips. Each pin 34 or 38 is provided with a shoulder which rests against the corresponding metal strip 33 and which is held in normal position by means of a spring, such as spring 40.

Figure 3:
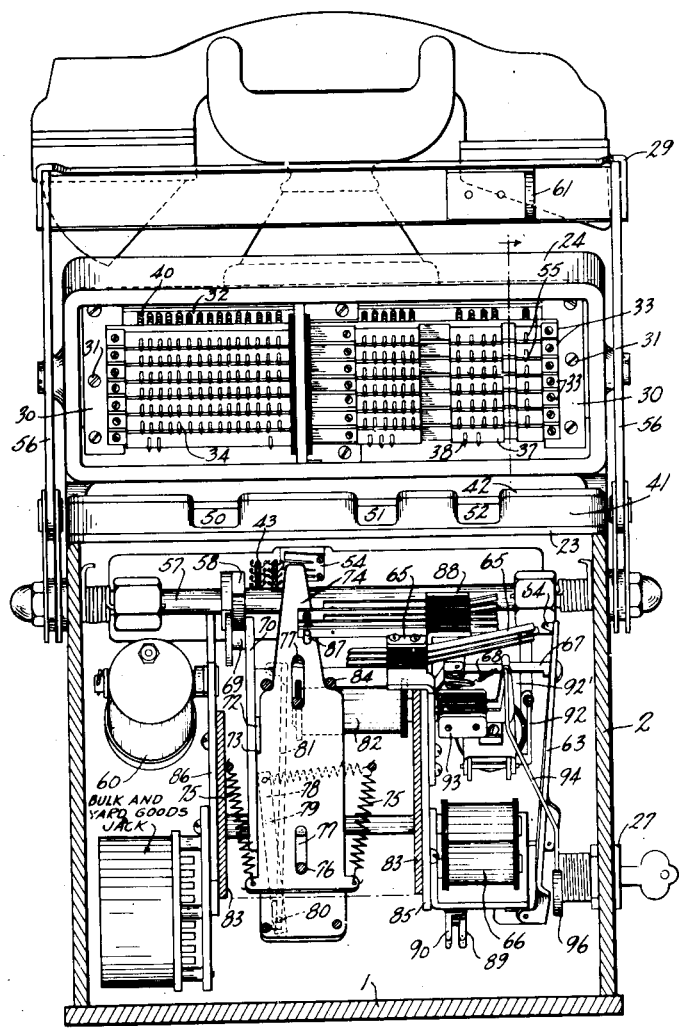
Fig. 3 shows a front view of the transmitter with a part of the outer casing cut away to more fully disclose the interior mechanism.

On top of the plate 23 there is mounted an insulating plate 41, made of suitable insulating material such as bakelite, and into this bakelite plate a plurality of pins, such as pin 43, are cast, which are engaged by the movable pins 34 and 38 when the movable casing 24 is moved to operated position by means of the handle 29 and arms 56. In Fig. 3 to the left of the printing bars 74, the lower portion of a few of the pins 43 are shown and to these lower portions are soldered wires which extend to the bank contacts of the rotary switch S. Both the pins 43 and the insulating plate or block 41 are grooved as shown in Fig. 5 to provide better contact for the movable pins such as 34 and 38. Mounted on top of the insulated plate 41 is a metal plate 42, more clearly shown in Fig. 5, having three openings for holding perforated cards, portions of which are shown and indicated at 46, 47, and 48. Another opening in the plate 42 is provided to enable the pins 55 in the upper movable casing 24 to engage the pins 45 in the insulating plate 41. The plate 42 is also provided with flanges to assist in holding the cards 46, 47, and 48 in their proper positions. The plate 41 is provided with slotted openings such as 50, 51, and 52, in order to permit easy withdrawal of the cards from their respective positions as shown in Figs. 3 and 5. The insulating plate 41 is also provided with an opening in which is placed metal printing bars 53 held in place by the slotted spring 54. The type on these bars is changed each day to correspond to the month, day, and year so that the merchandise card, such as card 46, may be printed with the month, day, and year in which a sale took place.

When the cashier operates the handle 29 to lower the upper movable casing 24 in engagement with the stationary casing 2, the arms 56 cause the rotation of the shaft 57 to rotate the cam 58. The rotation of the shaft 28 operates the lever 59, which in turn operates a dash-pot 60 provided for the purpose of retarding the operation of the movable casing 24 when the same is released. The bracket 61 mounted on the handle 29 extends through a slotted opening (not shown) in the casing 2, and when the movable casing 24 has been moved to its proper position the springs 65 are closed by the bracket 61 to operate the holding magnet 66, which in turn operates its armature 63 to cause the lug 64 to extend through the opening 62 in the bracket 61 and thereby latch the movable casing 24 in its operated position. When the hold magnet 66 operates its armature 63, a mechanical catch 67 is operated by the spring 68 to hold the armature 63 in its locking position.

When the cam 58 is rotated responsive to the closing of the transmitter, the lever 70 is rotated on its shaft 71 by means of the cam 58 riding in the collar 69 attached to the lever 70. A steel spring 72 attached to lever 70 is operated in a downward movement to engage the edges 73 of each of the printing bars, such as bar 74. Each of the printing bars 74 are provided with slots 77 to permit their downward movement against the tension of springs 75 which are individual to each printing bar. The printing mechanism is attached to the plate 83 by means of the screws. On the rear plate 84 of the printing mechanism there is provided a lever 78 pivoted at 79 for tripping the spring 72 to operate the print bars. The print magnet 82 is mounted on the side plate 85 and is provided with an armature 81 which engages the pin 80 in lever 78. When the print magnet 82 is energized, armature 81 by means of the pin 80 rotates the lever 78 on its axis 79 so that the upper end of the lever 78 engages the spring 72 to cause the spring 72 to be disengaged from the edges 73 of each of the printing bars 74. The individual springs 75 of each print bar 74 cause each print bar to strike the spring 54 to actuate the printing type 53 to print the card with the date. The springs 88 are mounted by means of a bracket to the side plate 85 and are normally closed by the pin 87 on the front bar 74. When the print bars are being set, the pin 87 moves in a downward direction and opens the springs 88 so that they no longer engage each other.

The springs 89 and 90 are operated by an extension on the armature 63 of the hold magnet 66. The release magnet 91, shown in Fig. 4, is mounted on the side plate 85 and controls the operation of the springs 93 by armature 92. An extension 92′ on armature 92 extends in an upward slanting direction between the catch 67 and the springs 95. This extension is for the purpose of operating the catch 67 when the release magnet 91 is energized so that armature 63 of the holding magnet 66 may be restored to its normal position or the position shown in the drawings. In addition, the armature springs 93 may be operated by the lever 94 by way of the springs 95 when the key in the key assembly is operated to the unlocked position. The lever 94 is pivotally mounted at 97 to the side of the stationary casing 2 and rides on the cam 96 which is rotated by the key assembly 27. The lever 94 is shown in a position in which the transmitter may be used for operation. In case it is desired to lock out this transmitter the key would be turned and the cam 96 would raise the lever 94 until the bushing on the extreme upper end thereof would engage the springs 95, thereby opening said springs and in addition operating the armature 92′ to likewise open the springs 93 on the release magnet 21.

Figure 2:
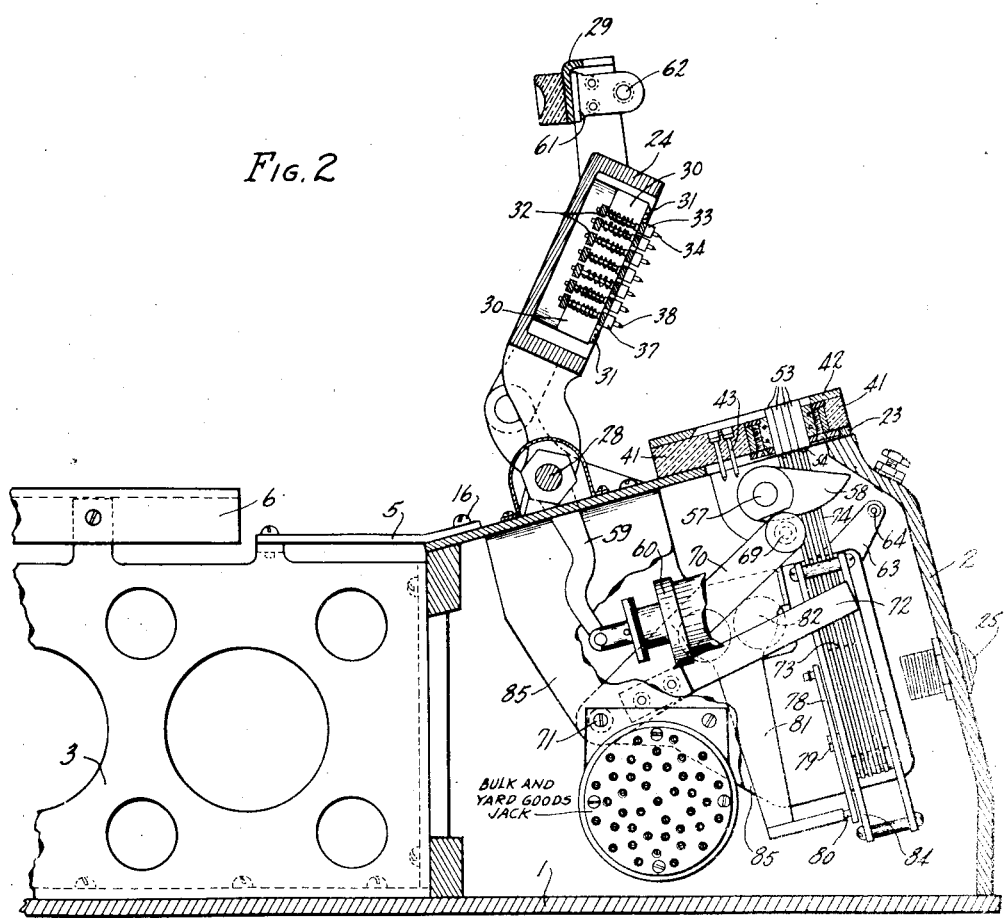
Fig. 2 shows a sectional side view of a portion of the transmitter.

Fig. 4 also shows the manner in which the relays are mounted on the plate 6. Figs. 2 and 3 show the bulk and yard goods jack by means of which the bulk and yard goods register is connected to the transmitter.

The operation of the transmitter is as follows: The cashier places the cards 46, 47, and 48 in their respective positions and then operates the handle 29 to close the transmitter. The bracket 61 enters through a slot in the casing 2 and closes springs 65, thereby actuating the hold magnet 66 to cause armature 63 and catch 67 to lock the transmitter in closed position. At the same time the transmitter was being closed the print bars 74 are being moved to their set positions by means of cam 58, lever 70, and spring 72. The rotary distributor and switch are then operated to transmit, and after transmission the print magnet 82 is energized to operate release magnet 91 and to trip the print bars by means of lever 78. Directly after this operation the release magnet 91 is operated to release the catch 67 to open the transmitter.

*Mechanical description of transmitting distributor*

Referring now to the transmitting distributor shown in detail in Figs. 6 to 10, inclusive, the motor 630 is mounted on a base 690 by means of machine screws. The base 690 is a cast metal base having projections 680 for mounting the transmitting contact spring assembly bar 664 and the receiving contact spring assembly 661—662. The projection 681 is provided for the jack assembly 655; the raised portion 682 is provided for mounting the start-stop magnet 631; and the projection 653 provides the bearing support for the shaft 652.

On the left end of the motor shaft 625 is mounted the governor assembly comprising a fiber disc 633, upon which is mounted brackets 634, 635, and 636 on the left side, while on the right side of the disc 633 are mounted two conducting rings 627 and 629. The bracket 636 is conductively connected to the conducting ring 627 while the bracket 635 is conductively connected to the conducting ring 629. As shown in Fig. 10 the lower part of the armature 640 is secured by means of a short flexible spring to the bracket 635 while the contact on the upper part engages the adjustable contacts 639 on the bracket 636. Tensioning spring 638 is pivotally fastened to the center of the armature 640 and to the adjusting machine screw and nut 637 held by the bracket 634. The motor circuit extends by way of the brushes 626 and 628, conducting rings 627 and 629, brackets 635 and 636 to the armature 640 and contacts 639. The disc 633 is rotated by the motor 630 and the armature 640 by means of centrifugal force opens the circuit of the motor at contacts 639 at a predetermined speed dependent upon the tension applied by spring 638. A metal worm gear 626 is secured to the right end of motor shaft 625. The gear 626 meshes with the fiber gear 650 mounted on shaft 652 rotatable in the bearing assembly 653. On the other end of shaft 652 is mounted a worm gear 654 which meshes with the fiber gear 656 which is securely fastened to shaft 660 by means of the gear hub 657. The shaft 660 rotates in the bearing and bearing cap assemblies 658 and 659 mounted in the projections 680. A timing disc 687 as shown in Fig. 7 rotates with the shaft 660. A flanged clutch collar 672 is secured to the shaft 660 by means of a set screw. Adjacent to the clutch collar 672 is a felt washer 670 wchih causes the cam shaft 691 to rotate with the shaft 660 when the start magnet is energized to withdraw the armature 632 from the start-stop cam. The cam shaft 691 comprises a hollow cylinder having flanges 671 at both ends. The cam shaft 691 has portions cut away, such as indicated by cams 1 to 6, inclusive, in Figs. 7, 8, 9, and 16, in which the L-shaped fibers attached to the springs ride to close the spring contacts. The number 1 cam is shown in Fig. 8, while the start, 4, 5, 6, rotary, and interrupter cams are shown in Fig. 7. Fig. 9 shows a somewhat enlarged section of the INT. CAM. The shaft 660 is threaded to permit the lock nut 665 and clutch adjusting nut 666 to be secured to the right or left to adjust the tension on the clutch pressure spring 667 which is located between the adjusting nut 666 and the keyed washer 668. Adjacent to the keyed washer 668 is the clutch collar 669 which with the washer 668, spring 667, adjusting nut 666, and lock nut 665 always rotate with the shaft 660. Between the clutch collar 669 and the flange 671 of the cam shaft 691 is a felt washer 670 which permits slippage when the start magnet is in deenergized position with its armature 632 engaging the catch on the start-stop cam. The adjusting nut 666 is screwed to the left to tension the pressure spring 667 so that the cam shaft 691 rotates with the shaft 660 without slippage when the armature 632 is attracted to release the cam shaft and also to allow the cam shaft 691 to be held against rotation by the armature 632 without too much friction. From the foregoing the motor 630 rotates the shaft 660 through the previously described gearing and as long as the armature 632 of the magnet 631 is in its retracted position the cam shaft 691 remains stationary while the shaft 660 rotates. As soon as the armature 632 is attracted, the cam shaft 691, due to the friction clutch arrangement, rotates with the shaft 660 to cause the cams to operate the springs in a predetermined sequence as will be more fully described hereinafter. The transmitting spring assemblies 600 to 606, inclusive, are mounted on the bar 664, which is fastened to the projections 680 by means of machine screws. The receiving or checking spring assemblies 611 to 618, inclusive, are mounted on the bar 662 which is fastened to the adjusting brackets 661. The projections 680 have slotted openings 663' through which the machine screws 663 extend to secure the brackets 661 when the spring assembly has been oriented to the proper location to receive the incoming checking signals at the proper time. The upper spring at each spring set has an U-shaped piece 694 riveted to it upon which the L-shaped fiber 693 is fastened. The L-shaped fibers 693 ride on the cam shaft normally separating the spring contacts until the fibers 693 ride in the cam or cut-out section. The flat bar 695 in each spring set has a threaded and slotted opening through which the adjusting screw 692 extends for adjusting the make and break of the contact springs. This transmitting distributor is permanently wired as a complete unit with the external electrical connections terminating on the jacks 7 and therefore forms a unitary structure which may be readily removed and replaced in the transmitter in the manner shown in Fig. 4.

*Mechanical description of the receiving distributor*

Referring now to Figs. 12 and 13, the receiving distributor is constructed substantially the same as the transmitting distributor having, however, a synchronous motor 1030 for driving the shaft 1060 by means of worm gears. Fig. 12 shows the manner in which the start-stop magnet 1031 is oriented so as to correctly receive the incoming signals. Fig. 13 shows a partial cross section and the manner in which the springs (1000 to 1018 Fig. 20) are mounted. Since the cam shaft 1091 and the clutch arrangement of the receiving distributor is substantially the same as the cam shaft 691 and clutch arrangement shown in Figs. 6 to 8, inclusive, the same is not being fully disclosed. In the receiving distributor two projections 1021 on either end of the base 1020 are provided for mounting the bearing and bearing cap assembly in which the shaft 1060 rotates. The bar 1037 which mounts the upper spring set 1000, 1007, 1008, 1017, to 1006, inclusive, is secured to the projections 1021 by means of machine screws. Two other projections 1022 extending from the base 1020 is provided for mounting bar 1038 which mounts the lower springs 1011, 1012, 1013, 1014, 1015, 1016, and 1018. The two sets of springs are permanently fixed with respect to relation to each other. Slot 1033 is provided in the left-hand projection 1021 to provide orientation for the start-stop magnet 1031 which is fastened to the rotatable bracket 1035 by means of machine screws 1036. The bracket 1035 is rotatably mounted in the bearing and bearing cap assembly in the projection 1021 and is also provided with two threaded holes for the machine screws 1034 which extend through the slot 1033. In order to shift or orient the start stop magnet 1031 the screws 1034 are loosened and then the bracket 1035 and magnet 1031 are rotated to the proper position to give the desired orientation. The magnet 1031 is provided with an amature 1032 having a projection thereon which normally engages the start-stop cam to hold the cam shaft 1091 from rotating while the shaft 1060 is being rotated. When the armature 1032 is attracted by the magnet 1031 the clutch arrangement permits the cam shaft 1091 to rotate with the shaft 1060 without slippage. The spring sets are similar to those prescribed for the transmitting distributor and are operated in the same manner in response to the rotation of the cam shaft 1091.

*Mechanical description of recording punch*

Referring now to Figs. 11, 11—A, 11—B, and 21, the mechanical operation of the Powers punch is preferably somewhat similar to that disclosed in United States Patents Nos. 1,305,557 and 1,680,813, to which reference can be had to details not fully described herein. Generally the feeding means for the cards may be of any suitable construction for successively removing the cards one at a time from a stack and for delivering them to feed rollers. The cards are delivered to the rollers by a block which is operated in relation with the main shaft 1185. The cards delivered from the card magazine enter a passage in the punching unit and abut an automatically operated stop which locates the card in punching position. Fig. 21—A diagrammatically shows the card 1161 in punching position between the idling rollers 1160. The idling rollers 1160 have been slightly changed and are now mounted so that the upper rollers 1160 control a bell crank lever 1114 so that the thickness of the card raises the upper rollers 1160 to operate lever 1114 which in turn allows card check springs 1115 and 1116 to open as shown in Fig. 21—A. When a card is not between the idling rollers 1160 the upper roller drops and causes the lever 1114 to operate and close card check springs 1115 and 1116. This arrangement just described provides a card check arrangement for determining when a card, such as 1161, is in punching position. In case no card is between rollers 1160, then the springs 1115 and 1116 would connect ground to conductors 881 and 883 to busy the punch in a manner to be more fully disclosed hereinafter.

Since the punching mechanism of the Powers punch is well known, it is believed unnecessary to describe the construction and operation other than to state that the setting of the set-up bars, such as 201 Fig. 11—A which control the individual punches is accomplished by the movable carriage which is arranged to travel in a step-by-step escapement movement to successive rows of set-up bars. This carriage is provided with a plurality of plungers corresponding in arrangement and number to a record column on the card, which in the preferred form is made up of twelve record positions. Associated with each of the plungers, somewhat similar to the retract plunger 202 Fig. 11, is a flexible rod 203 which extends to an individual solenoid magnet, such as the magnets numbered 1 to 12, inclusive, and space and retract magnets in Fig. 21. The operation of any one of the solenoid magnets in the Powers punch operates its individual flexible rod 203 and plunger to operate and lock the set-up bar 201 which is at this time directly below this particular operated plunger. The space and retract magnets are also equipped with flexible rods:— the space magnet to operate the universal bar 204 without operating any set-up bars and the retract magnet to operate the retract plunger 202 to in turn release the locked up set-up bars when the carriage is returned to normal.

The standard Powers punch has been slightly altered to cause the punch to perforate a card somewhat similar to a standard Powers 45 column card in code in such a manner as to divide the 45 columns into two fields of 45 columns each. The first field comprising perforating positions 12, 11, 0, 1, 2 and 3, and the second field comprising the perforating positions 4, 5, 6, 7, 8, and 9; it being remembered that in the Powers standard 45 column card the consecutive perforating positions are 12, 11, 0, 1, 2, 3, 4, 5, 6, 7, 8, and 9 from top to bottom. Briefly, this punch operates as follows:—The first operation of the carriage in response to the operation of the first field magnets, such as magnets 12, 11, 0, 1, 2, and 3, cause the set-up bars, such as 201, in the first field to be set and locked in operated position. When the carriage reaches the end of its travel the magnetic clutch 1189 is energized without the operation of the trip magnet 1179 and the retract magnet causes the carriage to return to operating position, in this case, position 30, without restoring the locked set-up bars in the first field. The carriage is thereafter operated step-by-step by the second field magnets, such as 4 to 9, inclusive, to operate the set-up bars 201 in the second field. When the carriage again reaches the end of its travel the trip magnet 1179 and retract magnets are operated to cause the card to be punched in accordance with the locked set-up bars in both fields after which the magnetic clutch is again operated to return the carriage to its first operating position, or position 26. The return of the carriage this time causes all the locked set-up bars in both fields to be returned to their normal positions. The punched card is ejected and a new card is positioned in punching position in a manner similar to that described in Patent No. 1,643,779 issued September 27, 1927 to W. W. Lasker. In the set basket of the Powers punch, the locking plate or bar, such as 62 in Patent No. 1,305,557, has been altered to allow the set-up bars to be divided into two fields. In the present case as shown in Fig. 11—A two locking bars 210 are provided for each row of set-up bars 201, one for the set-up bars 201 in the first field and the other for the set-up bars in the second field. The locking bars 210 are spring actuated and are provided with notches and lugs to enable the lugs to lock any depressed set-up bar in the same manner as disclosed in Patent No. 1,305,557. The left-hand locking bar 210 in Fig. 11—A locks the set-up bars 201 in the first field while the right-hand locking bar 210 locks the set-up bars 201 in the second field in the same row. From the foregoing it can therefore be seen that the set-up bars in either field in the same row can be operated and locked independent of the set-up bars in the other field. Independent release levers 211 are also provided for each locking bar. When the carriage is returned by lug 216 after setting the set-up bars in the first field by the operation of the magnetic clutch the retract magnet is not operated with the result that the plunger 202 is not operated. The lug 216 which is fastened to the tape returns the carriage without raising the lug 215 with the result that lug 215 engages the second stop 214 to stop the carriage in its thirtieth position. In addition, since the plunger 202 is not operated during this return of the carriage, the release roller 212 is not rotated on its pivot 221 and does not engage any of the release levers 211 to operate the locking bars 210. The set-up bars 201 in the first field are therefore maintained energized during the return of the carriage. The second field magnets are now operated to operate the carriage and set-up bars in the second field. Since there are only six punching positions in each row in each field the step-up bars are operated singly and in various combinations in accordance with the code shown in Fig. 21.

After the set-up bars have been operated in the second field the carriage is returned a second time. This time, however, the retract magnet is operated to operate the plunger 202. The operation of the plunger 202 by means of bars 224, and 219 rotate the roller 212 on its pivot 221 so that the roller 212 engages the release levers 211 during the return of the carriage. The roller 212 then operates all of the levers 211 to move the locking bars 210 to the left to cause the release of the locked set-up bars 201. In addition the plunger 202 at 223 raises the arm 218 thereby causing the bar 217 to raise the lug 215 high enough so that the lug 215 this time misses the second stop 214 and moves to the first stop 213 during the second return of the carriage. The carriage is then stopped by stop 213 in its twenty-sixth position. Mounted on the movable carriage of the punch are a pair of springs 1110 which are operated by the universal bar 204 which in turn is operated whenever any one of the solenoid magnets operates its individual plunger. An auxiliary universal bar 204' is also mounted on the punch and is arranged to be operated whenever any one of the magnets except the #3, #9 and the retract magnets are operated. This auxiliary universal bar has notches cut in it opposite the plungers of the #3, #9 and retract magnets so that the upper arm of these plungers cannot operate this bar. This bar operates springs 1111 shown in Fig. 21. Another set of springs 1118 and 1119 have been mounted on the punch and are normally arranged to be opened when the carriage of the punch is in its twenty-sixth position or, in this case, the first punching position, and when the carriage is returned to its thirtieth position for controlling the set-up bars in the second field. When the carriage steps from its twenty-sixth position to the twenty-seventh position, the springs 1118 and 1119 operate to prepare circuits to be disclosed more fully hereinafter. Springs 1112 are arranged to close immediately the carriage has stepped to the forty-second position and springs 1113 are arranged to close after the carriage has stepped from the forty-second position.

All of the Powers punches are arranged to be returned only to their twenty-sixth and thirtieth positions because the cards are arranged to be punched in accordance with the invention in only the twenty-sixth to the forty-second columns in the first field and from the thirtieth to the forty-second columns in the second field. Each morning before the department store opens, the attendant in the central records room will operate the set up bars to control the punch to punch the date on each of the cards. Since the date is set up on the set-up bars prior to the twenty-sixth position, and since the carriage is only returned to its twenty-sixth position, the date set up will not be wiped out, and, therefore, the date will always be punched on all of the cards until the date set up is changed by hand. When the trip magnet 1179 energizes, said magnet at armature 1180 permits the tensioned spring 1192 to rotate the flange 1194 into engagement with the rotating flange 1195. The spring 1192 turns the flange 1194 upon its thread so that the flange 1194 engages the rotating flange 1195, thereby causing the shaft 1185 to rotate the entire shaft assembly. It might also be stated that the rotation of the shaft 1185 causes the card in the punch to be perforated in accordance with the pins or set up bars which have been set and locked responsive to the operation of the various magnets, as previously described. After the card has been punched, the cam 1184 closes a circuit between wipers 1182 and 1183 for energizing the carriage-return relay 1122. A circuit may also be traced through the springs 1182 and 1183 to the magnetic clutch 1189. Due to the energization of the magnetic clutch 1189, the magnetic clutch is held in engagement with the rotating disc 1190, thereby causing the clutch to wind up the tape 1187 to cause the carriage of the punch to be returned to its twenty-sixth position, at which point the springs 1118 and 1119 are operated. The return of the carriage to normal position causes all of the set-up bars which have been locked operated to be returned to their normal positions, the punched card to be ejected into a card hopper, and a new card to be positioned in the punching position in a manner similar to that described in Patent No. 1,643,779, issued September 27, 1927, to W. W. Lasker. The operation of the carriage-return relay 1122 at armature 1127 opens the circuit to the trip relay 1179, thereby permitting the latter relay to drop its armature 1180 in the path of the rotating pin 1193.

The two shafts 1196 and 1185 continue to rotate until the pin 1193 strikes the armature 1180 which causes the screw flange 1194 to screw away from and disengage from the flange 1195. Due to the construction and the weight of the shaft 1185, the shaft 1185 rotates a little further, or only a sufficient distance, to tension the spring 1192 so that it may again operate the flange 1194 when the trip magnet 1179 is again actuated. All of the apparatus of the punch is now in normal position and may now be used for punching a different card, it being understood that a new card has been positioned in punching position in the manner previously described and in the manner described in the aforesaid Lasker patent.

It should possibly be mentioned at this time that a Powers Printing Tabulator is mounted above each punch, as shown in Fig. 1, and that the tabulator head of the Powers printing tabulator has a set-basket somewhat similar to the set-basket in the punch. When the punch magnets operate their plungers to lock up the set-up bars in the punch set-basket, these magnets also operate the set-up bars in the set-basket of the tabulator head to cause the Tabulator to both print and tabulate. Since this Powers printing tabulator is not part of the present invention the same is not disclosed and described.

*Mechanical description of the authorizing printer*

Referring now to the electromatic printer shown in Fig. 27 and in Fig. 27—A, the electromatic printer comprises a motor-driven typewriter such as disclosed in the aforementioned publications entitled "Product Engineering" for November, 1930, and in the publication "The Story of Electromatic", published by the Electromatic Typewriters, Inc., Rochester, New York. During the time the electromatic printers are in use, the small electric motors for controlling the same are in constant operation and are constantly operating the soft rubber roller, such as roller 1729, shown in Fig. 27—A. In order to operate the electromatic printers in this case, magnets 1 to 10, inclusive, OK and reject magnets are added to control the key bars. In Fig. 27—A magnet 9 operates its armature 1726 to in turn actuate the key bar 1727. This results in bringing the cam 1728 into contact with the rotating roller 1729. Cam 1728 instantly turns through one-half revolution, and, in so doing, actuates the type bar 1731 to print the numeral 9. Each cam, such as 1728, is pivoted at one end of a bell crank, forming part of the linkage it operates. Normally, a stop holds each cam a few thousandths of an inch out of contact with the roller surface, but when the magnet corresponding to a given cam is operated a spring forced the serrated surface of the cam against the soft rubber surface of the roller and the two rotate together without slippage. In so doing, the cam pivot and the link to which it is attached are forced away from the roller. It is this motion, for which the motor supplies the power, that actuates the type bar. Since the mechanical construction of the electromatic printer is not part of this invention, it is believed that this general description of its operation will suffice. Any further details regarding the mechanical operation of this type of printer may be had by referring to the aforesaid publications. All the letter type bars of this printer have been removed and only the numeral type bars 0 to 9, inclusive, and two other type bars, one having the letters OK thereon and the other having the letters RE thereon, remain, because only these type bars are used in the present invention. The electromatic printer shown in Fig. 27 is provided with a contact 1775 which is closed by the bar 1776 when the carriage of the printer reaches its seventeenth position. The closure of springs 1775 causes the energization of the carriage-return magnet to cause the carriage to be returned to its original or initial position and to space the paper in the well-known manner. Springs 1752 are normally open when the carriage of the printer is in its normal position and close as soon as the carriage moves in its first step. Springs 1751 are closed during the printing of each character. These springs are closed by a bar which is operated when any type bar is operated. The carriage of the printer moves one step whenever any type bar is actuated and also automatically steps or spaces when the carriage reaches its fourth, eighth, twelfth, and fifteenth positions. Briefly the tabulator bar in the printer has tab stops which engage arms provided with a toggle catch to cause the carriage to automatically space in such positions. Fig. 27—B shows the printed record made by this printer indicating the customer's number, the sales price of the article to be charged, and whether the authorization clerk has approved the sale by the O. K. type or rejected the same by the RE type.

With the foregoing general description of the mechanical operation of the apparatus involved in this system, it is believed that we may now proceed with the detailed circuit descriptions.

*Wiring description of the transmitter*

Referring now to Fig. 14, the small circles shown near the lower left of the drawings indicate the contact pins 43, shown in Figs. 2 and 5. The various vertical rows of pins 43 are numbered 1 to 10, inclusive, and 22 to 31, inclusive, above the upper horizontal row. In the left-hand vertical row, or row 17, the lower pin is electrically connected, as shown, to the pin in the third horizontal row, and is also connected by a conductor included in cable 430 to jack terminal #5 of the bulk and yard goods jack shown at the extreme left and to the seventeenth bank contact accessible to wiper 445 of the switch S, which is also shown in Fig. 4. In a similar manner, in the left-hand vertical row, the pin second from the bottom is electrically connected by a conductor included in cable 431 to the bulk and yard goods terminal #10 and to the seventeenth bank contact accessible to the wiper 447 of the switch. In a similar manner, the pin third from the bottom in vertical row 17 is connected by a conductor included in cable 432 to the seventeenth bank contact accessible to wiper 449 of the switch. The pins in vertical column 13 are connected over cables 430, 431, and 432 to the thirteenth bank contacts accessible to wipers 445, 447, and 449, respectively, and to the bulk and yard goods jacks 1 and 6. All of the pins in vertical row 1 are connected in a similar manner by conductors included in cables 435, 436 and 437 to the first set of bank contacts accessible to wipers 445, 447 and 449 of the switch. All the remaining vertical columns are multipled and connected in the same manner and terminate in the bank contacts accessible to the wipers of the switch. The wipers of the switch S rotate in the direction of the arrows and wipers 445, 447, 449, 451, and 453 engage their respective bank contacts on the first twenty-five steps of the switch after which such wipers on the twenty-sixth step are disengaged therefrom while the wipers 444, 446, 448, 450, and 452 engage with their respective bank contacts on the twenty-sixth to fiftieth steps.

The pins shown on the extreme right, designated 45 are connected by individual conductors in cable 404 to individual terminals in the bulk and yard goods jack and to spring contacts 601 to 606, inclusive, shown in Figs. 6 and 16. The upper and lower pins 45 being additionally connected in the switch bank as shown.

The grounded terminal of the battery is connected to springs 95 and ground is therefore connected to the transmitter circuits shown in Figs. 14 and 15 by the dotted line. In case the key assembly 27 is operated to open springs 95 then ground is entirely removed and the transmitter is out of service.

Referring to Figs. 16 and 20, it will be noted that each cam is shown separate but it will be understood that the cams are one large cam, as shown in detail in Figs. 6, 7, 8, and 9. The cams all rotate at the same time in the direction of the arrow and operate the different springs in the time sequence shown. Keeping in mind that the similar reference characters throughout the drawings correspond to similar apparatus, the detailed description will be proceeded with.

*Circuit description of cash sale*

It will now be assumed that the key assembly 27 has been operated and that the transmitter is ready for operation. Responsive to a sale, the cashier places the merchandise card 46, the cashier's card 47, and the sales clerk's card 48 in the transmitter as shown in Fig. 5. The pins 110 to 117, inclusive, are card check pins which have circuits closed thereto by movable pins 38 under certain conditions.

Responsive to the closure of the transmitter the bracket 61 extends through the opening in the casing 2 to operate and close the start spring 65. Since a merchandise display card 46, a cashier's card 47, and a clerk's card 48 have been placed in the transmitter, circuits through the card check pins 110, 114, and 116 are closed. A circuit may now be traced from ground at springs 95, conductor 421, start springs 65, card check pin 116, movable pin 38 in contact with card check pin 116, over the metal strip 37 through the movable pin in engagement with card check pin 110, conductor 459, jack terminal 34, jumper 462, jack terminal 35, conductor 402, armature 549, armature 558, and through the winding of error relay 502, and the resistance to battery. Relay 502 energizes over this circuit. Another branch of this circuit may be traced from conductor 402 and through the lower or polarizing winding 3 of line relay 508 for preparing this relay for operation. Another circuit may also be traced at this time from the grounded strip 37, pins 38 and 14, conductor 406, and through the lower winding of the card check relay 511 and resistance 571 to negative battery. Card check relay 511 due to the copper slug on its upper end is energized over the above-traced circuit to close its armature contacts a short interval of time after relay 502 is energized. It can readily be seen that if the clerk's card 48, for instance, has been left out, a circuit would have been closed through the card check springs 117 by way of conductor 493 to the card check relay 511, thereby short-circuiting the card check relay to prevent its operation. It will also be noted that a similar circuit will be closed through card check pins 112 and 115 in case either the merchandise card 46 or the cashier's card 47 is omitted.

It may be seen that in case the merchandise card should be inserted incorrectly in its compartment of the transmitter the card check holes in this card will not line up with the card check pins, and, therefore, no circuit is closed for error relay 502 or the polarizing winding of line relay 508. It may also be seen that in case either the cashier's card or the clerk's card should be inserted incorrectly in the compartments of the transmitter, the card check holes in the various cards will not line up with the card check pins, and, therefore, no circuit is closed for the card check relay 511. It will be seen later that no circuit will be completed for the hold magnet 66 in case the cashier's card is inserted incorrectly. Responsive to the closing of the transmitter the type bars 74 are set in the position diagrammatically shown in Fig. 14, and the pin 87 on the first type bar 74 is operated to open springs 88.

Relay 502, upon energizing over the above-traced circuit, at armature 515 prepares a point in the circuit for energizing the distributor start-stop motor magnet 631; at armature 516 closes its own locking circuit through the resistance 513 and armature 514 to grounded conductor 402; at armature 517 prepares a point in the circuit of the print magnet 82; at armature 518 prepares a point in the circuit for the hold relay 506; at armature 519 prepares a locking circuit for the start relay 505; at armature 520 opens a point in the buzzer and lamp signal circuit; and at armature 521 opens a point in the circuit extending to the signal relay 504. Card-check relay 511, upon energizing over the above-traced circuit, at armature 568 prepares a point in the energizing circuit of authorizing relay 509; at armature 569 prepares the circuit for the recording relay 510; at armature 570 prepares a point in the locking circuit of the authorizing relay 509; at armature 572 connects grounded conductor 402 to conductor 429 to energize the hold magnet 66 in Fig. 14; at armature 573 prepares the circuit of the start relay 505 and to provide a ground connected from grounded conductor 427 for later controlling the error-check relay 501; and at armature 574 connects grounded conductor 427 to conductor 407.

The circuit for energizing the hold magnet 66 may be traced from grounded conductor 402, armature 572, conductor 429, springs 93, and through the winding of the hold magnet 66 to battery. Hold magnet 66, upon energizing, closes springs 89 and 90 and inserts the lug 64 into the hole 62 to lock the transmitter in closed position. The lever 61, due to the operation of armature 63, falls down and holds the armature 63 in operated position until the release magnet 91 is energized. In case the card-check relay 511 did not operate for the reasons previously described, the circuit to the hold magnet 66 would not be completed and the transmitter would not, therefore, be locked and would instantly open to inform the cashier that some error or omission had been made in inserting the card in the transmitter. When the hold magnet 66 operates its armature 63 to close springs 89 and 90, a circuit can be traced for energizing either the recording relay 510 or the authorizing relay 509, dependent upon whether the cashier's card is inserted in the transmitter or whether a customer's charge card is inserted in the transmitter in place of the cashier's card. Since this is a cash sale, the cashier has placed her card in the transmitter and therefore the recording relay 510 is energized over the following circuit: from grounded start springs 65, pin 116, pin 38, metal strip 37, pin 38, and pin 114 to conductor 406, armature 569, conductor 424, springs 89, conductor 425, armature 552, and through the upper winding of recording relay 510 to battery. If this particular sale has been a credit or charge sale, the customer's card instead of the cashier's card would have been placed in the transmitter and therefore a circuit would have been completed from start springs 65 over the previously traced circuit to pin 113 and conductor 405 and from thence by way of armature 568, conductor 423, springs 90, conductor 426, armature 563, and through the lower winding of authorizing relay 509 to battery. In a cash sale the circuit is not completed by way of pin 113 with the result that in this case the circuit to relay 509 is not completed.

Recording relay 510, upon energizing, at armature 557 opens a point in the restoring circuit of the switch S; at armature 558 opens the original energizing circuit of relay 502 but this relay is now locked energized over its previously traced locking circuit; at armature 559 and 560 prepares points in the circuit of the switching relay 507; at armature 561 grounds conductor 408 and the nineteenth bank contact accessible to wiper 451; at armature 562 prepares a point in the circuit for energizing the print magnet 82; at armature 563 opens the circuit to the authorizing relay 509; at armature 564 locks itself through its lower winding to the grounded conductor 402; at armature 565 prepares a locking circuit for the switching relay 507; at armature 566 completes a circuit for energizing the line relay 701 (Fig. 17) of the plunger line switch; and at armature 567 connects the line conductor 581 to the operating winding 1 of the line relay 508. The circuit for energizing the line relay 701 of the plunger line switch may be traced as follows: from grounded conductor 427, armature 574, normally closed springs controlled by armature 523, resting contact of armature 530 and said armature, conductor 407, through start springs 600 controlled by the start cam shown in Fig. 16, conductor 578, resistance 528, working contact of armature 566 and said armature, conductor 582, springs 706, and through the upper winding of the line relay 701 to battery. At armature 703 relay 701 opens a point in the "Out chain" circuit and also closes an energizing circuit through the upper winding of plunger magnet 702; and at armature 704 completes an energizing circuit through the lower winding of the plunger magnet 702. Magnet 702, upon energizing, operates its armature 707 to cause the plunger to plunge into its bank and close springs 708 to 711, inclusive, and to separate springs 705 and 706 to open the energizing circuit of line relay 701. Due to the copper slug on line relay 701 the relay is rendered both slow to energize and slow to release so that the plunger magnet 702 will be maintained in operated position until ground is fed back from the relay group associated with the rotary secondary line switches. Responsive to the closing of springs 708 a circuit is prepared for maintaining the magnet 702 in operated position and to ground conductor extending to the master switch to cause the master switch to preselect another idle plunger line switch in the well-known manner. At springs 709 ground is connected to armature 742; at springs 710 the line conductor 582 is connected to the upper winding of line relay 723; and at springs 711 the line conductor 581 is connected to the lower winding of line relay 723.

Selection of an idle recording trunk

Since ground is connected to conductor 582 a circuit may be traced for energizing the line relay 723 as follows: from grounded line conductor 582, plunger springs 710, armature 744 and its resting contact, and through the upper winding of line relay 723 to battery. In case of a charge sale the line conductor 581 would have been grounded instead of conductor 582 and the line relay 723 would have been energized by way of springs 711, armature 743, armature 747 and its resting contact, and through the lower winding of line relay 723 to battery. At armature 748 relay 723 opens a point in the circuit of relay 721; at armature 749 opens a point in the locking circuit of relay 721 and at its working contact connects ground through the lower winding of magnet 702 by way of springs 728 and 708 in order to maintain magnet 702 in energized position after relay 701 deenergizes to open the circuit of magnet 702 at armature 704. At armature 750 relay 723 completes a circuit for energizing the recording relay 725 as follows: from grounded line conductor 582, springs 710, armature 744 and its resting contact, springs 750 and through the upper winding of recording relay 725 to battery. At armature 751 relay 723 prepares a circuit for the authorizing relay 726 but since the conductor 581 is not grounded at this time the authorizing relay 726 is not at this time energized. At armature 752 relay 723 closes an obvious circuit for energizing relay 724. Relay 724, upon energizing, at armature 753 grounds the holding conductor 791; at armature 754 prepares a point in the circuit for operating the stepping magnets 734 and 774; and at armature 755 prepares a circuit for chain relays 713 and 714. Recording relay 725, upon energizing, at armature 756 removes one of the ground connections from the all-trunks-busy conductor 778 in order to permit the deenergization of the all-trunks-busy relay (not shown) when all of the trunks are in use; at armature 757 prepares a point in the circuit for connecting the line conductor 582 to the line wiper 732; at armature 758 completes a locking circuit for itself through its lower winding extending from grounded conductor 791 by way of the normally closed springs controlled by armature 742; at armature 759 connects up the test wiper 733 to the stepping magnet 734 by way of armatures 746, 754, and 760, and to the test relay 714 by way of armatures 746, 755, and 761; and at armature 752 prepares a point in the circuit for connecting the line conductor 581 to the line wiper 731.

The operation at this time depends upon whether the wipers of the recording switch RS are connected to a busy trunk or not. If the trunk is busy, then conductor 783 is grounded, with the result that the test relay 714 is short circuited as follows: from grounded release trunk conductor 783, associated bank contact and wiper 733, armature 759, armature 746 and its resting contact, armature 755, armature 761, through the lower winding of test relay 714, armature 737, through the chain circuit comprising armatures similar to armature 737 on the other recording test relays (not shown) and through the armature 740 to ground. A branch of this circuit extends from armature 746 by way of armatures 754 and 760 to the interrupter springs 735 and through the winding of the recording stepping magnet 734 to battery. Stepping magnet 734 energizes over this circuit and near the end of its stroke operates the interrupter springs 735 to open its own energizing circuit. Stepping magnet 734, upon deenergizing, steps the wipers 731, 732, and 733 one step and closes its interrupter springs 735 whereupon if the wiper 733 again engages a grounded bank contact of a busy trunk the test relay 714 is again short circuited and the motor magnet again energizes to step the wipers another step. The stepping magnet 734 therefore operates in the manner of a buzzer to step the wipers step by step until the wiper 733 no longer finds a grounded bank contact. When wiper 733 stops on a non-grounded contact, or in engagement with the test contact of an idle trunk, the recording test relay 714 is no longer short circuited and therefore energizes in series with the stepping magnet 734 as follows: From grounded armature 740, through the armatures such as armature 737 on the recording test relays (not shown), through the lower winding of recording test relay 714, armatures 761, 755, 754, and 760 to the interrupter springs 735 and winding of the stepping magnet 734 to battery. Due to the high resistance of the lower winding of relay 714, stepping magnet 734 does not energize over this circuit. At armature 736 relay 714 locks itself to grounded conductor 791 independent of its original energizing circuit through its lower winding; at armature 737 opens a point in the chain circuit and a point in its original energizing circuit; and at armature 738 and its resting contact disconnects the recording chain conductor 788 and at its working contact completes a circuit for energizing relay cut-through 722 as follows: from grounded armature 780 and its resting contact, through the dotted chain conductor 790 and armatures similar to armature 738, armature 738 and its working contact, conductor 786, and through the upper winding of relay 722 to battery. Cut-through relay 722, upon energizing, at armature 744 and its resting contact opens the circuit of relay 723 and at its working contact connects the line conductor 582 to the line conductor 782 by way of wiper 732. At armature 745 relay 722 completes a locking circuit through its lower winding by way of the normally closed springs controlled by armature 742 and grounded hold conductor 791; at armature 746 and its resting contact disconnects the test wiper 733 from the stepping magnet 734 and at its working contact connects the hold conductor 791 to the test wiper 733 in engagement with the trunk conductor 783; and at armature 747 and its resting contact disconnects the lower winding of relay 723 and at its working contact connects the conductor 581 to the line conductor 781 by way of wiper 731. Relay 723, upon deenergizing, at armature 750 opens the original energizing circuit of relay 725 which, however, is maintained energized from grounded hold conductor 791 by way of its lower winding and at armature 752 opens the circuit of the slow-to-release relay 724. Relay 724 is rendered slow to release so as to maintain the hold conductor 791 grounded at armature 753 for a sufficient time to permit ground to be returned back over conductor 783.

Referring now to Fig. 18 it will be noted that the slow-to-release guard relay 810 is normally energized when the apparatus is in normal position over the following circuit; from ground by way of the normally closed springs controlled by armature 838, armature 840 and its resting contact, through the winding of guard relay 810, start conductor 876, start springs 1000 controlled by the start cam, and thence through the winding of the start-stop magnet 1031 to battery. The guard relay 810 alone is energized over this traced circuit and the start-stop magnet 1031 does not energize because of the high resistance of relay 810. It should be noted that whenever the punch shown in Fig. 21 is in an off-normal position the off-normal springs 1118 grounds the test conductor 883 and whenever the toggle busy switch 1117 is operated the conductor 883 is also grounded. Also, the card-check springs 1116 grounds conductor 883 whenever a card, such as card 116, is not between the idling rollers 1160. Whenever the conductor 883 is grounded the conductor 783 is grounded by way of armature 815 and its resting contact to make this recording trunk busy to the rotary line switches RS having access thereto.

Returning now to the time when cut-through relay 722 energized to connect the line conductors 581 and 582 to conductors 781 and 782 and grounds the conductor 783 a circuit may now be traced from the grounded trunk conductor 783 for energizing the polarizing winding of line relay 807 and for energizing the switching relay 908 as follows: from grounded conductor 783, resting contacts of armature 814, and through the No. 3 or polarizing winding of line relay 807 to battery. The circuit for energizing switching relay 908 extends from grounded conductor 783 by way of armature 815 and its resting contact, conductor 883, normally closed springs controlled by armature 834, armature 829 and its resting contacts, conductor 871, and through the winding of switching relay 908 to battery. The energization of the polarizing winding 3 of line relay 807 prepares the relay so that it will quickly operate its armature when a circuit is completed through its operating winding No. 1. This relay is somewhat similar to the relay disclosed in the H. C. Pye application, S. N. 601,114, filed March 25, 1932, and is provided with a polarized winding 3, an operating winding 1, and a bucking winding 2 which opposes and neutralizes the winding 1 to kick the armature down or back to its normal position when the circuit through winding 1 is open. Switching relay 908, upon energizing, at armatures 971 to 976, inclusive, prepares circuits for grounding certain of the conductors included in cable 992 extending to the solenoid magnet of the punch shown in Fig. 21. The operation of relay 722 also connected the ground line conductor 582 to conductor 782 whereby a circuit may be traced through armature 819 and its resting contact and through the operating winding 1 of line relay 807 to battery. Responsive to this latter circuit the line relay 807 operates its armatures and at armature 835 prepares a circuit to the interrupter cam springs 1018 by way of conductor 873; at armature 836 closes a circuit to its bucking winding 2 which just balances the winding 1 but allows the polarizing winding to hold the relay operated; at armature 838 opens the circuit of the guard relay 810 and closes a circuit for energizing relay 809 as follows: from the working contact of armature 838 and said armature, armature 839 and its resting contact, normally closed springs controlled by armature 844, and through the winding of relay 809 to battery. Relay 809, upon energizing, at armature 842 disconnects ground from conductor 875; at armature 843 completes a circuit for energizing the hold relay 808 by way of armature 838; at armature 844 completes a locking circuit for itself extending by way of conductor 872, armatures 986 and 985 to the grounded conductor 883; at armature 845 prepares a point in the energizing circuit of relay 805; and at armature 846 connects the transfer relay 804 to conductor 885.

Hold relay 808, upon energizing, at armature 839 closes a circuit for itself independent of armature 843 and opens the original energizing circuit of relay 809 which is now held energized over conductor 872, and at armature 840 opens a further point in the circuit of guard relay 810 and prepares a circuit for the start-stop magnet 1031 of the receiving distributor shown in Fig. 20. The resistance 808' is connected across the winding of relay 808 to make the relay slow to release so that the relay is held energized during the intermittent operation of the line relay 807. At armature 841 relay 808 connects ground to conductor 883 before the slow-to-release relay 724 has had time to fall back and disconnect ground from conductor 783. Magnet 702 and relays 714, 722, 725, 809, and 908 are now held energized from grounded conductor 883.

A short interval after relay 723 deenergizes the slow-to-release relay 724 deenergizes to remove ground at armature 753 from conductor 791 which at this time is grounded by way of conductors 883 and 783 and at armatures 754 and 755 opens the circuit to relay 714 which now deenergizes to establish the chain circuit to allow other recording switches to switch through. Start relay 810 deenergizes after an interval and at armature 848 also connects ground to conductor 883. At armature 847 relay 810 completes a circuit for energizing the transmitter line relay 508 as follows: from ground by way of the cam springs 1008, conductor 875, resting contacts of armatures 820 and 830, armature 824, normally closed springs controlled by armature 817, armature 847, conductor 781, bank contact and wiper 731, armature 762, working contact of armature 747 and said armature, armature 743, plunger springs 711, conductor 581, armature 567 and its working contact, resistance 541, and through the operating winding 1 to negative battery.

The transmitter line relay 508, upon energizing, at armature 545 completes the circuit from grounded conductor 402 for energizing the bucking or balancing winding 2 of line relay 508 with the result that the line relay is now held in operated position by the polarizing winding alone. At armature 544 relay 508 connects ground to the lower winding of the error-back relay 501 by way of armature 573 and at armature 543 completes a circuit for energizing the hold relay 506 from grounded conductor 427 by way of armature 518. The resistance 506' is bridged across the winding of the hold relay 506 to make the relay slow-to-release so that it will be maintained in energized position during the intermittent operation of line relay 508. Hold relay 506, upon energizing, at armature 533 opens a further point in the circuit of the release magnet 91; at armature 534 completes a circuit for grounding conductor 575 to start the motor 630 of the transmitting distributor and for energizing the slow-to-operate start relay 505; and at armature 535 opens a point in the signalling circuit. The circuit for energizing the start relay 505 extends from grounded conductor 427, armature 573, armature 534, through the normally closed springs controlled by armature 531 and through the winding of start relay 505 to battery. The circuit for operating the motor 630 also extends from grounded conductor 427 over the previously traced circuit for relay 505 and thence by way of conductor 575 and through the windings 620 and 621 to negative battery. The distributor motor 630 operates the shaft 660 shown in Fig. 6 without operating the cam shaft 691 represented by the cams shown in Fig. 16. The governor armature 640 regulates the speed of the motor 630 by including the resistance 622 in the motor circuit. Start relay 505 is a slow-to-operate relay and operates an interval of time after the motor 630 is started and at armature 531 completes a locking circuit for itself and for maintaining the circuit to the motor 630 closed as follows: from grounded conductor 427, armature 573, armature 519, armature 531 and its working contact, and through the winding of start magnet 505 to battery and from thence by way of conductor 575 to the motor 630. At armature 532 relay 505 completes a circuit for energizing the start-stop magnet 631 as follows: from grounded conductor 427, armatures 573, 534, 532, 539 and its resting contact, conductor 413, the first or No. 1 bank contact engaged by wiper 451 and said wiper, conductor 414, armatures 515 and 525, conductor 416, interrupter springs 454, conductor 415, and through the winding of the start-stop magnet 631 to battery. Start-stop magnet 631, upon operating its armature 632, releases the start-stop cam to permit the cam shaft 691 or the cams shown in Fig. 16 to rotate in the direction indicated by the arrow.

By the rotation of the start cam the start springs 600 are operated to disconnect the grounded conductor 407 from the transmitting conductor 578 with the result that ground is now disconnected from the conductors 582, 782, and from the operating winding 1 of the line relay 807. Relay 807 very quickly deenergizes because the bucking winding 2 overcomes the magnetic effect of the polarizing winding 3 to kick the relay down and release its armatures. At armature 838 line relay 807 completes a circuit for energizing the start-stop magnet 1031 of the receiving distributor shown in Fig. 20 as follows: from ground through the normally closed springs controlled by armature 838, armature 840 and its working contact, start conductor 876, through the start springs 1000, and through the winding of the start-stop magnet 1031 to battery. Magnet 1031 operates its armature 1032 to release the recording receiver cam shaft with the result that the cams shown in Fig. 20 are now started in operation. The motor 1030 shown in Fig. 20 is continuously operated from a source of alternating current and is a synchronously operated motor for rotating the cams at a predetermined speed. The transmitting distributor shown in Fig. 16 and the receiving distributor shown in Fig. 20 now operate in synchronism.

*First code transmission*

Since the various cards in the transmitter are punched in code with two perforations per digit, a two-digit code is therefore used in this system. The code is shown in Fig. 14. All of the apparatus is now in position to transmit the first code impulse from the sales room. The transmission of this code is now dependent upon the holes or perforations in the cashier's card in the transmitter. The holes in the card permit the movable pins such as pin 34, to engage the pins 43 to make electrical connections by means of metal strips 33 to the respective conductors included in cable 404 by way of pins 55 and 45. The holes in the card have been diagrammatically represented by heavy full black circles shown in the twenty-five vertical columns in the rows of pins 43 shown in Fig. 14.

In this case since the digit 1 is punched in card 46 in vertical column 1 as shown in full black circles the code 3—5 is to be transmitted for the digit 1. At this time a circuit may be traced for grounding conductors 3 and 5 included in cable 404 as follows: from grounded conductor 427, armature 574, normally closed springs controlled by armature 523, resting contact of armature 530 and said armature, conductor 407, one circuit extending by way of wiper 445 in engagement with its first or No. 1 bank contact, No. 1 conductor included in cable 435, the pin 43 shown third from the top in vertical column 1, movable pin 34, metal strip 33, No. 3 movable pin 55, No. 3 pin 45, to conductor 3 in cable 404 and to the normally open springs 603 and 613; and the other circuit by way of grounded conductor 407, wiper 447 in engagement with its first or No. 1 bank contact, the No. 1 conductor included in cable 436, the second pin from the top in vertical column 1 which is multiplied to the fifth pin 43, or the number 5 pin, movable pin 34, metal strip 33, No. 5 movable pin 55, No. 5 pin 45, to the No. 5 conductor included in cable 404 and to the normally open springs 605 and 615. The conductors 3 and 5 in cable 404 are therefore grounded to permit the cam springs 603 and 605 to ground conductor 578 and the springs 613 and 615 to ground conductor 556 at predetermined times in the rotation of the cam shaft.

As soon as the cam shaft has rotated far enough to allow the rotary cams to close springs 617, a circuit may then be traced for energizing the stepping magnet SM of the rotary switch shown in Fig. 14 as follows: from grounded conductor 427, armatures 573, 519 and 531, conductor 575, springs 617, conductor 418, and through the winding of stepping magnet SM to battery. Stepping magnet SM, upon energizing, at armature 455 opens a point in its own restoring circuit and at armature 454 opens the circuit of the start-stop magnet 631 which falls back to stop the distributor cam shaft after its first revolution.

Since conductors 1 and 2 in cable 404 are not grounded at this time the closure of springs 601, 602, 611, and 612 is without effect. However, when springs 603 are closed by cam 3 a circuit may be traced from grounded No. 3 conductor in cable 404 for energizing the line relay 807 as follows: from the grounded No 3. conductor included in cable 404, sending springs 603, sending conductor 578, resistance 528, working contact of armature 566 and said armature, conductor 582, plunger springs 710, armature 744 and its working contact, armature 757, wiper 732, conductor 782, armature 819 and its resting contact, and through the operating winding 1 to negative battery.

Since the two distributors are now rotating in synchronism, the receiving distributor due to the rotation of its cam shaft has first momentarily separated the lock springs 1007 to unlock the locked-up pick-up relays, such as 901 to 906, inclusive, shown in Fig. 19; has separated the mark springs 1017 to remove marking ground from mark conductor 994, and has separated the start springs 1000 to open the circuit of the start-stop magnet 1031 which now falls back to stop the cam shaft when it has completed one revolution. Springs 1011 and 1018 have also been closed without effect because line relay 807 up to this point has not been energized since the code being transmitted is 3—5 for the digit 1.

When the line relay 807 is energized because the transmitting springs 603 find ground on the No. 3 conductor included in cable 404, the transmitting distributor cam shaft is in a position to close springs 603 and at the same time the receiving distributor cam shaft is in a corresponding position and springs 1013 and 1018 are closed. With the receiver cam shaft in this position and with the line relay 807 energized, a circuit may now be traced for energizing pick-up relay 903 in Fig. 19 as follows: from ground through resistance 850, armature 835, conductor 873, cam interrupter springs 1018, springs 1013, to the No. 3 conductor included in cable 990, and through the upper winding of pick-up relay 903 in Fig. 19 to battery. Interrupter springs 1018 are closed only for a short interval of time to prevent more than one pick-up relay from energizing and it can therefore be seen that only a portion of the impulse received is effective for energizing the pick-up relay. Pick-up relay 903 energizes very quickly and locks up through its lower winding by way of armature 929 to the grounded lock conductor 993. Conductor 993 is grounded from armature 841 by way of armature 823, 849, conductor 874, and lock springs 1007 now closed by the lock arm Pick-up relay 903, upon energizing, at armature 933 grounds the No. 3 conductor included in cable 991; at armature 928 opens one point in the chain circuit including the armatures 921, 928, 936, 943, 949, and 957, and at armatures 930, 931, 932, and 934 prepares circuits for operating the solenoid magnets of the punch shown in Fig. 21.

Due to the rotation of the transmitting distributor cam shaft springs 603 open and springs 604 close. Since the No. 4 conductor in cable 404 is not grounded, conductor 578 is likewise not grounded at this time, with the result that the line relay 807 deenergizes very quickly, on account of the circuit completed through the opposing winding 2 of line relay 807. The line relay 807 is therefore deenergized during the time the receiving distributor cam shaft springs 1014 and 1018 are closed, with the result that no circuit is closed over the No. 4 conductor included in cable 991 for energizing the pick-up relay 904. When the transmitting distributor springs 604 are closed by the cam shaft, conductor 578 is again grounded through the springs 605 from the grounded No. 5 conductor included in cable 404. Line relay 807 is again energized and connects ground to conductor 873 at a time when springs 1015 and 1018 are closed by the receiver cam shaft to close a circuit for energizing pick-up relay 905 by way of the No. 5 conductor included in cable 991. Pick-up relay 905, upon energizing, at armature 935 connects the grounded lock conductor 933 to the No. 5 conductor included in cable 991; at armature 936 removes one of the armatures from the chain circuit; at armature 937 completes a locking circuit for itself through its lower winding from grounded lock conductor 993; and at armature 940 prepares a circuit for energizing the No. 11 solenoid magnet shown in Fig. 21 by way of the No. 11 conductor included in cable 992.

*Transmission check-back*

Before proceeding further with the transmitting description it is believed advisable to explain the check-back description which also takes place during the first revolution of the two cam shafts, it being previously mentioned that transmission and check-back occur on the same revolution of the transmitting and receiving cam shafts. When pick-up relay 903 energizes in response to the first impulse of the transmitted code, said relay 933 closes a circuit for grounding the No. 3 conductor in cable 991 by way of springs 1003 as follows: from grounded armature 841, armatures 823 and 849, conductor 874, through the now closed lock springs 1007, lock conductor 993, through armatures 957 or 949, armatures 943 or 936, armature 921, armature 933 to conductor 3 included in cable 991, through springs 1003 closed by the No. 3 cam, send-back conductor 875, resting contacts of armatures 820 or 830, armature 824, normally closed springs controlled by armature 817, armature 847, conductor 781, wiper 731, armatures 762, 747, and 743, plunger springs 711 to conductor 581, armature 567 and its working contact, resistance 541, and through the operating No. 1 winding of line relay 508 to battery. Pick-up relay 905 energizes in response to the second impulse of the first transmitted code digit and said relay at 935 closes a circuit for grounding the No. 5 conductor included in cable 991 from grounded lock conductor 993 over a circuit similar to that traced. When the receiver cam shaft has rotated far enough to close springs 1005, the send-back conductor 875 is connected to the grounded conductor No. 5 in cable 991 for energizing the line relay 508 over a circuit similar to that just traced. Since the two distributors are rotating in synchronism, it will be remembered that at the time the receiving distributor closes springs 1003 the corresponding springs 613 in the transmitting distributor are likewise closed. Since spring 613 is connected to the No. 3 conductor included in cable 404, then ground is connected over conductor 576 to the upper terminal of the error-check relay 501. When springs 618 close during this checking interval, said springs connect negative battery to conductor 577 and through resistance 512 to both windings of error-check relay 501. When line relay 508 is energized in response to the first pulse of the sent back check code, said relay again connects ground to the hold relay 506 to maintain the latter relay in its energized position, again completes the circuit from grounded conductor 402 by way of armature 545 to the bucking winding 2 of line relay 508; and at armature 544 connects ground to the lower terminal of the lower winding of error-check relay 501 by way of armatures 544 and 573. Now when the interrupter springs 618 are closed to connect negative battery to both windings of the error-check relay 501 by way of conductor 577, both windings of the error-check relay 501 are simultaneously energized, but since the two windings are equal and poled in opposite directions the relay will not operate its spring combination. As previously described, when the receiver cam shaft has rotated to close springs 1005 send-back conductor 875 is again grounded for energizing the line relay 508. Line relay 508 performs the same functions as before and at this time the transmitting distributor cam shaft closes springs 615 to connect conductor 576 to grounded No. 5 conductor included in cable 404. Again when springs 618 connect negative through both windings of error-check relay 501 by way of conductor 577 the differential error-check relay 501 will not energize because the two windings are equal and oppose each other.

From the foregoing it will be seen that in transmitting the first digit or digit 1 the code 3—5 has been transmitted to the receiving distributor which in turn has caused the energization of pick-up relays 903 and 905 and has sent back the same code 3—5 to the transmitting distributor and since the check-back code sent by the receiving distributor agrees with the code transmitted by the transmitting distributor the error-check relay 501 is not operated, thereby indicating correct transmission and receipt of the code. Near the end of the first revolution of the transmitting distributor cam shaft the start springs 600 close to energize the line relay 807 as follows: from grounded conductor 427, armature 574, normally closed springs controlled by armature 523, resting contact of armature 530 and said armature, to conductor 407 extending to start springs 600, and over conductor 578 and the previously traced circuit to the line relay 807 in the receiving distributor. The rotary cam springs also open the rotary springs 617 to open the circuit of the stepping magnet SM in Fig. 14, which now deenergizes and steps the wipers 445, 447, 449, 451, and 453 into engagement with their second bank contacts preparatory to sending the second code.

It should be noted that the pick-up relays shown in Fig. 19 control the chain of contacts 921, 928, 936, 943, 949, and 957 which are part of the check-back arrangement and are so arranged that if certain combinations of relays are energized the grounded lock conductor 993 will not be connected to any of the conductors in cable 991. For example, if relays 903 and 906 are energized during the same code, then the chain circuit to the grounded lock conductor 993 is broken at armatures 921 and 928, with the result that the conductors in cable 991 cannot be grounded. The same is also true of relays 905 and 902, and relays 904 and 901.

Pick-up relay 903, upon energizing, at armature 931 prepares a point in the circuit for energizing the No. 11 punch solenoid magnet and pick-up relay 905 at armature 940 prepares another point in the circuit to this solenoid magnet. When the receiver distributor cam shaft has rotated far enough to close mark springs 1017, a circuit may be traced for energizing the No. 11 solenoid punch magnet as follows: from grounded conductor 883, armature 823, armature 849, conductor 874, mark springs 1017, mark conductor 994, resting contact of armature 953 and said armature, armature 940, armature 931, armature 972, the No. 11 conductor included in cable 992 extending to the No. 11 solenoid punch magnet in Fig. 21, and through the winding of the No. 11 solenoid magnet to battery. The closure of the mark springs 1017 also closes another circuit for energizing relay 911 as follows: from the grounded mark conductor 994, armature 952 and its resting contact, armature 945, and through the winding of relay 911 to battery. At armature 980 relay 911 connects the grounded mark conductor 994 to the upper terminal of the upper winding of differential relay 914. The No. 11 solenoid punch magnet, upon energizing over the above-traced circuit, operates its individual flexible rod 203 and plunger 202 to operate the No. 11 set-up bar in the printing tabulator above the punch and also operates and locks the No. 11 set-up bar 201 in the twenty-sixth column of the set basket so that the card in the punch may later be perforated in the No. 11 hole space in column 26. Due to the operation of the individual No. 11 plunger 202, the universal bar 204 and the auxiliary universal bar 204' are operated. The operation of the universal bar 204 operates springs 1110 and the operation of the auxiliary universal bar 204' operates springs 1111; it being remembered that the universal bar 204 operates responsive to all magnet operations while the auxiliary universal bar 204' operates on all magnet operations by magnets 3, 9, and retract. The universal bar 204 also prepares the escapement to permit the carriage to move one step when the magnets and universal bar release as described in the aforesaid patent. The operation of the universal springs 1110 grounds conductor 995 to complete an obvious energizing circuit for relay 912 while the operation of springs 1111 connects the grounded mark conductor 994 to the lower winding of the differential relay 914 by way of conductor 966. The differential relay 914 now has ground connected to both its windings and when relay 912 energizes and at armatures 983 and 984 simultaneously connects battery to both these windings the differential relay 914 will not energize because both windings are equal and oppose each other. The non-operation of the differential checking relays 913 and 914 indicates that the proper punch solenoid magnet has operated in accordance with the pick-up relays operated. Both the transmitting distributor and the receiving distributor have at this time completed their first revolution and the cam shafts have come to rest preparatory to transmitting and receiving the second code digit.

*Transmission error*

Before describing the transmission of the second code, it is believed advisable to explain the transmission check-back operation which takes place in case a fault occurs. For this purpose it will be assumed that the transmitting distributor has transmitted the code 3—5 as previously described and that due to some fault, such as incorrect synchronism of the two distributors or other incorrect operation, the wrong pick-up relays in Fig. 19 have operated. For example, it will be assumed that pick-up relays 903 and 906 were energized in response to the transmission of the code 3—5. Due to the operation of pick-up relay 903 the receiving distributor during its operation transmits an impulse back over line 781 to operate line relay 508 as previously described when the No. 3 cam of Fig. 20 closes springs 1003. The line relay 508 at armature 544 prepares a circuit for the error-check relay 501 as previously described. The operation of the error-check relay depends upon whether the two distributors are in synchronism, and, if so, then both windings of the error-check relay are simultaneously energized and therefore the differential relay 501 will not operate. However, in case the two distributors are not operated in synchronism, the error-check relay is operated either by the transmitting distributor being too fast or being too slow. In case the transmitting distributor is too fast, then the line relay 508 would not be energized when the transmitting distributor closes springs 613 and 618 and a circuit for energizing the error-check relay 501 may be traced as follows: from grounded conductor 427, armature 574, normally closed springs controlled by armature 523, resting contact of armature 530 and said armature, conductor 407, wiper 445 in engagement with its first bank contact, conductor No. 1 included in cable 435, No. 3 pin in the vertical column 1, No. 3 pin 34, strip 33, No. 3 pin 55, No. 3 pin 45, No. 3 conductor in cable 404, springs 613, conductor 576, through the upper winding of differential error-check relay 501, resistance 512, conductor 577, and through the interrupter springs 618 to battery. Since the line relay 508 is not energized at this time then no circuit is completed for the lower winding of relay 501 with the result that the error-check relay 501 operates its armature 514 to deenergize the error relay 502. In case the transmitting distributor is too slow, then the line relay 508 will energize before springs 613 are operated, or, for example, when springs 612 are closed. Since the code being transmitted is 3—5, the springs 612 are not grounded with the result that no circuit is prepared at this time for the upper winding of error-check relay 501 and if the line relay 508 is energized at the time when springs 612 and 618 are closed by the transmitting distributor, then the error-check relay 501 is operated over the following circuit: from grounded conductor 427, working contact of armature 544 and said armature, through the lower winding of error check relay 501, resistance 512, conductor 577, and through the interrupter checking springs 618 to battery. Error-checking relay 501, upon energizing, at armature 514 opens the locking circuit of error relay 502, whereupon the error relay now deenergizes.

Error relay 502, upon deenergizing, at armature 515 opens the circuit of the start-stop magnet 631 to prevent its re-energization when the interrupter springs 454 on the stepping magnet SM close; at armature 516 opens a point in its own locking circuit; at armature 518 opens the circuit extending to the hold relay 506 which thereupon deenergizes after an interval; at armature 517 prepares a point in the circuit to the release magnet 91; at armature 519 opens the locking circuit of start relay 505 which thereupon releases after an interval and also disconnects ground from conductor 575 to stop the distributor motor 630; at armature 520 prepares a point in the signalling circuit for operating the buzzer and lamp 25 and also connects grounded conductor 402 by way of armatures 572, 520, and 535 to conductor 582; and at armature 521 completes a circuit for energizing the differential signal relay 504 over one winding alone as follows: from grounded conductor 427, armature 574, armature 521, and through the upper winding of signal relay 504 to battery. Signal relay 504, upon energizing, at armature 525 opens another point in the circuit of the start-stop magnet 631; at armature 526 opens a point in the circuit extending to the print magnet 82 in Fig. 14; at armature 527 prepares a circuit for short circuiting relay 502 to release the same under certain conditions; at armature 529 short circuits the resistance 528; at armature 530 and its resting contact disconnects ground from conductor 407 and at its working contact prepares a point in the talking circuit to the cashier's telephone. Hold relay 506, upon deenergizing, at armature 533 prepares a point in the circuit to the release magnet 91; at armature 534 opens a point in the energizing circuit of start relay 505 and also removes ground from the upper winding of relay 507 and from conductor 413; and at armature 535 closes the signalling circuit to the buzzer and lamp 25 and also removes ground from conductor 582 and at this time line relay 807 is held energized over a circuit including the talking circuit. The circuit for maintaining line relay 807 in energized position may be traced as follows: from grounded conductor 875, resting contacts of armatures 820 or 830 and said armatures, armature 824, normally closed springs controlled by armature 817, armature 847, conductor 781 to conductor 581 over the primary and secondary line switch connections, armature 567 and its working contact, through the receiver R and transmitter T, through the working contact of armature 530 and said armature, conductor 407 extending to the start springs 690, conductor 578, armature 529, working contact of armature 566 to conductor 582 and thence over the previously traced circuit through the operating winding 1 of line relay 807. The signalling circuit for operating the buzzer and lamp 25 may be traced from the grounded conductor 402, armature 572, armature 520, armature 535 and its resting contact, cradle springs 580, and through the buzzer and lamp in parallel to battery. Start relay 505, upon deenergizing, at armature 531 again prepares its original energizing circuit; at armature 532 opens a point in the energizing circuit of switching relay 507, and also disconnects groups from conductor 413.

The line relay 807 is therefore maintained energized for a sufficient length of time to permit the slow-to-operate alarm relay 802 to operate and close at armature 816 the circuit for the supervisory relay 860 located in the supervisory panel. The circuit for energizing the alarm relay 802 extends from grounded conductor 883, resting contact of armature 815 and said armature, armature 814, through the lower winding of relay 802, conductor 876, and through the start springs 1000 and the winding of the start-stop magnet 1031 to battery. Due to the high resistance lower winding of alarm relay 802 the start-stop magnet is not energized over this circuit. It should be noted that whenever the line relay 807 is in deenergized position then the lower winding of the alarm relay 802 is short circuited by way of ground through the normally closed springs controlled by armature 838 and by way of armature 840 and its working contact. The circuit for energizing the supervisory relay 860 extends from ground through the lamp 851 mounted on the punch, armature 816 of alarm relay 802, and through the right-hand high-resistance winding of relay 860 to battery. At armature 861 relay 860 completes a circuit for operating the slow-to-operate dashpot relay 862 which after a predetermined time operates and closes springs 863 to complete a circuit through the low-resistance left-hand of supervisory relay 860 and through armature 816 for illuminating the lamp 851. By the illumination of the lamp 851 the attendant in the recording room is signalled and thereupon inserts the plug P into the jack J to complete a talking connection with the cashier at the transmitter in trouble. The attendant then operates the turn key 852 on the punch, thereby completing a circuit through the upper winding of relay 802 and also for completing a circuit through the signal relay 803 for energizing the latter relay. At armature 817 relay 803 substitutes ground at the push-key 853 for the grounded conductor 875 and completes one point in the talking circuit; at armature 818 connects ground to the operating winding 1 of line relay 807 for maintaining this relay in operated position; and at armature 819 disconnects the operating winding 1 of line relay 87 from conductor 782 at its resting contact and at its working contact completes the other point in the talking circuit. The talking circuit between the attendant's hand 'phone in the record room and the cashier's monophone may be traced over the heavy talking conductors as follows: from the receiver R and transmitter T over the tip and ring conductors of the plug P, tip and ring springs 854 and 855 of the jack J, armatures 817 and 819 and their working contacts, armature 847 and conductors 781 and 782, wipers 731 and 732, armatures 757 and 762, armatures 744 and 747 and their working contacts, armature 743, plunger springs 711 and 710 to conductors 581 and 582, armatures 566 and 567 and their working contacts, through the receiver R and transmitter T at the cashier's 'phone, working contact of armature 530 and said armature, conductor 407 extending to start springs 600, conductor 578, armature 529 and armature 566. Talking battery is furnished through the grounded push-key 853 through the tip conductor and the battery is furnished through the impedance 857, sleeve spring 856 and the sleeve conductor to the ring conductor associated with the attendant's handset.

In response to the operation of the buzzer and lamp 25, the cashier removes the handset or monophone from the cradle to talk to the attendant who advises the cashier of the fault and that she should retransmit the same. The operation of the cradle springs 850 opens the circuit to the buzzer and lamp 25 and the operation of the cradle springs 579 prepares a point in the circuit for the release magnet 91. Since the ground at key 853 was substituted for the grounded conductor 875, the line relay 508 is maintained energized over this ground circuit. After the termination of the conversation between the attendant and the cashier, the attendant will operate the push-key 853, thereby disconnecting ground from conductors 871 and 581 to cause the line relay 508 to deenergize. Line relay 508, upon deenergizing, at armature 543 grounds the nineteenth bank contact accessible to wiper 451 by way of armature 561 and conductor 408, and at armature 544 completes the circuit for energizing the release magnet 91 in the transmitter as follows: from grounded conductor 427, armature 573, normally closed springs controlled by armature 544, armature 533, armature 517 and its resting contact, cradle springs 579, conductor 428, and through the winding of release magnet 91 in Fig. 14 to battery.

Release magnet 91, upon energizing, at armature 91' closes a locking circuit for itself by way of grounded start springs 65; at springs 93 opens the circuit of the hold magnet 66 and operates the catch 67 to permit the armature 63 of the hold magnet to release whereby the lug 64 is withdrawn from the hole 62 in the bracket 61 to permit the cover of the transmitter to open. Responsive to the restoration of the armature 63 of the hold magnet 66 springs 89 open the original energizing circuit of recording relay 510 and springs 90 open a point in the circuit of the authorizing relay 509. When armature 63 withdraws the lug 64 from the bracket 62 the cover of the transmitter opens and the print bars return without printing because magnet 82 has not been operated. Start ground is disconnected at start springs 65 to open the locking circuit of the release magnet 91 and to disconnect ground from pin 116. Due to the opening of the transmitter cover the movable pins 34 and 55 are disconnected from the pins 43 and 45 and the card-check pins 38 from their respective pins. Responsive to the opening of the transmitter, ground is also removed from conductor 402 thereby opening the locking circuit of recording relay 510 and hold magnet 66. The removal of ground from pin 114 opens the circuit of the card check relay 511, which thereupon deenergizes. At armature 574 relay 511 opens the circuit of signal relay 504, which thereupon deenergizes, and at armature 573 opens the circuit to the release magnet 91. Recording relay 510, upon deenergizing, at armature 557 closes a circuit for the stepping magnet SM to restore the wipers shown in Fig. 14 to their normal positions; at armature 558 prepares the original energizing circuit of relay 502; at armatures 559 and 560 opens a point in the circuit to the switching relay 507; at armature 561 disconnects ground from conductor 408; at armature 562 opens a point in the circuit to the printing magnet 82; at armature 563 prepares the circuit to the authorizing relay 509; at armature 564 opens a point in its own locking circuit; at armature 565 opens a point in the locking circuit for the switching relay 507; and at armatures 566 and 567 opens the talking circuit and disconnects the line conductors 581 and 582 from the transmitter circuit.

Since the completion of the first rotation of the transmitting distributor has advanced the switch wipers of the switch S into engagement with their second bank contacts, the deenergization of recording relay 510 closes the following circuit; from grounded conductor 427, wiper 453 and the second bank contact, conductor 421, armatures 546 and 557, conductor 417, interrupter springs 455, and through the winding of stepping magnet SM to battery. Stepping magnet SM energizes to position its pawl and to open the interrupter springs 455 to deenergize the magnet SM. The deenergization of the stepping magnet SM steps the wipers to the third bank contact where the same circuit is again completed. This intermittent operation of the stepping magnet steps the wipers until the wiper 453 engages the seventh bank contact to establish the following circuit: from grounded conductor 427, wiper 453 and the seventh bank contact, conductor 420, armature 557 and over the same circuit as previously traced to the stepping magnet SM. The stepping magnet SM intermittently operates over the circuit just described since the bank contacts are multipled in the manner shown until the eighteenth bank contact is engaged by wiper 453 whereupon the following circuit is established: from grounded wiper 453 and eighteenth bank contact, conductor 419, armature 547 and its resting contact, conductor 417 and over the previously traced circuit to the winding of the stepping magnet SM. Stepping magnet SM advances the wipers of the switch to their nineteenth bank contact where the stepping magnet SM, due to the multiple connected bank contacts accessible to wiper 453 advances the wipers of the switch step by step beyond the twenty-fifth bank position. As soon as wiper 453 steps beyond its twenty-fifth bank the wiper 452 engages its first or twenty-sixth bank contact whereupon the wiper 452 is substituted for the wiper 453 to cause the stepping magnet SM to step the wipers into engagement with their thirty-second bank contact. When wipers 452 engages its thirty-second bank contact a circuit may be traced from the grounded wiper 452 through the multipled bank contacts 32 to 50, inclusive, accessible to wiper 452, over conductor 417 and interrupter springs 455 and to the winding of the stepping magnet SM to cause the wipers of the switch S to be returned to their normal position or the position shown in the drawing in a manner similar to that just described. Since there is no ground connected to the first or normal position bank contact, the stepping magnet SM is not energized and the wipers remain in this position. From the foregoing it will be seen that with both relays 509 and 510 deenergized all of the bank contacts accessible to wiper 453 except the first bank contact are connected to ground and in multiple to cause the switch to restore to its normal position in engagement with its first bank contact. All of the apparatus in the transmitter shown in Figs. 14 and 15 are now in normal position.

The attendant, after removing the plug P from the jack J and after operating the push-key 853 to release the transmitter then releases the turn key 852 to deenergize the alarm relay 802 and the signal relay 803 and manually restores the punch to its normal position if the same has been operated. The deenergization of signal relay 802 opens the lamp circuit of lamp 851 and the circuit of supervisory relay 860 which now deenergizes and opens the circuit of the dash-pot relay 862. The lamp 851 remains lighted to remind the attendant that the key 862 should be restored to normal position. Signal relay 803, upon deenergizing, at armature 817 opens the talking circuit and again connects conductor 781 to the send-back conductor 875; at armature 818 opens the circuit of line relay 807 which now deenergizes; and at armature 819 again connects conductor 782 to the operating winding I of line relay 807. At armature 838 line relay 807, upon deenergizing, opens the circuit to the hold relay 808 and closes the circuit to the start-stop magnet 1031 over the same circuit as previously described. The receiving distributor makes one or more revolutions dependent upon the speed with which the hold relay 808 releases. During this revolution of the receiving distributor the lock springs 1007 and the mark springs 1017 are operated, the lock springs 1007 disconnecting ground from the lock conductor 993 to unlock any pick-up relay in Fig. 19 which at this time may be operated, while the mark springs 1017 disconnect ground from the mark conductor 994 to deenergize any punch magnet which may be operated and any checking relay such as relays 909, 910, 911, 913, or 914, which may be operated. This operation of the receiving distributor therefore clears the punch and associated relays. When the hold relay 808 deenergizes, said relay at armature 839 opens a point in its own locking circuit and prepares a point in the original energizing circuit of relay 809; at armature 840 opens the circuit to the start-stop magnet 1031 to stop the receiving distributor and closes the energizing circuit to the guard relay 810; and at armature 841 removes one ground from the release trunk conductor 883. The circuit for energizing the guard relay 810 may be traced as follows: from ground through the normally closed springs controlled by armature 838, armature 840 and its resting contact, through the winding of the guard relay 810, start conductor 876, through the start springs 1000 and through the winding of the start-stop magnet 1031 to battery. Due to the high resistance of the guard relay 810 the start-stop magnet 1031 is not energized over this circuit. At armature 847 guard relay 810 disconnects the line conductor 781; and at armature 848 removes ground from the release trunk conductor 883 to open the circuit of relays 908 and 809 and the locked-up relays in Fig. 17. The disconnection of ground from release trunk conductor 883 causes the deenergization of relays 908 and 809 and all of the apparatus and relays in the recording trunk are now in normal position.

The removal of ground from conductor 783 by the energization of the guard relay 810 opens the holding circuit of relays 722, 725, and magnet 702. Magnet 702, upon releasing, releases the plunger and armature 707 to prepare the circuit for energizing the line relay 701. The deenergization of relays 722 and 725 returns the circuit of the rotary secondary line switch to normal position. All of the apparatus is now in normal position and may be used in another call.

Assuming now that due to some fault the wrong combination of pick-up relays, say relays 906 and 903 are energized. Responsive to the energization of pick-up relay 903 the receiving distributor sends the check code 3 back to the transmitting distributor and if this agrees with the code transmitted then the distributors continue their operation. Now, if pick-up relay 906 energizes instead of pick-up relay 905, said relay at armature 921 opens the circuit extending to the check-back conductors included in cable 991 with the result that the last check pulse of the code is not sent back to the transmitting distributor. Since the last pulse is not transmitted back to the transmitting distributor the error-check relay 501 energizes and stops further transmission in the same manner as previously described. The operation of the lower armatures of relays 903 and 906 is without effect because no circuit is completed from the mark conductor 994 to any of the punch magnets. Relays 902 and 905 or relays 901 and 904, if energized in the same code, also stop further transmission as just described.

*Punch checking operation*

Before proceeding with the transmission of the second digit, it is believed advisable at this time to explain the checking circuits provided in Figs. 19 and 21, which check the operation of the punch magnets to see that they are operated in the proper combinations in accordance with the operated pick-up relays. In Fig. 19 two differential error-check relays 913 and 914 are provided which energize only when the wrong combination of punch magnets operate. Check relay 909 is only operated when the pick-up relays 901 and 902 are energized or at a time when the No. 3 and the No. 9 punch magnets alone are to be energized. Check relay 910 is energized when the pick-up relays are energized in the following combinations; 902—904; 902—906; 904—905; and 902—903; or at a time when the No. 3 or No. 9 magnet is to be energized in combination with another punch magnet. Check relay 911 is energized when the pick-up relays are energized in the following combinations; 904—905; 901—903; 905—906; 903—904; and 901—906; or at a time when a punch magnet, other than the No. 3 or No. 9 magnets, is to be operated alone. Check relay 909 prepares a circuit for one winding of differential error-check relay 913 while the No. 3 or No. 9 punch magnet at armatures 1103 or 1109 prepare a circuit for the other winding. Now, when the universal springs 1110 operate, universal relay 912 energizes over conductor 996 and connects battery to both windings of the differential checking relay. Differential error relay 913 does not operate because the two windings are equal and oppose each other. In case some other magnet, say magnet 4, operates when the No. 3 magnet should have operated, then the circuit to the lower winding of relay 913 is not completed because conductor 997 is not grounded by armature 1103 and when relay 912 operates in response to the operation of the universal springs 1110 the error-check relay 913 is operated over its upper winding from grounded mark conductor 994, armature 977, upper winding of relay 913, armature 981, resistance 915 to battery. At armature 985 relay 913 opens the locking circuit of relay 809 which now deenergizes. At armature 842 relay 809 connects ground to conductor 781 to maintain the line relay 509 in the transmitting distributor energized during the entire second revolution of the transmitting distributor. When the cam interrupter springs 618 are closed at a time in the second revolution when the conductor 576 is not grounded via the checking springs and the perforations in the card, then the error-check relay 501 operates over its lower winding alone by way of the operated armatures 544 and 573. The operation of the error-check relay 501 stops further transmission in the same manner as previously described.

In case the No. 3 solenoid punch magnet operates when some other magnet, say magnet 4 alone, should operate, then both error-check relays 913 and 914 energize because check relay 911 is energized. The error check relay 913 is energized over its lower winding from grounded mark conductor 994 through the armature 1103 on magnet 3, conductor 997, through the lower winding of differential error-check relay 913, armature 982 and resistance 916 to battery. Differential error-check relay 914 is energized from the grounded mark conductor 994 by way of armature 980 through the upper winding of relay 914, armature 983 and resistance 917 to battery. The conductor 996 is not grounded responsive to the operation of the No. 3 punch magnet because the auxiliary universal bar 204' is not operated and therefore the springs 1111 are not closed at this time. The circuit for energizing relay 911 extends from grounded mark conductor 994, armature 938 and its resting contact, armature 945 and through the winding of relay 911 to battery. The relays 909 and 910 are not operated at this time because their circuits are not completed since only the pick-up relays 904 and 906 are energized presumably to operate the No. 4 punch magnet. The operation of either of the differential error-check relays 913 and 914 causes the deenergization of relay 809 by the operation of armature 985 or armature 986. In case the No. 3 punch magnet alone operates, when both the magnets 3 and 10 should have operated, then error-check relay 914 operates to deenergize relay 809 at armature 986. In this last instance the check relay 910 was energized by relays 902 and 906 over the following circuit: from grounded mark conductor 994, armature 923, armature 946, armature 959 and its resting contact, and through the winding of check relay 910 to battery. Check relay 909 did not energize because its circuit was not closed at armature 959 and the check relay 911 did not operate because its circuit was opened at armature 945. The operation of pick-up relays 902 and 906 should cause the operation of the solenoid punch magnets 3 and 10 over the following circuit: from grounded mark conductor 994, armature 923, armature 946, armature 971, over the No. 3 conductor in cable 992 through the winding of the solenoid punch magnet No. 3 to operate said magnet, and by way of grounded mark conductor 994, resting contact of armature 953 and said armature, armature 941, armature 948 and its working contact, armature 927, armature 975 through the No. 10 conductor included in cable 992 and through the winding of the No. 10 punch magnet to battery. However, due to fault and since the No. 3 magnet alone operated, the balancing circuit through the lower winding of the error-check relay 914 is not closed because the magnet 10 did not operate and close the springs 1111 to ground conductor 996. The differential relay 913 does not operate because circuits are completed through both its windings, the lower winding by the operation of springs 1103 on the No. 3 magnet and through the upper winding by way of armature 979 and grounded mark conductor 994. Differential error check relay 914 energized because a circuit is completed through its upper winding alone as follows: from grounded mark conductor 994, armature 978, through the upper winding of relay 914, armature 983 and resistance 917 to battery. From the foregoing it will therefore be seen that if the punch magnets are not operated singly or in the particular combinations called for by the operated pick-up relays, then either one or both error-check relays 913 or 914 operate to stop further transmission of the distributor.

As previously mentioned, the punch shown in Fig. 21 is provided with card check springs 1115 and 1116 which are closed when there is no card in punching position. Springs 1115, when operated, ground conductor 881 to maintain the guard relay 810 energized over the following circuit: from grounded springs 1115, conductor 881, through the winding of start relay 810, conductor 876, start springs 1000, and through the winding of the start-stop magnet 1031 to battery. The operation of springs 1116 grounds the release trunk conductors 883 and 783 to prevent any recording rotary secondary line switch RS such as shown in Fig. 17 from seizing this trunk line and punch. This circuit may be traced from the grounded card-check springs 1116, conductor 883 included in cable 880, resting contact of armature 815 and to the release conductor 783 which terminates in the banks accessible to the recording rotary secondary line switches. Therefore, whenever a punch has no card in punching position such punch is rendered non-selectable. In addition, in case the off-normal springs 1118 are closed or the busying keys 1117 are closed, the conductor 883 is grounded to prevent the seizure of the recording trunk and punch.

*Transmission of second code*

Returning now to the end of the first revolution of the two distributors and assuming that no error or fault has occurred in the operations of the two distributors or the punch, it will be remembered that the rotary cam in the transmitting distributor has operated springs 617 to deenergize the stepping magnet SM to step the wipers of the switch S into engagement with their second bank contacts. When the stepping magnet SM deenergizes and closes springs 454, a circuit for energizing the switching relay 507 may be traced as follows: from grounded conductor 427, armature 573, armature 534, armature 532, through the upper winding of switching relay 507, conductor 412, second bank contact engaged by wiper 451 and said wiper, conductor 414, armatures 515 and 525, conductor 416, magnet springs 454, conductor 415, and through the winding of the start-stop magnet 631 to battery. Due to the high resistance in the upper winding of relay 507, the start-stop magnet 631 is not energized over this circuit. Switching relay 507, upon energizing over the above-traced circuit, at armature 540 completes a locking circuit through its lower winding as follows: from grounded conductor 427, armature 565 and its working contact, resting contact of armature 554 and said armature, armature 540 and through the lower winding of switching relay 507 to battery. At armature 536, switching relay 507 prepares a circuit for delaying the operation of the transmitting distributor during an authorizing or charge sale; at armature 537 prepares a point in the circuit to the print magnet 82; at armature 538 prepares a point in the energizing circuit of relay 503; and at armature 539 energizes the start-stop magnet 631 as follows: from grounded conductor 427, armatures 573, 534, and 532, armature 539 and its working contact, conductor 412, second band contact engaged by wiper 451 and said wiper, conductor 414, armatures 515 and 525, conductor 416, magnet springs 454, conductor 415, and through the winding of the start-stop magnet 631 to battery.

The operation of the start-stop magnet 631 starts the transmitting distributor cam shaft in its second revolution to transmit the second digit of the cashier's number, or in this case the digit 2, designated by the two heavy full black circles shown in the No. 2 and No. 2 spaces in the vertical column 2 in Fig. 14. As previously described the start springs 600 are opened by the start cam to disconnect ground from conductor 578 to cause the deenergization of the line relay 807 which, upon deenergizing, operates the start-stop magnet 1031 of the receiving distributor to cause the two distributor cam shafts to operate in synchronism. When the sending cam springs 602 are closed by the cam 2 an impulse is transmitted as follows: from grounded conductor 427, armature 574, normally closed springs controlled by armature 523, resting contact of armature 530 and said armature, conductor 407, wiper 447 in engagement with the second bank contact, the No. 2 conductor included in cable 436 connected to the pin 43 second from the top in vertical column 2, pin 34, metal strip 33, No. 2 movable pin 55, No. 2 pin 45, No. 2 conductor included in cable 404, sending cam springs 602, conductor 578, resistance 528, armature 566, conductor 582, plunger springs 710, armature 744 and its working contact, armature 757, wiper 732, conductor 782, armature 819 and its resting contact, and through the operating winding I of line relay 807 to battery. When the sending cam springs 604, close, another pulse is transmitted over a similar circuit including this time the wiper 449 in engagement with its second bank contact, the No. 2 conductor included in cable 437, the upper pin 43 included in vertical column 2 which is multipled to the No. 4 pin 43 in such vertical column, pin 34, metal strip 33, No. 4 pin 55, No. 4 pin 45, No. 4 conductor included in cable 404, sending cam springs 604 and thence by way of conductor 578 over the previously traced circuit to the line relay 807. In the same manner as previously described these operations of line relay 807 cause the energization of pick-up relays 902 and 904 which lock energized and close circuits at armatures 942 and 954 to send back code 2—4 to the line relay 508 which operates at the proper time if the two distributors are in synchronism to prevent the operation of the error-check relay 501. The operation of the pick-up relays 902 and 904 will also close circuits by way of the grounded mark conductor 994 for operating the No. 11 and No. 3 solenoid punch magnets as follows: The circuit for energizing the No. 3 solenoid punch magnet extends from grounded mark conductor 994, armature 952 and its working contact, armature 946, armature 971 to the No. 3 conductor included in cable 992, and through the winding of the solenoid punch magnet 3 to battery. The circuit for energizing the No. 11 solenoid punch magnet extends by way of the grounded mark conductor 994, armature 962, resting contact of armature 932 and said armature, resting contact of armature 925 and said armature, armature 953 and its working contact, armature 947, armature 972 to the No. 11 conductor included in cable 992 and through the winding of the No. 11 solenoid punch magnet to battery. The pick-up relays 902 and 904 also close a circuit for energizing relay 910 as follows: from grounded mark conductor 994, armature 952 and its working contact, armature 946, armature 959 and its resting contact and through the winding of the check relay 910 to battery. Relay 910 at armatures 978 and 979 prepares the circuits extending to the upper windings of the differential error-check relays 913 and 914. The operation of the punch magnets 3 and 11 closes the universal springs 1110 to energize the universal relay 912. The springs 1111 are closed by the operation of the No. 11 punch magnet to connect ground to conductor 996 while the No. 3 punch magnet operates its armature 1103 to ground conductor 997 by way of grounded mark conductor 994. When the universal relay 912 is energized, said relay at armatures 981 to 984 connects battery to the upper and lower windings of the differential relays 913 and 914 and since the grounded mark conductor 994 is connected to the two upper windings of relays 913 and 914 by way of armatures 978 and 979, and conductors 996 and 997 are at this time grounded, the two windings in both the differential relays oppose each other with the result that the differential error-check relays 913 and 914 are not at this time energized.

The following is a chart showing the digits which are punched in code in the card, the transmitting and check-back codes which are transmitted by the two distributors, the pick-up relays which are operated and the punch magnet or magnets which are operated for each code or digit:

| Digit | Holes punched in card | Code transmitted | Pick-up relays operated | Punch magnets operated in 0 to 45 column | Punch magnets operated in 46 to 90 column |
|---|---|---|---|---|---|
| 0 | 4—6 | 4—6 | 904—906 | 12 | 4 |
| 1 | 3—5 | 3—5 | 903—905 | 11 | 5 |
| 2 | 2—4 | 2—4 | 902—904 | 11—3 | 5—9 |
| 3 | 1—3 | 1—3 | 901—903 | 10 | 6 |
| 4 | 2—6 | 2—6 | 902—906 | 10—3 | 6—9 |
| 5 | 5—6 | 5—6 | 905—906 | 1 | 7 |
| 6 | 4—5 | 4—5 | 904—905 | 1—3 | 7—9 |
| 7 | 3—4 | 3—4 | 903—904 | 2 | 8 |
| 8 | 2—3 | 2—3 | 902—903 | 2—3 | 8—9 |
| 9 | 1—2 | 1—2 | 901—902 | 3 | 0 |
| Space | 1—6 | 1—6 | 901—906 | Space | Space |

Since the codes corresponding to the remaining digits punched in the cards in the transmitter are transmitted and checked in a manner similar to that just described, it is believed that the above chart is sufficient to show the manner in which the remaining codes are transmitted and received.

*Stepping circuits of switch S*

Referring now to Figs. 14, 15, and 16, a description of the circuits for controlling the stepping magnet SM to step its wipers one step after each revolution of the transmitting distributor cam shaft will now be given. When the transmitting distributor cam shaft closes rotary cam springs 617 on its second revolution a circuit for energizing the stepping magnet SM may be traced as follows: From grounded conductor 427, armature 573, armature 519, armature 531 and its working contact, conductor 575, rotary cam springs 617 now closed, conductor 418, and through the winding of the stepping magnet SM to battery. Stepping magnet SM energizes and at springs 454 opens the circuit to the start-stop magnet 631 which thereupon deenergizes. When the rotary cam springs 617 are opened near the end of the rotation of the distributor cam shaft the circuit of the stepping magnet SM is opened and such magnet deenergizes to rotate its wipers into engagement with their third set of bank contacts and to prepare a circuit for energizing the start-stop magnet 631 at interrupter springs 454. If no error has occurred the start-stop magnet 631 is energized over the following circuit: from grounded conductor 427, armatures 573, 534, 532, 539, and 560, conductor 411, third bank contact engaged by wiper 451 and said wiper and over the previously traced circuit to the start-stop magnet 631. The rotary cam springs 617 are again closed and opened on the third revolution of the distributor cam shaft to cause the energization and deenergization of the stepping magnet SM to step its wipers one step and to open and then later prepare a circuit for the start-stop magnet 631. With the wipers of the switch S in engagement with their fourth bank contacts the start-stop magnet 631 is energized over the previously traced circuit including the conductor 412 to again release the distributor cam shaft. The inter-action between the stepping magnet SM and the start-stop magnet 631 continues as above described until the wipers engage their seventh bank contacts where the following circuit is completed for the start-stop magnet 631; from grounded conductor 427, armatures 573, 534, 532, 539, and 559, conductor 410, seventh bank contact engaged by wiper 451 and said wiper, conductor 414, and over the previously traced circuit to the start-stop magnet 631. Due to the multiple bank contacts connected to conductors 410 and 412 the stepping magnet SM and the start-stop magnet 631 inter-act as before until the switch wipers are stepped into engagement with the eighteenth bank contact. In this position of the switch wipers a circuit is closed from grounded wiper 453 in engagement with its eighteenth bank contact, conductor 419, armature 547 and its resting contact, conductor 417, interrupter springs 455, and through the winding of the stepping magnet SM to battery. The wipers of the switch S automatically take a step to the nineteenth bank contact without operating the start-stop magnet 631 because no circuit at this time is closed for the same. It should probably be mentioned that during the time the wipers 445 and 447 were in engagement with their eleventh and twelfth bank contacts the transmitting distributor cam shaft transmitted the space code 1—6, twice, once for each bank position. The circuit for grounding the springs 601 and 606 to transmit the space code may be traced from the grounded conductor 407, wipers 445 and 447, the eleventh and twelfth bank contacts accessible thereto, conductors 433 and 434 connected to the No. 6 and No. 1 conductors included in cable 404.

The transmitting distributor has transmitted the codes corresponding to the cashier's number, the clerk's number, and the sales price of the article sold and the switch S now stopped in its nineteenth position.

*First punch carriage return*

The transmitting distributor momentarily stops at this time to allow the punch carriage, which has just been operated from its twenty-sixth position to its forty-second position by the transmitted codes, to return to its thirtieth position without releasing the locked-up set-up bars as previously described. Referring now to the punch shown in Fig. 21, it will be remembered that the punch magnets operated in response to the first transmitted code and that the universal bar 204 has prepared the escapement mechanism. When the receiving distributor cam shaft starts on its second revolution to receive and send back the second code, mark springs 1017 disconnects ground from the mark conductor 994 to deenergize any of the checking relays 909, 910, or 911 and any of the punch magnets which may at this time be energized. The lock springs 1007 are also momentarily operated to remove ground from the lock conductor 993 to unlock and deenergize any operated pick-up relay. When the punch magnets deenergize the universal bar 204 is released and permits the escapement to operate the carriage one step in the well-known manner. As soon as the punch carriage takes its first step, off-normal springs 1119 operate and disconnect ground from conductor 882 and prepare a locking circuit for relays 1121 and 1122. Off-normal springs 1118 connects another ground to the release trunk conductor 883 to maintain this punch and the trunk busy as long as the punch is in an off-normal position. The punch magnets operate as previously described for each code transmitted to lock the corresponding set-up bars and to cause the carriage to step one step for each code. Springs 1112 close as soon as the carriage reaches its forty-second position, at which time the seventeenth code or the code in the extreme left-hand row in vertical column 17 in Fig. 14 is transmitted.

In response to the seventeenth code corresponding punch magnet or magnet 1 operates the universal bar to close a circuit as follows: from ground, universal springs 1110, springs 1112, conductor 885 included in cable 880, armature 846, and through the upper winding of the transfer relay 804 to battery. Transfer relay 804, upon energizing, at armature 820 opens one of the points connecting the conductor 875 to conductor 781; at armature 821 prepares a point in the energizing circuit of relay 805; at armature 822 closes a locking circuit for itself; and at armature 823 disconnects the grounded conductor 883 from conductor 874. The locking circuit for relay 804 may be traced as follows: from ground through the operated off-normal springs 1118, armature 1125 and its resting contact, conductor 884 included in cable 880, armature 828, armature 822 and through the lower winding of transfer relay 804 to battery. The disconnection of ground from conductor 874 also removes ground from lock conductor 993 and mark conductor 994, thereby causing the deenergization of the operated pick-up relays and the operated punch magnet. As soon as the universal bar is released by the deenergization of the punch magnet the carriage is stepped from its forty-second position to its forty-third position, at which time springs 1113 close and connect ground to conductors 887 and 889 to energize relay 811. Since the conductor 889 is grounded by way of armature 832 and its resting contact, a circuit may be traced for energizing the trip relay 1122 and for energizing the magnetic clutch 1189 by way of the clutch wipers 1188 and 1186. Relay 811, upon energizing, at armature 849 opens another point in the circuit extending to the conductor 874. Trip relay 1122, upon energizing, at armature 1126 completes a locking circuit for itself from grounded off-normal springs 1119 and its working contact and also for maintaining the conductor 839 grounded until the carriage is returned to its normal position; and at armature 1127 opens the circuit to the trip magnet 1179.

Responsive to the energization of the magnetic clutch 1189 the clutch now rotates with the shaft 1196 to wind up the tape 1187 which operates the lug 216 which in turn engages the carriage to return it, this time to its thirtieth position instead of its twenty-sixth position because the retract magnet is not operated to raise the lug 215. Springs 1112 and 1113 are returned to their normal position by the return of the carriage. When the lug 215 engages the second stop 214 the off-normal springs 1118 and 1119 are operated to their normal positions or the positions shown in Fig. 21 to remove ground from conductor 889 to thereby deenergize relay 811 and trip relay 1122. When the resting contacts of off-normal springs 1119 are closed in response to the carriage reaching its thirtieth position, a circuit may then be traced from ground, resting contacts of off-normal springs 1119 by way of armature 1123, conductor 882 included in cable 880, armature 845, armature 821 and through the winding of relay 805 to battery. Relay 805, upon energizing, at armature 829 disconnects the grounded conductor 883 from conductor 871 to deenergize relay 908 at its resting contact and at its working contact connects the grounded conductor 883 to conductor 870 to energize relay 907. At armature 828 relay 805 opens the locking circuit to relay 804 which deenergizes after an interval; at armature 827 closes a locking circuit for itself in shunt of armature 821; at armature 826 prepares a circuit to relay 806; armature 825 closes before armature 824 breaks and prepares a point in the circuit to conductor 875 and at armature 824 disconnects the conductor 875 from conductor 871 to deenergize the line relay 508 in the transmitting distributor. The deenergization of relay 908 at armatures 971 to 976, inclusive, disconnects the conductors 12, 11, 0, 1, 2 and 3 from the pick-up relays and the energization of relay 907 at armatures 965 to 970, inclusive, connects the conductors 4 to 9, inclusive, to the pick-up relays. The 10 punch magnets for operating the set-up bars which control the perforating of the recording card in the upper field have now been disconnected, while the punch magnets for operating the set-up bars which control the perforating of the card in the lower field have been connected to the pick-up relays. Since the retract magnet of the punch was not energized at the time the carriage was returned to its thirtieth position, the release plunger 202 shown in Fig. 11 is not operated, with the result that the release roller 212 is likewise not operated. In this return movement the release levers 211 are therefore not operated, with the result that the operated set-up bars 201 remain in their operated position.

Returning now to the transmitting distributor and at the same time when the wipers of the switch S shown in Fig. 14 are stepped from their seventeenth position into engagement with their eighteenth position, at which time a circuit may be traced for automatically operating the stepping magnet SM as follows: from grounded conductor 427, wiper 453 in engagement with its eighteenth bank contact, conductor 419, armature 547 and its resting contact, conductor 417, interrupter springs 455, and through the winding of stepping magnet SM to battery. The stepping magnet SM energizes and deenergizes to step the wipers into engagement with their nineteenth bank contacts in the same manner as previously described. The wipers of the rotary switch S remain in their nineteenth position as the line relays 807 and 508 are maintained energized during the time the carriage of the punch shown in Fig. 21 is being returned to its thirtieth position.

As previously mentioned, when the carriage returns to its thirtieth position, relay 805 is energized to disconnect ground from conductor 781 to deenergize line relay 508. Responsive to the deenergization of line relay 508 a circuit may now be traced for the start-stop magnet 631 as follows: from grounded conductor 427, through the normally closed springs controlled by armature 543, armature 561, conductor 408, the nineteenth bank contact and wiper 451, conductor 414, armatures 515 and 525, conductor 416, interrupter springs 454, conductor 415, and through the winding of the start-stop magnet 631 to battery. From the foregoing it will therefore be seen that the transmitting distributor is not started until after the carriage of the punch has been returned to its thirtieth position. The nineteenth to twenty-first bank contacts accessible to wiper 445 are connected by the three-conductor cable 457 to the bulk-and-yard-goods jack pins 25, 26, and 27, which are multipled and are connected to jumper 464 which in turn is connected to the No. 24 pin of the bulk and yard goods jack which also is in turn connected to the No. 1 conductor included in cable 404. In a similar manner the nineteenth to twenty-first bank contacts accessible to wiper 447 are connected by the three conductor cable 456 to the jack pins 29 to 31, inclusive, and connected by jumper 463 to the jack pin 28 and to the No. 6 conductor included in cable 404. With the wipers of the switch S in engagement with their nineteenth bank contacts and since the wipers 445 and 447 are grounded by way of conductor 407, the No. 1 and No. 6 conductors included in cable 404 are likewise grounded. Since the No. 1 and No. 6 conductors included in cable 404 are grounded, then the sending cam springs 601 and 606 transmit the space code to the receiving distributor in the same manner as previously described. The space code 1—6 is likewise transmitted by way of the twentieth and twenty-first bank contacts accessible to wipers 445 and 447, it being remembered that the stepping magnet SM operates to step the wipers one step after each code has been transmitted as previously described. After transmitting the three space codes in positions 19, 20 and 21 of the switch S, the wipers of the switch S are now in engagement with their twenty-second bank contacts whereupon the code transmitted is determined by the perforations in the card in the vertical column 22. Since the transmission of these codes takes place in the same manner as previously described it is therefore believed unnecessary to describe such operation. After the code has been transmitted from the twenty-fifth position of the switch S the wipers 445, 447, 449, 451, and 453 are rotated out of engagement with their bank contacts while the wipers 444, 446, 448, 450, and 452 are rotated into engagement with their first or twenty-sixth bank contacts. In the same manner as previously described the codes determined by the perforations in the cards corresponding to columns 26 to 31, inclusive, are now transmitted by the transmitting distributor.

In the receiving distributor the only difference in the operation is that the switching relay 907 is now energized instead of switching relay 908 with the result that the second group of punch magnets is now operated instead of the first group. The second group of punch magnets operate and lock the set-up bars in accordance with the codes perforated in the merchandise cards.

It will be remembered that when the carriage was returned to its thirtieth position the relays 804 and 805 had operated and that relay 805 at armature 828 had opened the circuit of relay 804 to cause its deenergization. Now when the line relay 807 is deenergized to transmit the start impulse just prior to the space code as determined by the wiring of the nineteenth bank contact of the switch S in Fig. 14, the line relay 807 at the normally closed springs controlled by armature 835 closes the circuit for energizing relay 806 as follows: from ground through resistance 850, normally closed springs controlled by armature 835, armature 826, and through the upper winding of relay 805 to battery. Relay 806, at armature 830, prepares a point in the send-back transmission circuit; at armature 831 completes a locking circuit for itself; at armature 832 prepares points in the circuits for relay 1121, the retract and trip magnets; at armature 833 closes a shunt around armature 823 and completes its own locking circuit to conductor 883; and at armature 834 connects the grounded release trunk conductor 883 to conductor 870 to maintain the switching relay 907 energized after the relay 805 deenergizes. The locking circuit for maintaining relay 806 energized may be traced as follows: From grounded conductor 883, armature 833, armature 849, armature 831 and through the lower winding of relay 806 to battery. When the off-normal springs 1119 open in response to the carriage moving out of its thirtieth position in response to the space code transmitted by the transmitter and switch S in its nineteenth position, the locking circuit of relay 805 is opened and said relay now deenergizes. The relay 806 is maintained energized during the second operation of the punch carriage and when the carriage again reaches its forty-second position springs 1112 again close. When the universal bar 204 closes springs 1110 the circuit for energizing relay 804 over conductor 885 is again completed.

When the punch is in its forty-second position and the punch magnets have operated universal bar 204 to complete the circuit for relay 804 by way of springs 1112 and conductor 885, it will be seen that the energization of relay 804, since relay 806 is locked in energized position, disconnects the grounded conductor 875 from conductor 781 at armature 820 to deenergize the line relay 508 in the transmitting distributor.

*Transmitter release*

In the transmitting distributor it will be remembered that the switch S has been returned to its first or normal position at which point a circuit for energizing the relay 503 may be traced as follows: from grounded conductor 427, wiper 453 in engagement with its first bank contact, conductor 422, armature 538, and through the winding of relay 503 to battery. At armature 522 relay 503 prepares a point in the circuit for energizing the print magnet 86 and at armatures 523 and 524 closes circuits to both windings of the differential signal relay 504 as follows: the circuit for the upper winding extends from conductor 427 by way of armature 524 and the circuit for the lower winding extends from ground through the lower winding of relay 504 by way of armature 523, resting contact of armature 530 and said armature, conductor 407, start springs 600, conductor 578, armature 566, conductor 582, and through the operating winding 1 of line relay 807 as previously traced to battery. The line relay 807 is held energized over this circuit while the differential relay 504 is prevented from operating because the two windings oppose each other. Line relay 508 deenergizes when relay 804 at armature 820 opens the circuit to conductor 781 and at armature 543 opens the circuit to the hold relay 506; at armature 544 prepares a point in the circuit to the print magnet 82; and at armature 545 opens the circuit to the bucking winding 2 of line relay 508. Hold relay 506, upon deenergizing, at armature 533 completes the circuit for energizing the print magnet 82 as follows: from grounded conductor 427, armature 573, normally closed springs controlled by armature 544, armature 533, armature 517 and its working contact, armature 522, armature 551 and its resting contact, armatures 562, 573, and 526 to conductor 401, terminal 43 of the bulk and yard goods jack, jumper 461 to the No. 32 bulk and yard goods jack terminal, conductor 458, and through the winding of print magnet 82 to battery. Print magnet 82 operates its armature to cause the springs 72 to be disengaged from the edges of the printing bars 74 to thereby release the print bars so that they are now actuated by the springs 75 to print the date of sale on the merchandise card. After the print bars have been released the pin 87 on print bar 74 closes its springs 88 for energizing the release magnet 91. The circuit for operating the release magnet 91 may be traced as follows: from grounded conductor 402, armature 572, conductor 429, springs 88, conductor 428, and through the winding of release magnet 91 to battery. Release magnet 91, upon energizing, at armature 91' completes an obvious locking circuit for itself from grounded start springs 65 and at springs 93 opens the original energizing circuit to the hold magnet 66. The operation of release magnet 91 also operates the release arm 67 to permit the armature 63 of the hold magnet to release and remove the lug 64 from the hole 62 in the bracket 61 to allow the transmitter cover to open. When the transmitter cover opens ground is removed from conductors 402 and 406 by the opening of the springs 65 and by the disconnection of the movable pin 38 from the card-check springs 110, 114, and 116. The disconnection of ground from conductor 402 opens the locking circuit of relay 502 which deenergizes; removes the ground from the polarizing winding No. 3 of line relay 508; opens the locking circuit of recording relay 510; and also disconnects ground from the hold magnet 66. The disconnection of ground at start springs 65 opens the locking circuit of release magnet 91 and the disconnection of ground from conductor 406 opens the circuit of the card-check relay 511 which now deenergizes. Relay 502, upon deenergizing, at armature 515 opens a point in the circuit to the start-stop magnet 631; at armature 516 opens a point in its own locking circuit; at armature 517 opens a point in the circuit to the print magnet 82 and prepares a point in the circuit to the release magnet 91; at armature 518 opens a point in the circuit to hold relay 506; at armature 519 opens the locking circuit of start relay 505 and removes ground from conductor 575; at armature 520 prepares a point in the signalling circuit; and at armature 521 prepares a point in the circuit to the upper winding of signal relay 504. Recording relay 510, upon deenergizing, at armature 557 closes a point in the restoring circuit of the switch S; at armature 558 prepares a point in the circuit for relay 502; at armature 559 and 560 opens points in the original energizing circuit of relay 507; at armature 561 disconnects ground from conductor 408; at armature 562 opens a point in the circuit of the print magnet 82; at armature 563 prepares a point in the circuit to the authorizing relay 509; at armature 564 opens a point in its own locking circuit; at armature 565 opens the locking circuit of switching relay 507; and at armatures 566 and 567 disconnects the transmitter from conductors 582 and 581. Card-check relay 511, upon deenergizing, at armature 572 opens points in the circuits to the hold magnet 66 and release magnet 91; and at armature 573 opens another point in the circuit to the print magnet 82 and disconnects ground from relay 505 and conductor 575. Switching relay 507, upon deenergizing, at armature 538 opens the circuit to relay 503 which deenergizes; at armature 539 prepares the original energizing circuit to the start-stop magnet 631; and at armature 540 opens a point in its own locking circuit. Relay 505, upon deenergizing, at armature 531 opens a further point in its own locking circuit and prepares a point in its original energizing circuit and at armature 532 opens the original energizing circuit for relay 507. Relay 507, upon deenergizing, at armatures 523 and 524 opens points in the circuits to both the windings of signal relay 504 and at armature 522 opens another point in the circuit to print magnet 82. All of the relays and all of the equipment in the transmitter are in normal position and the various cards may now be removed from the transmitter and new cards placed therein for a new sales transaction.

When ground is disconnected from conductor 582, line relay 807 in the receiving distributor deenergizes and at armature 835 disconnects ground from conductor 773. At armature 836 relay 807 disconnects ground from the bucking winding 2 of line relay 807 and at armature 838 opens the circuit to the hold relay 808 and closes a circuit to the start-stop magnet 1031 to cause the receiving distributor to rotate one or more revolutions dependent upon the speed with which relay 808 releases. Due to this revolution of the distributor the locked-up pick-up relays are deenergized to open the circuit to the operated punch magnets which now release and permit the carriage of the punch to move from its forty-second position into its forty-third position to close springs 1113 as previously described. Since the line relay 807 is not energized during this revolution of the cam shaft, none of the pick-up relays are energized.

*Punching operation and release*

The closure of springs 1113 grounds the conductor 1187 to cause the energization of relay 1121, retract magnet and trip magnet 1179, by way of armature 832 and conductor 886. Relay 1121, upon energizing, at armature 1123 disconnects the conductor 882; at armature 1124 completes a locking circuit for itself from grounded off-normal springs 1119; at armature 1124 grounds conductor 881 to re-energize relay 810; and at its resting contact opens the circuit to relay 804 which now deenergizes. Trip magnet 1179 operates its armature 1180 to cause the card to be punched and ejected and a new card to be inserted; the carriage to be returned to its twenty-sixth position because the retract magnet has operated to raise the lug 215; and to release the locked-up set-up bars because the release roller 212 has been operated by the retract magnet in the same manner as previously described. When the brushes 1182 and 1183 close the circuit to the magnetic clutch 1189 and relay 1122, the conductor 889 is grounded to energize relay 811. Relay 811 operates and at armature 849 opens the locking circuit of relay 806 which now deenergizes. The circuit for energizing relay 810 may be traced from grounded release trunk conductor 883 or from the grounded off-normal springs 1118, armature 1125, conductor 881, through the winding of relay 810 and thence by way of start conductor 876 and start springs 1000 through the winding of the start-stop magnet 1031 to battery. Due to the high resistance of relay 810 the start-stop magnet 1031 is not operated over this circuit. At armature 847 relay 810 disconnects the conductor 781 and at armature 848 disconnects one of the ground connections from conductor 883. Hold relay 808, upon deenergizing, at armature 839 opens a point in its own locking circuit and prepares a point in the circuit of relay 809; at armature 840 opens a point in the circuit to the start-stop magnet 1031 at its working contact and at its resting contact connects ground through the normally closed springs controlled by armature 838 through the winding of relay 810 to maintain the latter relay energized; and at armature 841 removes another ground connection from the release trunk conductor 883. When the punch is returned to normal position as previously described off-normal springs 1118 remove ground from conductor 883. The disconnection of ground from conductor 883 releases relay 809 and switching relay 907 and also removes ground from conductor 783. Responsive to the disconnection of ground from conductor 783 relays 722 and 725, and magnet 702 deenergize. The deenergization of magnet 702 releases the plunger 707 and the primary and secondary line switches in Fig. 17 are now in normal position, the rotary switch RS remaining in the position last used. All of the equipment involved in making this cash sale is now in normal position and may be used on subsequent transactions.

The card perforated by the punch and ejected into the card hopper is termed a "sales audit and accounts receivable card" and has been perforated with the date of sale, the cashier's number, the clerk's number, the class of goods, the department number, the serial number, the sales price, and other necessary perforations, in accordance with the perforated cards placed in the transmitter.

*Charge or credit sale*

It will now be assumed that a customer having a charge account desires to make a purchase and charge it to her account. Each customer having a charge account will be furnished with an identification card having perforated code data corresponding to the customer's number, and, in addition, having a single hole punched in the position of the card-check pins so that pin 113 shown in Fig. 14 alone is effective for controlling the transmitter. The general procedure is to give the customers different numbers from the cashiers' numbers. When the sales clerk makes the sale and the customer tells her to charge it to her account, the customer will give her card to the clerk, who in turn will give the customer's card along with her own to the cashier, together with the merchandise card, and the cashier will insert the merchandise card, the customer's card, and the clerk's card in the transmitter. The cashier will now close the transmitter and in case the cards are properly inserted the card-check relay 511 is energized from start spring 65 by way of pins 116 and 113 over the conductor 405 and through the upper winding of card-check relay 511 to battery. The relay 502 is also energized as previously described from grounded springs 65, pins 116 and 110 by way of conductors 459 and 402 before the card-check relay 511 is energized. In the same manner as previously described, relay 502 energizes and at armature 515 prepares the circuit of the distributor start-stop magnet 631; at armature 516 closes its own locking circuit; and at armature 518 prepares a circuit for the hold relay 506. Card-check relay 511, upon energizing, at armature 568 prepares a circuit to the authorizing relay 509 and at armature 572 energizes the hold magnet 66 from grounded conductor 402 by way of conductor 429 and springs 93. Hold magnet 66, upon energizing, at springs 89 prepares a circuit for the recording relay 510 which, however, is not effective at this time since the customer's card does not permit connection to pin 114 and at armature spring 99 completes the circuit for energizing the authorizing relay 509 as follows: from grounded start springs 65, pin 116, pins 38 and metal strip 37 to pin 113, conductor 405, armature 568, conductor 423, springs 90, conductor 426, armature 563, and through the lower winding of authorizing relay 509 to battery. Authorizing relay 509, upon energizing, at armature 546 disconnects conductor 421 from conductors 420 and 417 so that the transmitter will transmit the customer's number in positions 1 to 6, inclusive, of the switch S; at armature 547 disconnects conductor 419 from conductor 417 so that the transmitter will transmit the sales price of the article to be charged and also connects conductor 409 to conductor 419. Relay 509 at armature 548 prepares the circuit to maintain relay 502 energized when the last digit or the units value of the sales price is transmitted even if there is a mistake in the transmission and checkback of the code; at armature 549 opens the original energizing circuit of relay 502 which is now locked energized; at armature 550 prepares the circuit for the start-stop magnet 631 when wiper 451 reaches its third position; at armature 551 prepares a circuit for later on energizing the recording relay 510; at armature 552 opens a point in the circuit to relay 510; at armature 553 prepares a point in a temporary locking circuit for relay 509; and at armature 554 prepares a locking circuit for the switching relay 507. Relay 509 at armature 555 connects conductor 582 to the operating winding 1 of the line relay 508 and at armature 556 connects the conductor 581 to the grounded conductor 578 for energizing the line relay 701 in the plunger line-switch shown in Fig. 17. This latter circuit may be traced as follows: from grounded conductor 427, armature 574, normally closed springs controlled by armature 523, armature 530, conductor 407, via the normally closed start springs 600, conductor 578, resistance 528, armature 556, resting contact of armature 567 and said armature, conductor 581, springs 705, and through the lower winding of line relay 701 to battery. Line relay 701 operates in the manner previously described to energize the plunger magnet 702. The plunger magnet 702 operates the plunger armature 707 to close springs 708, 709, 710, and 711 and to open springs 705 and 706. Spring 705 and 706 disconnect the line relay 701 which, however, releases slowly while the springs 708 ground the conductor 712 to operate the master switch to select another idle line switch. At springs 710 the line conductor 582 is connected to the upper winding of the line relay 723 without effect at this time since conductor 582 is not grounded, and at springs 711 connects the conductor 581 to the lower winding of line relay 723 for energizing relay 723 since the conductor 581 is grounded. Line relay 723, upon energizing, at armature 749 grounds conductor 791 to maintain the plunger magnet 702 energized; at armature 750 prepares a circuit for the recording relay 725 which, however, is ineffective at this time since the conductor 582 is not grounded; at armature 751 closes the circuit for energizing the authorizing relay 726, and at armature 752 closes the circuit for energizing relay 724. The circuit for energizing the authorizing relay 726 extends from the grounded conductor 581, plunger springs 711, armature 743, armature 747 and its resting contact, armature 751, and through the upper winding of authorizing relay 726 to battery. Relay 724, upon energizing, at armature 753 grounds conductor 791; at armature 754 prepares a point in the circuit for operating the stepping magnets 734 and 774; and at armature 755 prepares a point in the circuit for energizing relays 713 and 714. Authorizing relay 726, upon energizing, at armature 763 removes one of the ground connections from the all-trunks-busy conductor 77; at armature 764 connects up the line wiper 772; at armature 765 prepares a point in the circuit for energizing relay 721; at armature 766 completes a locking circuit for itself through its lower winding to grounded conductor 791; at armature 767 connects up the test wiper 773; at armature 768 completes a circuit for the stepping magnet 774 in case the test wiper 773 is in engagement with a busy authorizing trunk; at armature 769 prepares a circuit for the authorizing chain relay 713; and at armature 770 connects up the line wiper 771. The operation at this time depends upon whether the wipers of the switch SD are connected to the bank contacts terminating a busy authorizing trunk or not. If the trunk is busy, then conductor 1283 is grounded and the test authorizing relay 713 is short circuited as follows: from grounded conductor 1283, bank contact and test wiper 773, armature 767, armature 746 and its resting contact, armatures 733 and 769, and through the lower winding of authorizing test relay 713 and thence by way of armature 718 and similar armatures in the chain circuit indicated by the dotted line to armature 729 which is grounded. Test relay 713 therefore does not energize over the above-traced circuit and a branch of this circuit may be traced by way of armatures 764 and 768 for energizing the stepping magnet 774. Stepping magnet 774 energizes and near the end of its stroke operates the interrupter springs 775 to deenergize itself. Magnet 774, upon deenergizing, steps the wipers 771 to 773, inclusive, one step and again closes its interrupter springs 775 whereupon if the wiper 773 again engages a grounded bank contact the wipers are again stepped into engagement with their next bank contact. Stepping magnet 774 therefore operates in the manner of a buzzer to step the wipers step by step until the test wiper 773 no longer encounters a grounded bank contact. When test wiper 773 stops on a non-grounded bank contact or in engagement with the bank contacts terminating an idle authorizing trunk, the test relay 713 is no longer short-circuited and therefore energizes in series with the stepping magnet 774 as follows: from grounded armature 729 through the chain circuit to armature 718 and through the lower winding of relay 713 by way of armatures 769, 755, 754, and 768, through the interrupter springs 775 and through the winding of stepping magnet 774 to battery. Test relay 713 energizes over the above-traced circuit but the stepping magnet 774 due to the high resistance on the lower winding of test relay 713 does not energize. At armature 717 relay 713 temporarily locks itself to the grounded conductor 791; at armature 718 opens a point in the chain circuit; and at armature 719 closes the circuit for energizing the cut-through relay 722. This circuit may be traced from grounded armature 730, over the dotted chain circuit to armature 719 and its working contact, and thence by way of conductor 786 through the upper winding of cut-through relay 722 to battery. Relay 722, at armature 744 opens the circuit to the upper winding of relay 723 at its resting contact and at its working contact connects the line conductor 582 to the line conductor 1282 of the authorizing trunk; at armature 745 locks itself through its lower winding to the grounded conductor 791; at armature 746 and its resting contact opens a point in the circuit to the stepping magnet 774 and at its working contact connects the grounded conductor 791 to conductor 1283 by way of armature 767 and wiper 773; at armature 747 and its resting contact opens the circuit to relay 723 which now deenergizes and at its working contact connects the grounded line conductor 581 to line conductor 1281 of the authorizing trunk by way of armature 770 and wiper 771. At armature 752 relay 723 opens the circuit of slow-to-release relay 724 which releases slowly but now before ground is returned over conductor 1283 from the recording trunk. Relay 724, upon deenergizing, at armatures 754 and 755 opens the circuit of test relay 713 which deenergizes to again complete the chain circuits.

Referring now to Fig. 22, relay 1207 is normally energized over the following circuit: from ground through the normally closed springs controlled by armature 1238, armature 1239 and its resting contact, through the winding of guard relay 1207, conductor 1276, through the normally closed start springs 1400, and through the start-stop magnet 1431 to battery. Guard relay 1207 alone is energized over this circuit and the start-stop magnet 1431 does not energize due to the high resistance of relay 1207. When the conductor 1283 is grounded in response to the operation of the cut-through relay 722 a circuit may be traced from grounded conductor 1283 by way of resting contact of armature 1213 and said armature, and through the polarizing winding 3 of line relay 1205 to battery. The line relay 1205 is energized over the following circuit: from grounded conductor 581, plunger springs 711, armature 743, and its working contact, armature 747 and its working contact, armature 770, wiper 771 and engaged bank contact, conductor 1281, armature 1219 and its resting contact, armature 1222 and its resting contact, and through the operating winding 1 of line relay 1205 to battery. At armature 1235 relay 1205 prepares a circuit through the interrupter cam springs 1418 in Fig. 24 by way of conductor 1273; at armature 1236 closes a circuit to its bucking winding 2 which energizes and just balances the line winding 1 but allows the polarized winding to hold the relay operated; at armature 1238 opens the circuit to the guard relay 1207 and closes the circuit to the hold relay 1206. Hold relay 1206, upon energizing at armature 1239 and its resting contact, opens another point in the circuit to the guard relay 1207, and at its working contact prepares a circuit to the start-stop magnet 1431; and at armature 1240 grounds the conductors 1285 and 1283 to maintain the relays associated with the line switches in operated position. Guard relay 1207 deenergizes after an interval and at armature 1241 connects the grounded conductor 1275 to conductor 1282 to energize the line relay 508 in the transmitting distributor and at armature 1242 connects another ground to conductors 1285 and 1283.

The circuit for energizing line relay 508 may be traced as follows: from grounded cam springs 1408, send-back conductor 1275, armature 1243, resting contact of armature 1221 and said armature, normally closed springs controlled by armature 1217, armature 1241, conductor 1282, wiper 772, armatures 764 and 744, plunger springs 710, conductor 582, armature 566 and its resting contact, armature 555, resistance 541, and through the operating winding 1 of line relay 508 to battery. Line relay 508, on energizing, at armature 545 energizes the buckling winding 2 so as to balance the operating winding 1 but the polarized winding 3 holds the line relay in energized position; at armature 544 connects ground to the lower winding of error-check relay 501; and at armature 543 completes a circuit for energizing the hold relay 506 by way of armature 518. Hold relay 506 energizes and at armature 534 grounds the start conductor 575 to start the motor 630 of the distributor and for energizing the start relay 505 from grounded armature 573 through the normally closed springs controlled by armature 531. The motor 630 operates the shaft of the distributor without operating the cams in the same manner as previously described. After an interval of time slow-to-operate start relay 505 energizes and at armature 531 locks itself energized and also maintains the circuit to the motor 630; and at armature 532 closes the circuit for operating the start-stop magnet 631 from grounded conductor 427 by way of armatures 534, 532, and 539, conductor 413, wiper 451, conductor 414, armatures 515 and 525, conductor 416, interrupter springs 454, conductor 415 and through the winding of start-stop magnet 631 to battery. Start-stop magnet 631 operates and operates its armature 632 to release the cam shaft to start it in its first revolution to transmit the code of the first digit in the customer's number. The cams close in the same sequence as previously described and when the start cam opens springs 600 to disconnect ground from conductor 578 the line relay 1205 in the authorizing trunk associated with the receiving distributor therein deenergizes very quickly on account of the circuit through the bucking winding 2 which kicks the relay down. When line relay 1205 deenergizes the hold relay 1206 is maintained in operated position due to the resistance bridged across the terminals of the winding of relay 1206 which renders the relay slow to release and at the normally closed springs controlled by armature 1238 grounds conductor 1276 for energizing the start-stop magnet 1431 by way of start springs 1400. Start-stop magnet 1431 operates its armature 1432 to release the cam shaft to permit the cams to rotate therewith without slipping. The receiving distributor shown in Fig. 24 is similar to that shown in Fig. 20 and in Figs. 12 and 13 and has an alternating current synchronous motor 1430 which is continuously operated. In the same manner as previously described the transmitting distributor shown in Fig. 14 and the authorizing distributor shown in Fig. 24 now operates their respective cam shafts in synchronism. The transmitting distributor now transmits the customer's number in the same manner as it transmitted the cashier's number. The pick-up relays shown in Fig. 23 are similar to the pick-up relays shown in Fig. 19 and therefore operate in a similar manner and the authorizing receiving distributor sends back the same code it receives in the same manner as described for the recording receiving distributor. The pick-up relays 1301 to 1306, inclusive, are operated over the conductors 1 to 6, inclusive, included in cable 1390 from the receiving springs 1411 to 1416, inclusive, in response to the received code pulses in the same manner as described in connection with Figs. 19 and 20 for the recording distributor. Also the conductors 1 to 6, inclusive, included in cable 1391 cause the sending springs 1401 to 1406 to transmit back to the transmitting distributor the same code as received on the pick-up relays shown in Fig. 23.

*Transmission*

Assuming now that the customer's number is 282222 the transmitting distributor transmits the code of the first digit (2) of the customer's number or the code 2—4 over the conductor 581 in the same manner as previously described. Line relay 1205 associated with the authorizing receiving distributor operates responsive to this code and at armature 1235 completes circuits for pick-up relays 1302 and 1304 when the cam springs 1412 and 1414 and the interrupter springs 1418 are closed. These circuits may be traced from ground through resistance 1250, armature 1235, conductor 1273, interrupter springs 1418 where the cam 1412 completes the circuit to relay 1302 over conductor 2 of cable 1390 while cam 1414 completes the circuit to relay 1304 over conductor 4 of cable 1390. Pick-up relays 1302 and 1304 energize and lock up to grounded lock conductor 1393 as follows: from ground by way of armature 1240, conductor 1285, armature 1223, conductor 1274, lock springs 1407 controlled by the lock cam, lock conductor 1393, and by way of armatures 1332 and 1334 through the lower windings of relays 1302 and 1304 to battery. The pick-up relays also have a chain circuit comprising armatures 1321 to 1326 which stop further transmission in case the wrong combination of pick-up relays is energized. This chain circuit is similar to the chain circuit described in connection with the pick-up relays shown in Fig. 19. The lock conductor 1393 grounds the conductors included in cable 1391 in accordance with the operated pick-up relays to send the same code as received back to the transmitting distributor. The code sent back may be traced from grounded conductor 1393 through the upper armatures of the operated pick-up relays over the conductors included in cable 1391, through the send-back springs 1401 to 1406, inclusive, and by way of conductor 1275, armature 1243, resting contact of armature 1221 and said armature, normally closed springs controlled by armature 1217, armature 1241, and over conductors 1282 and 582 to the operating winding 1 of line relay 508. The remaining codes of the customer's number are received and retransmitted back in a manner similar to that described during the recording of a cash sale and it is therefore believed unnecessary to describe these circuits in detail. However, the transmitting distributor operates a little different for an authorizing or charge sale, and these differences will be pointed out in detail hereinafter.

*Selection of credit position*

When the pick-up relays 1302 and 1304 energize and lock in response to the code corresponding to the first digit of the customer's number, a circuit may be traced from grounded conductor 1274, mark springs 1417 controlled by the mark cam, mark conductor 1394, resting contact of armature 1343 and said armature, resting contact of armature 1346 and said armature, armature 1345 and its resting contact, armature 1342 and its working contact, armature 1364, conductor 2 included in cable 1392, armature 1535 and its resting contact, armature 1542 and its resting contact, armature 1552 and its resting contact, armature 1562 and its resting contact, and through the winding of selecting relay 1509 to battery for energizing the latter relay. At armature 1532 relay 1509 prepares a circuit for energizing relay 1510 which, however, is short circuited at this time from grounded conductor 1285 through armature 1529 and its resting contact, to armature 1532 and to the grounded conductor 2 included in cable 1392 over the armatures in the previously traced circuit. When ground is removed from the mark conductor 1394 by the operation of the mark cam springs 1417 at the start of the next revolution of the distributor cam shaft the short circuit is removed from around relay 1510, relay 1510 energizes in series with relay 1509 as follows: from grounded conductor 1285, by way of armature 1529 and its resting contact, armature 1532, through the winding of relay 1510 and through the winding of relay 1509 to battery. At armature 1538 relay 1510 closes an obvious circuit for energizing relay 1502 and at armatures 1560 to 1569, inclusive, prepares circuits for the position relays individual to the last five positions or the positions beginning with the numeral 2. Relay 1502, upon energizing, at armatures 1521 to 1525 prepares circuits for each of the No. 1 trunk lamps associated with the last five credit authorizing positions.

After the transmission of the code of the first digit in the customer's number the wipers of the switch S in Fig. 14 step to their second position and then transmit the code of the second digit in the customer's number, or digit 8. Since the code for digit 8 is 2—3, pick-up relays 1302 and 1303 are energized and lock in a manner similar to that previously described. Responsive to the energization of pick-up relays 1302 and 1303 the checking code is sent back to the transmitting distributor and conductor No. 8 in cable 1392 is grounded. The grounding of this conductor closes a circuit for lighting the No. 1 trunk lamp at authorizing position No. 28—29 by way of grounded No. 8 conductor in cable 1392, armature 1525, the No. 1 trunk lamp at position No. 28—29, conductor 1289, and through the winding of relay 1210 to battery.

By the lighting of the No. 1 trunk lamp at position 28—29 the credit or authorizing clerk thereat knows the number of calls awaiting her attention, and on which trunk the calls are coming over. Relay 1210, upon energizing over the above-traced circuit, at armature 1249 opens the circuit of the alarm relay 1202 so as to deenergize the alarm relay and at armature 1216 open the circuit of relay 1260 which at armature 1261 opens the circuit of the dash-pot relay 1262 before the slow-to-operate dash-pot relay 1262 has had sufficient time to operate and close springs 1263. The grounding of conductor No. 8 included in cable 1392 prepares a circuit for energizing the position cut-in relay 1615 individual to trunk No. 1 and position 28—29. This circuit may be traced from the grounded No. 8 conductor included in the cable 1392, armature 1568, conductor 1597, winding of position cut-in relay 1615, through the normally closed springs controlled by armature 1624, armature 1631, resting contact of armature 1647 and said armature to battery.

Before proceeding further with the circuit description it is believed advisable at this time to described the arrangement of the selecting relays shown in Fig. 25 and the position cut-in relay shown in Fig. 26. The relays 1505 and 1510 are individual to a trunk, in this case trunk No. 1, and the first pair of relays comprising relays 1505 and 1506 are provided for selecting the first five credit for authorizing positions numbered 00—01, 02—03, 04—05, 06—07, and 08—09, the second set of relays 1507 and 1508 are provided for selecting the second five authorizing positions numbered 10—11, 12—13, 14—15, 16—17, and 18—19, and the relays 1509 and 1510 are provided for selecting the last five positions numbered 20—21, 22—23, 24—25, 26—27, and 28—29. In Fig. 25 the conductor 1595 is shown connected to the first position cut-in relay 1601 to enable the No. 1 trunk to be connected with the first position, or position 00—01. In a similar manner conductor 1597 is connected to the position cut-in relay 1615 for connecting the No. 1 trunk to the fifteenth or last authorization position 28—29. The remaining conductors, shown bracketed to conductors 1595', extend to position cut-in relays individual to the trunk No. 1 and to the position indicated below each conductor. The relays 1500 to 1502, inclusive, are also individual to trunk No. 1 and control circuits for lighting the No. 1 trunk lamp at all of the authorizing positions. In Fig. 25 only one of the trunk lamps per position is shown connected for use. It will be understood that similar relays in the other authorizing trunks control lamp circuits similar to those shown for the other authorizing trunk lines. At the right hand corner of Fig. 25 the relays 1598, 1598', and 1599 correspond to fifteen relays, one relay for each authorizing position. For example, relay 1598 is provided for position 00—01, while the relay 1599 is provided for position 28—29.

Referring now to Fig. 26, there is one position cut-in relay for each trunk for each authorizing position. For example, position cut-in relay 1601 is provided for connecting the No. 1 trunk to the first position, or position 00—01, while the fifteen position cut-in relays or relay 1615 is provided for connecting trunk No. 1 to the fifteenth position or to position 28—29. Position cut-in relay 1601' is provided for connecting trunk No. 15 to the first position 00—01, while the position cut-in relay 1615' is provided for connecting the No. 15 trunk to position 28—29. The dotted lines between the various armatures and the position cut-in relays designate the connections to the other position cut-in relays, not shown, which are provided for the remaining trunks and the remaining positions. From the foregoing it will be seen that relays 1601 to 1615, inclusive, are individual to the No. 1 trunk, while the position cut-in relay 1601' to 1615', inclusive, are individual to trunk No. 15, while the positions 1601 and 1601' are also individual to positions 00—01 and the position cut-in relay 1615 and 1615' are also individual to the position 28—29.

Position cut-in relay 1615, upon energizing over the above-traced circuit, at armatures 1616 and 1617 prepares a talking point in the talking circuit for the authorizing position 28—29; at armature 1618 prepares a point in the circuit for transfer relay 1204; at armature 1619 prepares the circuit for relay 721; at armature 1620 completes the circuit for energizing the No. 2 print magnet of the electromagnetic printer; at armature 1621 prepares a circuit for relay 1503; at armature 1622 prepares the circuit for relay 1599; at armature 1326 prepares a point in its own locking circuit; and at armature 1624 closes its own locking circuit and opens the chain circuit to prevent any other position cut-in relay individual to position 28—29 from locking up. The locking circuit for position cut-in relay 1615 extends from grounded conductor 1285, armature 1623, the winding of position cut-in relay 1615, working contact of armature 1524 and said armature and through the lower winding of relay 1646 to battery. Relay 1646 energizes over the above-traced circuit and at armature 1647 disconnects battery from armatures 1631 to 1645, inclusive, to prevent the energization of any position cut-in relay individual to position 28—29. At armature 1647 relay 1646 completes a circuit for relay 1630 which now energizes and at armatures 1631 and 1645 opens a further point in the original energizing circuits of the position cut-in relays individual to position 28—29. The circuit for energizing the No. 2 print magnet of the electromagnetic printer extends from grounded armature 1526, by way of conductor 1591, armature 1620, conductor 1691, and through the winding of the No. 2 print magnet to battery. It should possibly be mentioned at this time that the last five authorizing positions have the conductor, such as conductor 1691, connected to the No. 2 print magnet so as to print the first digit of the customer's number. It being undersood that each authorizing position is allotted a certain group of customers' numbers and when customers charge a sale the call is routed to a particular authorizing position or to the position in which the authorizing clerk has records that she may consult. In a similar manner the first five positions have a conductor, similar to conductor 1691, extending through the No. 0 print magnet since all of the first five positions begin with 0. A conductor, similar to conductor 1691, also extends to the No. 1 print magnet in all the second group of authorizing positions. The electromagnetic printer magnet No. 2 is energized over the above traced circuit and prints the numeral 2 on the tape in the printer. In addition, the operation of the No. 2 print magnet operates an escapement to cause the carriage to move one step and also operates a bar which is common to all the numeral print magnets to close springs 1751. When the escapement causes the movement of the carriage to its second position the carriage off normal springs 1752 close a circuit over conductor 1693 through the upper winding of relay 1646 to maintain this relay in energized position as long as the electromagnetic printer is in an off normal position. When springs 1751 close in response to the operation of the print magnet, conductor 1692 is grounded and a circuit may now be traced for energizing relay 1503 as follows: From grounded conductor 1692, armature 1621, conductor 1592, armature 1528 and its resting contact, and through the winding of relay 1503 to battery. At armature 1526 relay 1503 opens the circuit extending to the No. 2 print magnet which now deenergizes and at armature 1527 prepares a circuit for relay 1504, which, however, at this time is short circuited from grounded conductor 1285 by way of conductors 1592 and 1692 to springs 1751. When springs 1751 open after the numeral 2 has been printed on the tape the short circuit around relay 1504 is removed and the latter relay energizes in series with relay 1504 by way of grounded conductor 1285, armature 1527, through windings of relays 1504 and 1503 to battery. At armature 1528 and its resting contact relay 1504 opens the original energizing circuit for relay 1503 but this latter relay is now maintained energized in series with relay 1504 and its working contact prepares a circuit for relay 1208. At armature 1529 and its resting contact relay 1504 opens the locking circuit of relays 1509 and 1510 which now deenergize and at its working contact closes a circuit for energizing relay 1599. At armatures 1533, 1534 and 1535 relay 1504 disconnects the circuit to the selection relays 1505 to 1510, inclusive, and prepares a circuit for connecting conductors 0, 1 and 2 in cable 1392 to the same conductors included in cable 1590. Selection relays 1509 and 1510 deenergize and prepare the original energizing circuit for the selection relays and also releases relay 1502 to extinguish the No. 1 trunk lamp. The circuit for energizing relay 1599 may be traced as follows: From grounded conductor 1285, armature 1529 and its working contact, conductor 1593, armature 1622, conductor 1596, and through the winding of relay 1599 to battery. At armatures 1580 to 1589, inclusive, relay 1599 connects the conductors of cable 1590 to the conductors of cable 1392. Since the No. 8 conductor included in cable 1392 is grounded at this time by the energized pick-up relays 1302 and 1303 the number 8 print magnet is energized over the following circuit: From grounded No. 8 conductor of cable 1392, armature 1588 to No. 8 conductor included in cable 1590 and to the No. 8 print magnet of the electromagnetic printer to battery. The energization of the No. 8 print magnet causes the numeral 8 to be printed on the tape and causes the carriage on the print to step into its third position. Springs 1751 are again closed in response to the operation of the No. 8 print magnet and at this time closes a circuit for energizing the relay 1208 as follows: From grounded springs 1751, conductor 1692, armature 1671, conductor 1592, armature 1528 and its working contact, conductor 1288, and through the upper winding of relay 1208 to battery. Relay 1208 at armature 1243 opens the circuit extending from grounded conductor 1275 to line relay 508 in the transmitting distributor to deenergize the same; at armature 1244 prepares a circuit for relay 1209; and at armature 1245 completes a locking circuit for itself by way of grounded conductor 1285 and its lower winding.

In case position 28—29 is busy when the first two digits of the customer's number is transmitted then position cut-in relay 1615 is not operated when conductor 1597 is grounded because its energizing circuit is opened at armatures 1631 and 1647, and therefore the position is not connected up. The transmitting distributor after sending the second digit, or digit 8, stops until such time as the position becomes idle. When position 28—29 becomes idle, position cut-in relay 1615 operates and energizes the No. 2 print magnet. The operation of the print magnet operates relays 1503 and 1504 which in turn operates relay 1599 to connect up the pick-up relays and printer. Since the No. 8 conductor this last connection operates the magnet 8 to print the numeral 8 on the tape as previously described.

The transmitting distributor transmits the first two digits of the customer's number and the wipers of the switch S advance to their third positions after which the transmitter waits until the position is selected and the printer has printed the first and second digits of the customer's number. When the second digit of the customer's number is printed relay 1208 at armature 1243 opens the circuit to the line relay 508 and the latter relay then deenergizes to again operate the start-stop magnet 631 of the transmitting distributor. Responsive to the line relay 508 deenergizing a circuit may be traced for the start-stop magnet 631 as follows: From grounded conductor 427, normally closed springs controlled by armature 543, armatures 550 and 536, conductor 411, third bank contact engaged by wiper 451 and said wiper, conductor 414, armatures 515 and 525, conductor 416, interrupter springs 454, conductor 415, and through the winding of the start-stop magnet 631, to battery. The distributor cam shaft now operates and transmits the third digit of the customer's number, in this case the digit 2, or code 2—4, in the same manner as previously described.

In response to the start pulse transmitted by the transmitting distributor for the third digit, line relay 1205 deenergizes and at armature 1235 closes a circuit for energizing relay 1209. This circuit may be traced from ground through resistance 1250, normally closed springs controlled by armature 1235, armature 1244, and through the upper winding of relay 1209 to battery. At armature 1246, relay 1209 re-establishes the circuit over trunk conductor 1282 for line relay 508; at armature 1247 locks itself from grounded conductor 1285 through its lower winding; and at armature 1248 opens a point in the circuit to the alarm relay 1202. The transmitter and authorizing receiver distributors now operate in synchronism to first unlock the relays operated by the second digit and then operate and lock relays 1302 and 1304 to ground conductor 2 included in cables 1392 and 1590 to in turn operate the No. 2 print magnet in accordance with the code 2—4 (third digit, or digit 2), in a manner similar to that previously described.

The electromagnetic printer after printing the third digit automatically spaces the carriage one step so that the fourth digit of the customer's number will be printed in the fifth column as indicated in Fig. 27—B. In a similar manner the fourth, the fifth and the sixth digits of the customer's number is transmitted and checked by the two distributors after which the transmitting distributor steps to its seventh position from where the wipers are automatically stepped to their thirteenth position preparatory to transmitting the sales price of the article to be charged. This automatic circuit may be traced as follows: From grounded conductor 427, wiper 453, the multipled bank contacts from the seventh to the twelfth positions accessible to wiper 453, conductor 420, armature 557, conductor 417, interrupter springs 455, and through the winding of stepping magnet SM to battery. Stepping magnet SM operates its interrupter springs 455 and steps the wipers of switch S step by step into engagement with their thirteenth bank contacts. Switch S in thirteenth position closes a circuit to the start-stop magnet 631 as follows: From grounded conductor 427, armature 573, armatures 534, 532, and 539 and their working contacts, conductor 412, the multipled bank contacts to the thirteenth bank contact, wiper 451, conductor 414, armatures 515 and 525, conductor 416, interrupter springs 454, conductor 415 and through the winding of start-stop magnet 631 to battery. In the same manner as previously described the transmitting and receiving distributors operate in synchronism to transmit and check the code corresponding to the digits in the sales price of the article to be charged in positions thirteen to seventeen, inclusive, of the switch S. After transmitting the five digits of the sales price the switch S is stepped into its eighteenth position. In the authorizing trunk the line relay 1205, the pick-up relays in Fig. 23 operate in a manner similar to that described to operate the print magnets of the electromagnetic printer. The operated print magnets of the electromagnetic printer print the price of the article as indicated in Fig. 27—B in a manner similar to that previously described. As shown in Fig. 27—B the complete customer's number 282222 and the complete price $123.45 have been printed by the electromagnetic printer and the carriage of the printer has been automatically moved to its sixteenth position in order to print an indication as to whether the credit or authorizing clerk approves or rejects this transaction. The clerk at this authorizing position, upon reading the customer's number and amount of the sale, will search through a file located at this position in search of this particular customer's number.

Sale approved

After the printer prints the last digit of the sales price in its fourteenth position the carriage of the printer automatically spaces into its sixteenth position and automatically closes springs 1743. In this particular instance it will be assumed that this particular customer's credit is O. K. and the clerk will therefore operate the OK key to approve the sale. Responsive to the operation of the OK key, springs 1758 completes a circuit for energizing the OK magnet and springs 1760 grounds the conductor 1686 by way of resting contact of armature 1767 for energizing relay 1204 and grounds conductor 1684 for energizing trunk release relay 721. The OK magnet is operated to print the letters OK on the tape as shown in Fig. 27—B thereby indicating that this particular transaction has been approved by the credit clerk. Responsive to the operation of the OK magnet the carriage of the printer will move to its seventeenth position and in this position closes springs 1775 to complete an energizing circuit for the carriage return magnet. The operation of the carriage return magnet returns the carriage to its normal position and also advances the tape in the well known manner. When the carriage of the printer is fully restored to its normal position, the off normal springs 1752 open to remove ground from conductor 1693 to open the circuit extending to the upper winding of relay 1646.

The circuit for energizing relay 1204 may be traced as follows: From grounded springs 1753, armature 1766 and its resting contact, springs 1759 and 1760, resting contact of armature 1767 and said armature, conductor 1686, armature 1618, conductor 1286, and through the winding of relay 1204 to battery. Relay 1204, upon energizing, at armature 1220 places a shunt around armature 1241 and prepares a point in the talking circuit; at armature 1221 and its resting contact disconnects the send-back conductor 1275 from the line conductor 1282 and at its working contact prepares another point in the talking circuit extending to the authorizing position; at armature 1222 and its resting contact opens the circuit to the operating winding 1 of line 1205, and at its working contact prepares another point in the talking circuit to the authorizing position; at armature 1223 disconnects the grounded conductor 1285 from conductor 1274 to thereby remove ground from the lock conductor 1393 and mark conductor 1394 to in turn cause the deenergization of any locked up pick-up relay or operated print magnet, and at armature 1224 connects ground to conductor 1285.

The circuit for energizing trunk release relay 721 extends from ground by way of springs 1753, armature 1766 and its resting contact, OK key springs 1759 and 1760, resting contact of armature 1767 and said armature, conductor 1686, armature 1764 and its resting contact, conductor 1684, armature 1619, conductor 1284, bank contact and wiper 716 of switch AS, armature 765, armature 748, and through the winding of trunk release relay 721 to battery. At armature 741 relay 721 completes a locking circuit for itself by way of armature 749 to grounded conductor 791; at armature 742 grounds the conductor 791 from ground at plunger springs 709 and at the normally closed contact opens the locking circuits of relays 722 and 726 which now deenergize; and at armature 743 opens a further point in the talking circuit extending over conductors 581 and 1281. Relay 722, upon deenergizing, at armatures 744 and 747 again connects up the relay 723. Relay 726, upon deenergizing, at armatures 764, 767 and 770 disconnect the wipers of the switch AS; at armatures 765 opens the original energizing circuit of relay 721 which, however, is maintained energized over its locking circuit; at armature 763 grounds all trunk busy conductor 777; at armature 678 opens a point in the circuit to the authorizing stepping magnet 774 and at armature 769 opens a point in the circuit extending to the authorizing test relay 713.

When relay 1204 opened the circuit of line relay 1205 the latter relay deenergizes and at armature 1238 opens the circuit to the hold relay 1206 and closes the circuit to the start-stop magnet 1431 to cause the authorizing receiving distributor cam shaft to rotate one or more revolutions depending upon the speed with which the slow acting release relay 1206 deenergizes. When relay 1206 deenergizes said relay at armature 1239 opens the circuit to the start-stop magnet 1431 and closes an energizing circuit for the guard 1207 and at armature 1240 disconnects one of the ground connections from conductor 1285. The circuit for energizing relay 1207 extends from ground through the normally closed springs controlled by armature 1238, armature 1239 and its resting contact, winding of relay 1207, conductor 1276, through the start springs 1400 and through the winding of start-stop conductor 1431 to battery. Guard relay 1207 alone energizes over this last traced circuit and at armature 1241 opens the transmitting circuit to conductor 1282 and at armature 1242 disconnects ground from conductors 1285 and 1283, thereby rendering the first trunk selectable. The disconnection of ground from conductor 1285 unlocks relays 1208 and 1209 in Fig. 22, relays 1503 and 1504, and 1599 in Fig. 25, and relays 1615 and 1646 in Fig. 26. The above-mentioned relays now deenergize, and since relay 1204 was deenergized also when the OK relay was restored and since relay 1630 also deenergizes in response to the deenergization of relay 1646, all of these relays and the printer are now in their normal positions and may be used on subsequent calls.

After transmitting the last digit of a sales price the transmitting and receiving distributor cam shafts are rotated one revolution without transmitting any code in order to release the pick up relays associated with the receiving distributor in the following manner. When the wipers of the switch S in Fig. 14 reach their eighteenth positions after transmitting the last digit of the sales price a circuit is closed for energizing the start-stop magnet 631 as follows: Grounded wiper 453 in engagement with its eighteenth bank contact, conductor 419, armature 547 and its working contact, conductor 409, eighteenth bank contact and wiper 451, and thence over the previously traced circuit to the start-stop magnet 631. In the same manner as previously described the two distributor cam shafts are rotated in synchronism but no code is transmitted because the eighteenth position of the switch S is a dead position. The rotation of the authorizing receiving distributor cam shaft unlocks any operated pick-up relays associated therewith and the operation of the transmitting distributor cam shaft causes the energization and the deenergization of stepping magnet SM to cause the wipers of the switch S to step to their nineteenth position in the same manner as previously described. From the nineteenth to the thirty-first position of the switch S the interrupting circuit for the magnet SM extends from wipers 453 and 452 by way of the multipled contacts and conductor 420, armature 557, conductor 417, interrupter springs 455, and through the winding of magnet SM to battery. From the thirty-second to the fiftieth position the interruption circuit of the stepping magnet extends from grounded wiper 452 by way of conductor 417 and interrupter springs 455 through the winding of stepping magnet SM to battery. Responsive to the operation of the stepping magnet SM the wipers of the switch S are stepped to their normal position or into engagement with their first bank contact. In normal position wiper 453 closes an energizing circuit for relay 503 as follows: From grounded conductor 427, wiper 453 in engagement with its first bank contact, conductor 422, armature 538 and through the winding of relay 503 to battery. At armature 522 relay 503 prepares a point in the circuit for energizing the recording relay 510. When ground is removed from conductors 1282 and 582 line relay 508 deenergizes and at armature 543 opens the circuit to the hold relay 506 long enough to deenergize the latter relay, and at armature 544 prepares another point in the circuit to the relay 510. Relay 506 after an interval deenergizes and at armature 533 completes the circuit for energizing the recording relay as follows: From grounded conductor 427, armature 573, normally closed springs controlled by armature 544, armature 533, armature 517 and its working contact, armature 522, armature 551 and its working contact, and through the upper winding of recording relay 510 to battery. At armature 563 relay 510 opens the original energizing circuit for relay 509; at armature 564 completes a locking circuit from grounded conductor 402 through its lower winding; at armature 565 opens the locking circuit of switching relay 507 and at armatures 566 and 567 transposes the conductors 581 and 582 with respect to the operating winding 1 of line relay 508 and the transmitting conductor 578. Switching relay 507 deenergizes in response to relay 510 opening its locking circuit and at armature 538 opens the circuit of relay 503; at armature 539 prepares a point in the circuit for the start-stop magnet 631; and at armature 540 opens a point in its own locking circuit. Relay 503, upon deenergizing, at armature 522 opens a point in the original energizing circuit to the recording relay 510 and at armature 523 grounds conductor 582 to operate relay 728. The circuits and the apparatus shown in Figs. 14 and 15 are now the same as at the start of a cash sale, with the exception that relay 509 is held energized over wiper 453 in its first position. When relay 503 deenergizes and grounds conductor 582 by way of armature 523, relay 723 energizes over the circuit previously traced for a cash sale. At armature 748 relay 723 opens a point in the original energizing circuit of relay 721; at armature 749 and its resting contact opens the locking circuit of relay 721 which now deenergizes and at its working contact grounds conductor 791. At armature 750 relay 723 again completes the energizing circuit for relay 725 and at armature 752 completes the circuit for energizing relay 724. Relays 724, 725, stepping magnet 734, test relay 714, and cut-through relay 722, operate to connect the transmitting distributor to an idle recording trunk by way of the wipers 731 to 733, as previously described in connection with a cash sale. When the cut-through relay 722 energizes in response to the operation of the test relay 714 the conductors 581 and 582 are connected to conductors 781 to 782 to again complete the circuit for energizing line relay 807 in Fig. 18 as previously described. Line relay 807, upon energizing, at armature 838 causes the deenergization of the guard relay 810 and also causes the energization of relays 808 and 809 as previously described. Relay 810, upon deenergizing, at armature 847 connects the grounded send-back conductor 875 to trunk conductor 781 to energize line relay 508 as previously described. Line relay 508 energizes and at armature 543 completes the circuit for energizing the hold relay 506 by way of armature 518. Hold relay 506 completes the energizing circuit for operating the motor 630 and for energizing the start relay 505. At armature 532 start relay 505 completes a circuit for energizing the start-stop magnet 631 and the first digit of the customer's number is now transmitted to the recording transmitter in the same manner as previously described. The operation of the transmitting distributor cam shaft operates the stepping magnet SM in the same manner as previously described and when wiper 453 moves to its second position the authorizing relay 509 deenergizes. From this point on the operations are now exactly the same as those performed during a cash sale and in this case the punch is operated to punch the card with the customer's number, the clerk's number, the sales price, the serial number of the article and other data, as previously described. From the foregoing it will be seen that a customer's charge sale is first automatically routed over an authorizing trunk to the correct authorizing position at which point an electromagnetic printer prints the customer's number and the price of the article to be charged and an indication that such sale has been approved. After approving the charge sale the authorizing trunk and printer are released and the transmitting distributor then transmits the entire sales data over a recording trunk to a recording distributor and to a punch which punches a card in accordance with the sales data transmitted.

*Sale rejected*

Referring now to the authorizing position 28—29 shown in Fig. 27 and at a time when the full sales price is printed on the tape and at a time when springs 1763 are closed with the printer in position 16, it will now be assumed that for some reason or other this particular customer is not entitled to charge the amount registered on the tape. When the authorizing operator, in accordance with the records, finds it necessary to reject a charge or credit sale the operator will operate the call back key CB thereby completing a circuit for energizing relay 1761 as follows: From ground by way of springs 1753 closed by the carriage in its sixteenth position, call back key springs 1754, and through the winding of relay 1761 to battery. At relay 1763 relay 1761 prepares a circuit for energizing relay 1762 in series with relay 1761 when the call back key is released; at armature 1764 and its working contact grounds conductor 1686 to energize relay 1204 over the circuit previously traced and at its resting contact opens the circuit to conductor 1684 to prevent the energization of relay 1721; and at armature 1765 grounds conductor 1690. Relay 1204, upon energizing, at armature 1220 closes a shunt around armature 1241 and prepares a point in the talking circuit; at armature 1221 disconnects send back conductor 1275 from conductor 1282 and connects the grounded conductor 1290 to conductor 1282; at armature 1222 opens the circuit extending to the operating winding 1 of line relay 1205 which then deenergizes and at its resting contact prepares another point in the grounded conductor 1285 from conductor 1274 to unlock any pick-up relays which may at this time be energized; and at armature 1224 grounds conductor 1285 to maintain the connection after the hold relay 1206 deenergizes and the guard relay 1207 energizes. Relay 1205, upon deenergizing, at armature 1238 opens the circuit of the hold relay 1206 which deenergizes and also prepares a circuit for energizing the guard relay 1207. Relay 1206, upon deenergizing, at armature 1239 and its working contact disconnects ground from conductor 1276 and at its resting contact completes the circuit previously traced for energizing guard relay 1207. At armature 1240 hold relay 1206 disconnects one of the ground connections from conductor 1285. Guard relay 1207, upon energizing, at armature 1242 disconnects another ground from conductor 1285 which, however, is still grounded at this time at armature 1224.

After the transmitting distributor has transmitted the last digit of the sales price the switch S in the transmitting distributor in Fig. 14 rotates its wipers back to their normal or to their first positions in which position the circuit for relay 503 is again closed as previously described. Relay 503 closes a circuit for energizing relay 504 from grounded conductor 427 by way of armatures 574 and 524 and through the upper winding of relay 504 to battery. This circuit is effective at this time for energizing relay 504 because the circuit through the lower winding of relay 504 is not closed since the relay 1762 has not yet closed armature 1769 to connect battery to the conductor 687 which is connected to connector 581 at this time. Since the circuit through the lower winding of signal relay 504 is open relay 504 therefore energizes and at armature 525 opens the circuit to the start-stop magnet 631; at armature 527 short circuits relays 502 since the line relay 508 is energized from grounded conductor 1690 over conductors 1290, 1282 and 582; and at armature 530 prepares a point in the talking circuit as well as opening the circuit through its lower winding. The short circuit around relay 502 extends from grounded conductor 402, resistance 513, armature 514, armature 516, through the winding of relay 502, armature 527, armature 545, to grounded conductor 402. Relay 502, upon deenergizing, at armature 515 opens a further point in the circuit to the start-stop magnet 631; at armature 516 opens a point in its own locking circuit; at armature 517 and its resting contact prepares a circuit for the release magnet 91; at armature 518 opens the circuit of the hold relay 506 which now deenergizes; at armature 519 opens the circuit of the start relay 505 and disconnects ground from conductor 575 to stop the motor 630; at armature 520 prepares a point in the signal circuit and at armature 521 connects ground to the upper winding of relay 504 in multiple with armature 524. Hold relay 506, upon deenergizing, at armature 533 prepares a point in the circuit to the release magnet 91; at armature 534 opens the original energizing circuit of relay 505 to prevent its reenergization when its locking circuit is opened at armature 519; and at armature 535 completes the signalling circuit for operating the buzzer and lamp 25 as follows: From grounded conductor 402, armature 572, armature 520, armature 535 and its resting contact, cradle springs 580, and to the buzzer and lamp 25 in multiple to battery.

When the credit operator releases the call-back key relay 1762 energizes in series with relay 1751 as follows: From ground by way of springs 1753, armature 1763, through the winding of relay 1762 and through the winding of relay 1761 to battery. Relays 1761 and 1762 are maintained in operated position over this circuit until the carriage of the printer is moved out of its sixteenth position. At armature 1766 relay 1762 disconnects the circuit to the OK key and at its working contact prepares the circuit to the reject key Rej.; at armature 1767 opens another point in the circuit to the OK key and connects ground to conductor 1686 to maintain relay 1204 in energized position; and at armature 1768 and 1769 completes the talking circuit to the telephone at this authorizing position.

The credit operator after releasing the call-back key CB, will remove the handset telephone from the cradle preparatory to talking to the cashier. The cashier in response to the operation of a buzzer and the lighting of lamp 25 removes the handset telephone from its cradle. Responsive to the removal of the handset from cradle springs 580 opens the circuit to the buzzer and light and springs 579 prepare a circuit for operating the release magnet 91. The authorizing or credit operator will now talk to the cashier over the following talking circuit indicated by the heavy black lines; from the monophone telephone circuit at the credit position by way of armature 1768, conductor 1690; armature 1616, conductor 1290, working contact of armature 1221 and said armature, normally closed springs controlled by armature 1217, armature 1220, conductor 1282, bank contact and wiper 772, armature 764, working contact of armature 744 and said armature, plunger springs 710, conductor 582, armature 566 and its resting contact, armature 555, to the receiver R and transmitter T at the monophone telephone circuit or at the cashier's position, working contact of armature 530 and said armature, conductor 407, start springs 600, conductor 578, armature 529, armature 556, resting contact of armature 567 and said armature, conductor 581, plunger springs 711, armature 743, armature 747 and its working contact, armature 770, wiper 771, conductor 1281, armature 1219 and its resting contact, armature 1222 and its working contact, conductor 1287, armature 1617, conductor 1687, armature 1769, to the telephone circuit at the authorizing position. The talking battery is supplied through grounded armature 1765 and through the impedance 1770.

The credit operator will inform the cashier that she is unable to approve this charge sale. As soon as the credit operator has informed the cashier that she cannot approve this sale, the credit operator will operate the reject key Rej., thereby closing a circuit for energizing the reject magnet as follows: From grounded spring 1753, armature 1766 and its working contact, reject springs 1751, and through the reject magnet to battery. The operation of the reject magnet causes the letter RE to be printed on the tape in the manner previously described, and causes the carriage of the printer to be advanced to its seventeenth position, whereupon spring 1775 closes a circuit for energizing the carriage return magnet to return the carriage to its normal position and space the tape one step in the well known manner. When tape of the printer moves out of its sixteenth position springs 1753 open and release relays 1761 and 1752. Relay 1762 upon deenergizing, at armatures 1768 and 1769 opens the talking circuit and relay 1761 upon deenergizing at armature 1765 disconnects ground from conductor 1690 to deenergize line relay 508. Springs 1753 also open when the carriage is advanced out of the sixteenth position to disconnect ground from conductor 1685 whereupon relay 1204 deenergizes. When the carriage reaches its normal position, springs 1752 open to remove ground from conductor 1693 to open a point in the circuit of relay 1646. The printer is now returned to normal position and may be used on subsequent transactions. Relay 1204, upon deenergizing, at armature 1224 disconnects ground from conductor 1285 to deenergize relays 1208 and 1209 in Fig. 22, relays 1503, 1504, and 1599 in Fig. 25, relays 1615 and 1646 in Fig. 26. The disconnection of ground from conductor 1285 also removes ground from conductor 1283 and conductor 791 to deenergize relays 722 and 726 and magnet 702 to restore the equipment in Fig. 17 to normal position. The authorizing trunk is now idle and will be used on other charge transactions.

Returning now to the transmitter and at a time when line relay 508 deenergizes in response to the disconnection of ground from conductor 1690 when relay 1761 deenergizes, a circuit for energizing the release magnet 91 may be traced as follows: From grounded conductor 427, armature 573, normally closed springs controlled by armature 544, armature 533, armature 517 and its resting contact, cradle springs 579, conductor 428, and through the winding of release magnet 91 to battery. Release magnet 91 operates its armature to open springs 93 and to move the catch 67 to effect the release of armature 63 of hold magnet 66. Hold magnet 66 deenergizes responsive to the opening of springs 93 and removes the lug 64 from the hole 62 in the bracket 61 to permit the cover of the transmitter to open. The opening of the start springs 65 opens the locking circuit of the release magnet 91; disconnects ground from conductor 402 and also disconnects ground from conductor 405 to deenergize the card-check relay 511. Relay 511, upon deenergizing, at armature 570 opens the locking circuit of authorizing relay 509 which now deenergizes; at armature 572 opens a point in the circuit to hold magnet 66 and also through the signal circuit; at armature 573 opens a point in the circuit to the release magnet 91; and at armature 574 disconnects one ground connection from the upper winding of signal relay 504. Authorizing relay 509, upon deenergizing, at armature 554 opens the locking circuit of switching relay 507 which deenergizes and at armatures 555 and 556 opens points in the talking circuit. Switching relay 507, upon denergizing, at armature 538 opens the circuit to relay 503 which also deenergizes. At armature 425, relay 503 opens the circuit to signal relay 504 which now deenergizes. All of the relays and equipment associated with the transmitting distributor are now released and in their normal position, or the position shown in the drawings, and may be used on subsequent sales transactions.

Emergency operation

The emergency key EM is provided to enable the credit operator to signal the distant cashier and release the printer and authorizing trunk in case the printer, due to some fault, fails to print the full data required. In this case the printer will not reach its sixteenth position with the result that the springs 1753 are not closed. In an instance of this kind the credit operator will first operate the emergency key to the left and then operate the call-back key CB to signal the distant cashier. The credit operator will advise the cashier of the fault and tell her to retransmit the sale. The credit operator then operates the reject key REJ to print a reject indication and then operates the emergency key to the right to operate the carriage-return magnet whereby the printer is restored. The above mentioned operations take place as follows: When the emergency key is operated to the left springs 1755 prepare a circuit for energizing call-back relay 1761. When the call-back key is operated relay 1761 energizes from grounded springs 1755 by way of call-back springs 1754 and through the winding of relay 1761 to battery. Relay 1761 at armature 1763 prepares the circuit for relay 1762; at armature 1765 grounds conductor 1690 and at armature 1764 grounds conductor 1686. Relay 1761 therefore causes the cashier to be signalled in response to the operation of the call-back key CB in the same manner as previously described. As long as the call-back key is held operated relay 1762 is short circuited and when the call-back key is restored relay 1762 energizes in series with relay 1761 from grounded springs 1755. Relay 1762 at armatures 1766 and 1767 disconnects the connections to the OK key and prepares the circuit through the reject key REJ while at armatures 1768 and 1769 the talking circuit is completed as previously described. After the credit operator tells the cashier of the fault and advises her to retransmit the sales data the credit operator replaces the telephone and operates the emergency key EM to the right to close springs 1756. The closure of springs 1756 completes a circuit for energizing the carriage return magnet which restores the printer and advances the tape as previously described.

The supervisory panel for the credit authorizing trunk shown in Fig. 22 is somewhat similar to that shown in Fig. 18. The alarm relay 1202 is a slow to operate relay which at armature 1216 completes a circuit for energizing relay 1260. Relay 1260 at armature 1261 closes a circuit for operating the slow to operate dash-pot relay 1262 which when fully operated closes springs 1263 to complete a circuit for lighting the supervisory lamp 1251 through the low resistance of left hand winding of relay 1260. As long as the system is working properly alarm relay 1202 is not energized long enough to allow the dash-pot relay 1262 to become fully operated to light lamp 1251 but in case relay 1210 or relay 1209 fail to operate due to fault then relay 1202 is operated a sufficient length of time to operate the lamp to advise the attendant of such fault. The attendant at the control room, upon observing that lamp 1251 is lighted will insert the plug of his hand set telephone into the jack J' and then turn the key SK to operate the signal relay 1203 to complete a talking connection with the cashier over the heavy talking conductors. Since the operations are practically a duplication of that previously described for Fig. 18, it is thought that further detailed description need not be given.

Both the recording trunk and the authorizing trunk have individual busy keys for busying the trunk so that the same can be worked on without danger of its being seized during a sales transaction. For instance, when the busy key in Fig. 22 is operated springs 1263 of the busy key close a circuit for energizing busy relay 1201. Relay 1201, upon energizing, at armature 1214 opens the circuit to the alarm relay 1202, at armature 1212 completes a circuit by way of grounded busy springs 1264 for lighting the busy lamp 1259 to thereby indicate that this trunk is artificially made busy; at armature 1213 grounds the polarizing winding of relay 1205; and at armature 1215 grounds conductor 1283 to make this trunk busy to the authorizing switches such as switch AS in Fig. 17 having access thereto.

Trouble other than transmission or check-back

There may be some cases of trouble where the cashier is not automatically signalled as previously described. Such a case may be due to dirty contacts, as for example, say contacts 820, 824 or distributor springs 1008 are dirty and do not permit ground to be transmitted back over conductor 781, and in this case no transmission takes place since the line relay 508 of the transmitter is not operated. Under these conditions the alarm relay 802 is energized from grounded release trunk conductor 783, armature 814, lower winding of relay 802, conductor 876, distributor start springs 1000 to battery through the winding of start stop magnet 1031. Alarm relay 802 is energized for a sufficient period to operate the dash-pot relay 862 to light the lamp 851 as previously described. The attendant thereupon operates the turn key 852 to energize relay 803 and inserts the plug P of the headset into jack J to ground conductor 781 from key 853 by way of armatures 817 and 847. The grounding of conductor 781 energizes line relay 508 and the transmitter starts to transmit the same as if no trouble has occurred. In this case, since the attendant's telephone circuit is connected to the trunk the error checking relay 501 is energized because the transmitted code does not check with the code received, since no code is received back. The operation of the error check relay 501 causes the operation of the buzzer and lamp 25 as previously described. The attendant naturally hears the transmitted code and therefore knows that no transmission has taken place. When the cashier answers the attendant advises the cashier to retransmit the sales transaction and operates the key 853 to cause the transmitter to unlock as previously described.

A similar case of trouble may occur in the authorizing trunk in case of dirty contacts such as contacts 1241, normally closed springs controlled by armature 1217, armatures 1221 and 1243, distributor springs 1408 or other contacts, and in this case the line relay 508 in the transmitter is not energized to start transmission. Alarm relay 1202 is therefore energized a sufficient length of time to cause the dash-pot relay 1262 to operate and light the lamp 1251 to signal the attendant. In a manner similar to that previously described the attendant operates the key SK and plugs in on the trunk to cause the cashier at the transmitter to be signalled after which the attendant advises the cashier to retransmit the sales transaction and unlocks the transmitter in response to the operation of key 1253. After the credit position is selected the credit operator can signal the cashier in case of failure of the printer or for other faults which will be evident by the incomplete operation of the printer. By the operation of the emergency key to the left to close springs 1755 and the operation of the call-back key to close springs 1754 by the credit operator the relay 1204 is energized to ground conductor 1282 to cause the cashier to be signalled in the manner previously described.

Another case of trouble wherein the cashier is not automatically signalled on fault and wherein the transmitter may be locked indefinitely if provisions were not arranged to prevent the same from occurring, relates to a case of trouble wherein the punch escapement fails to step the carriage of the punch on one or more instances. If this should occur then the punch carriage will not reach its forty-second column, since the escapement has failed to step the carriage one or more steps. If this should occur during the first setting operation of the carriage, then relay 804 is not energized since the springs 1112 are not closed, and the transmitter remains locked after transmitting the price codes because the line relay 508 is held energized and does not close the circuit to the start-stop magnet 631 by way of armature 543, armature 561, conductor 408, through the nineteenth bank contact of wiper 451, conductor 414, armatures 515 and 525, conductor 416, springs 454, and conductor 415, as previously described. Under these conditions the signal relay 802 is energized a sufficient length of time to operate the dash-pot relay 862 and light the lamp 851 to signal the attendant. The attendant operates the turn key 852 and plugs in to complete the talking circuit and to signal the cashier as previously described. The attendant advises the cashier to retransmit this sales transaction and then operates the key 853 to unlock the transmitter. This same trouble condition may also occur on the second setting operation of the punch carriage in a similar manner.

Bulk and yard goods

Referring now to the bulk and yard goods register shown in Figs. 28 to 32, inclusive, this register is somewhat similar to a ticket issuing machine and is provided in this system in order to give the customer a receipt with the date of sale, the quantity or amount, the total sales price and other printed indications, such as charge or cash if desired. The register is arranged to be easily connected to and from a transmitter at a sales floor by means of the bulk and yard goods jack which terminates all the circuit connections. The register is therefore plugged into the transmitter on the sales floor where bulk and yard goods transactions take place. Since the number of yards varies in accordance with the demand for each customer, or the number of articles sold by bulk also varies, special merchandise cards, such as card 46', shown in Fig. 16, are provided for insertion into the transmitter for yard or bulk goods. Because of the varied amounts purchased by the customers and the varying total price, the yard or bulk goods articles have a special card with only a certain number of perforations. For instance, a bolt of goods will have attached thereto a yard-goods tag which will be perforated in code in accordance with the class of goods, the department number, and the serial number of this particular bolt of goods. The price positions in the card are not perforated as the levers of the bulk and yard goods register are to be set in accordance with the amount and total sales price. The card 46' has a hole perforated to permit a pin 38 of the transmitter to engage the card check pin 111 which closes circuits to enable the register and transmitter to determine when a bulk or yard goods transaction takes place.

General operation

During a bulk or yard goods transaction the register is operated as follows:—All of the quantity and price levers are positioned on the proper digits and are held in operated position by a detent after which the handle is pulled forward and is also held in operated position by a latch. A locking bar locks the levers in operated position to prevent any further movement of the levers after the transmitter cover is closed. In response to the operation of the handle other bars are positioned to prepare for the printing operations and paper feeding operations which take place on the release of the handle.

On a completed transaction the handle unlock magnet is operated and releases the latch to permit the restoration of the handle. The lever lock magnet is deenergized to release the lever locking bar. When the handle restores the paper is printed in accordance with the set levers, the paper tape is fed out and printed with the date of sale, and the lever detents are temporarily removed to enable the levers to restore to their normal positions.

On an incompleted transaction the release magnet is operated from a pulse of current from the transmitter and prevents the printing operations and paper feed operation when the handle unlock magnet is operated by the release magnet.

Having briefly described the operation of the bulk and yard goods register a detail description of the mechanism and operations will now be given.

Mechanical description

Referring now to Figs. 29 to 32 in detail, the register has an outer cover 1901 having slots through which the levers 1913 to 1920, inclusive, may be moved. A handle 1902 is provided on the right hand side of the cover 1901 and an error key for controlling springs 1922 is shown on the top of the cover. Each of the levers is loosely mounted on the shaft 1905. Each lever such as lever 1919 shown in Fig. 29, has a gear wheel such as 1904 secured thereto for moving a type sector rack, such as rack 1903. When a lever, for instance say lever 1919, is moved forward or to the right in Fig. 29 the lever 1919 and gear wheel 1904 are rotated on the shaft 1905 to cause the rack 1903 to move to the right. Each rack 1903 has slotted openings 1906 through which the guide rods 1907 permit movement to the right. Individual to each rack and lever is a print sector 1908 having teeth on its upper section to mesh with the teeth of its individual rack 1903 and type numerals on its lower section for printing purposes. Each print sector 1908 is rotatably mounted on shaft 1909 and rotates whenever the rack 1903 is moved to position certain type numerals above the print hammers 1980. To the left of the gear wheel 1904 is shown a geared sector 1910 which meshes with the teeth of the gear wheel 1904 to rotate a pair of wipers, such as wiper 1801. The sector 1910 is individual to the lever 1919 and is rotatably mounted on the shaft 1911. The handle 1902 and lever lock magnet 1912 are shown in operated position for convenience and must be in normal position before any of the levers can be positioned. When magnet 1912 is in normal position armature 1934 is not attracted and therefore the bars 1935' will be moved to the right to pivot the bell crank lever 1926 in order to withdraw the locking bar 1925 from engagement with the teeth of gear wheel 1904. Each gear wheel is provided with a detent 1927 which engages its teeth but does not prevent the manual operation of the levers as does the locking bar. The detent 1927 is spring actuated and pivoted at point 1929 so that when the wheel 1904 is rotated the detent rides over the gears and maintains the levers in the position operated. All of the detent levers 1928 are arranged to remove their detents from the teeth of their associated gear wheels when the detent rod 1934 is momentarily raised by the detent pawl 1942 when the handle is being restored to normal. With the handle 1902 in normal position the following operations take place when any lever is moved to the right. For example when lever 1919 is moved opposite the numeral 8 on the cover 1901 the gear wheel 1904 rotates in a clockwise direction to rotate the wipers 1801 and 1802 from normal position into engagement with the next to the last set of bank contacts. The rotation of gear wheel 1904 moves the rack 1903 to the right to rotate the print sector 1908 so that the numeral 8 is directly above the print hammer 1980. The detent 1927 has been sliding in and out between the teeth of wheel 1904 during this movement and now comes to rest between the teeth to hold the lever, wipers, and print sector in operated positions.

When the handle 1902 is moved from normal position springs 1924 close and springs 1923 open as shown in Fig. 29. When the transmitter cover is closed the lever lock magnet 1912 is energized and operates its armature 1934 and bars 1935' to rotate levers 1926 so that the locking bar 1925 engages the teeth of all gear wheels 1904 thereby locking further operation of the levers. The latch 1965 also engages notch 1966 to lock the handle in operated position. Bar 1945 is pivotally mounted on cam 1939 and rotates the arms 1976 and 1975 on the pivot 1977 to raise the printing pawls 1972 preparatory to the printing operation.

When the printing pawls 1972 are raised the print rod 1973 (which is secured to bars 1974 rotatably mounted at their upper ends) and bars 1971 move to the right to lower the print hammers 1980 and arms 1979. This movement causes the toggle arms 1969 and 1970 to move from alinement into the position shown in Fig. 29. The quantity and amount printing mechanism is now set preparatory to printing.

Bar 1947 is also rotatably mounted on cam 1939 and causes the rotation of the date print roll stop cam 1948 on its pivot 1949 when the handle 1902 is operated. The roller 1950 rotates on top of the cam 1948 and causes the date print catch 1946 to rotate and disengage from the date print stop cam 1956 as shown in Fig. 31.

Bar 1946 is also rotatably mounted on cam 1939 and operates the pawl arm 1951 to position the pawl 1952 on top of the ratchet guard plate 1987, as shown in Fig. 31.

The foregoing mechanical operations have all taken place in response to the operation of the levers and the handle to their respective operated positions.

*Release and printing operations*

When the transaction is completed the handle unlock magnet 1961 operates its armature 1962 and bar 1963 to cause the latch 1965 to disengage from the notch 1966 of the cam 1939 to allow the handle 1902 and cam 1939 to restore. Lever lock magnet 1912 is now deenergized and by means of its armature 1934 and bars 1935 rotates the arms 1926 so that the locking bar 1925 is disengaged from the teeth of the gear wheels 1904. The notches in the detent pawls 1942 momentarily engage the rod 1934 to raise all the detent arms 1928 so that all the detents 1927 are disengaged from their gear wheels 1904 near the end of the restoring movement of the handle 1902 and cam 1939. The handle 1902 is provided with a strong restoring spring and dash-pot (not shown) which allows the handle to restore fairly slow. Lever springs individual to each type sector rack now automatically restore the levers to their normal positions. Further movement of the cam 1939 to the left causes the notch in detent pawl 1942 to disengage from the rod 1934 thereby permitting the detents 1927 to again engage the teeth in their respective gear wheels 1904 so that the levers may be held in operated position when so positioned on a succeeding transaction.

The first operation performed in response to the release of the handle 1902 is the quantity and price hunting operation. As soon as the cam 1939 starts on its restoring movement the bar 1945 rotates the arms 1976 and 1975 on the pivot 1977 to cause the printing pawl 1972 to move the rod 1973 to the left thereby also moving the arm 1971 to the left so that the toggle arms 1969 and 1970 now straighten out and raise the print hammers 1980 and arms 1979. Since this operation takes place before the restoration of the levers, the operation of the print hammers 1980 causes the tape to be printed with the numerals in accordance with the set print sectors 1908.

Immediately after this printing operation the pawl 1952, (Fig. 31), is operated by arm 1951 and bar 1946 attached to cam 1939, to slide off the guard 1979 and engage the ratchet wheel 1988. Further operation of the cam 1939 now causes the rotation of ratchet wheel 1988 and the rotation of gear wheel 1986 which is mounted on the same shaft as ratchet wheel 1988, (Figs. 31 and 32).

The teeth of wheel 1986 meshes with the gear 1985 to drive the tape feed roll 1933 and the date print roll 1936 by means of the gears 1984 and 1983, and the friction clutch comprising the fiber washers 1998, the steel washers 1996, and the rubber washer 1997. In response to this operation the tape is now moved out of the opening in the cover 1902 as shown in Fig. 29. The rotation of the date print roll 1936 causes the inking roller 1941 to ink the preset date in the print roll 1936 and to print the preset date on the tape. An ink roll 1932 supplies the inking roll 1941 with the ink. It should possibly be mentioned that this date printing is applied to the tape on a portion that will be given to a customer on a subsequent sales transaction and that the preceeding operation of the print date roll on the preceeding sales transaction has printed the date on the ticket to be given to the customer for this transaction. When the cam 1939 has restored a predetermined distance, the date print stop cam 1948, which is rotated by the bar 1947 on cam 1939, is rotated far enough to allow the roller 1950 to drop into the curved cut-away portion to rotate the catch 1964 so that it engages the print roll stop cam 1956 to stop further rotation of the print roll 1936 and feed roll 1933 thereby insuring that the date is always printed on the correct part of the tape. The friction clutch is also effective to prevent further movement of the tape even though the gear wheel 1985 may continue to operate.

The tape has now been printed with the quantity, the sales price, and the date and is manually torn off by means of the knife edge 1982 and given to the customer as a receipt for this transaction.

It should possibly be mentioned that the date wheel 1936 is arranged to be easily removed that at the start of each day the type may be changed accordingly. This arrangement comprises a lever arm provided with a finger bracket 1944 for use in removing the date roll from the register.

1992 is a spring actuated pressure arm for holding the print roll 1936 in proper operating position with respect to the feed roll 1933. The ribbon 1981 shown in Fig. 29 is fed between the print sectors and the print hammers in a manner similar to the ribbon feed used in typewriters.

The foregoing operations have all taken place in response to the completion of a bulk and yard goods sales transaction. The operation is slightly different for an incompleted transaction. In an incompleted sale the levers and handle are set in the same manner as previously described but since the transaction is not completed the release magnet 1960 instead of handle unlock magnet 1961 will be operated. Release magnet 1960 operates its armature 1958 to operate bars 1957 and 1959. The operation of bar 1957 causes the rotation of the arms 1954 on pivot 1955 so that the rod 1953 engages all of the printing pawls 1972 to thereby cause such pawls to disengage from the rod 1973. The subsequent operation of the printing pawls 1972, since they are now disengaged from the rod 1973, do not now operate the toggle arms 1969 and 1970 and therefore no printing takes place. The operation of the bar 1959 rotates the guard plate 1987 so that the pawl 1952 does not engage with the ratchet wheel 1987 when the handle 1902 subsequently restores.

The operation of release magnet 1960 also closes a circuit for operating the handle unlock magnet 1961 which now operates the latch 1965 to allow the handle 1902 to restore in the same manner as previously described with the exception that no printing or tape feeding operations take place.

An error key is provided for enabling the cashier to reset the levers in case she has incorrectly set them. The operation of the error key is only effective, however, in case the transmitter cover is not closed and locked. In case the cashier wishes to reset the levers before the transmitter is closed and locked she will operate the error key which closes a circuit to energize the release magnet 1960. The operation of the release magnet 1960 restores the levers and handle without printing, as previously described.

Referring now in detail to Fig. 28, the bulk and yard goods jack terminal is shown near the center of the drawing. Jack terminals in this drawing corresponding to the jack terminals shown in Fig. 14 have the same reference numerals and since the terminals have been rearranged in the drawing the conductors of Fig. 14 are also shown connected to these terminals to aid in understanding the circuits. To the right of the jack terminals are shown the sixteen sets of bank contacts and the wipers 1801 and 1816 which are controlled by the levers 1913 to 1920 of the register. The wipers are shown in their normal positions which correspond to the normal or restored position of the levers. The first two sets of bank contacts indicated QT are accessible to wipers 1801 and 1902 and correspond to the tens quantity lever 1919. In a similar manner QU corresponds to the units quantity lever, QF to fraction quantities, lever HD to hundred dollars price lever, TD to the ten dollars price lever, US to the units dollar price lever, TC to the ten cent lever, and UC to the units cent lever. All of the bank sets controlled by any lever are multiplied in the manner shown in detail in the upper and lower bank sets QT and UC, respectively. In the upper bank set QT the upper row of banks are multiplied together and connected to conductor 1871 which terminates in the bulk and yard goods jack terminal 25 which is connected via cable 457 to the nineteenth bank contact accessible to wiper 445 of switch S (Fig. 14). Similarly the third row of banks are multipled together and connected to conductor 1872 which terminates in the bulk and yard goods jack terminal 29 which is connected via cable 456 to the nineteenth bank contact accessible to wiper 447. The second and third rows of banks are connected in the manner shown to terminals 24, 11, 12, 13, 14 and 28, and to cable 404, the conductors of which terminate in the cam springs of the transmitting distributor.

To the left of the jack terminals are shown the circuit connections of the lever-lock release and handle unlock magnets, the error key, contacts 1923 and 1924 controlled by the handle and the relay group comprising relays 1820, 1830 and 1840. Whenever the bulk and yard goods register is connected to a transmitter the jumpers 461 to 464, inclusive, and their multiple connections are removed.

It will now be assumed that a sales clerk has sold three and one-half yards of goods to a customer and that the sales price is one dollar a yard. The clerk will remove the yard goods card from the bolt of goods and will give this card and her own to the cashier who will place the yard goods card, the clerk's card and her own card, if a cash sale, in the transmitter. Since the clerk has sold three and one-half yards the tens quantity lever 1919 is operated to its zero position, the units quantity lever 1920 is operated to its #3 position and the fraction quantity lever 1918 is operated to its #5 position. The hundreds dollar lever and the tens dollar lever are operated to their zero positions, the units dollar lever is operated to its #3 position, the tens cent lever is operated to its #50 position, and the units cent lever is operated to its zero position. In response to the positioning of the levers the wipers 1801, 1802, 1807, 1808, 1809, 1810, 1815, and 1816 have been positioned on their #0 banks, wipers 1803, 1804, 1811 and 1812 have been positioned on their #3 banks, and wipers 1805, 1806, 1813 and 1814 have been positioned on their #5 banks. The handle 1902 is now operated and locked in operated position as previously described. Handle off-normal springs 1924 close and handle off-normal springs 1923 open when the handle is moved off-normal.

In case the cashier has made an error in operating the levers she may remedy this error only before the transmitter cover is closed by the operation of the error key and by the resetting of the levers to their proper positions. In response to the operation of the error key springs 1922 close a circuit for energizing release magnet 1960 from ground by way of springs 1922, armature 1831 and through the winding of release magnet 1960 to battery. Release magnet 1960 operates to restore the handle without printing or advancing the tape by closing the circuit for the handle unlock magnet at armature 1861 as previously described. Handle off-normal springs 1924 maintain the circuit to the release magnet 1960 closed by way of armature 1862 when the error key is released until the handle is restored to its normal position.

Assuming now that all the levers are correctly positioned, that the handle is operated and that all the cards are properly placed in the transmitter, the cashier will then close the transmitter cover down on the cards. The card check pin 116, pin 113 or 114 dependent upon a charge or cash sale, and pin 111 instead of pin 110 are now closed in the same manner as previously described. A circuit for energizing relay 502 in Fig. 15 may now be traced as follows: from grounded start springs 65, Fig. 14, pin 116, metal conductor 37, pin 111, conductor 460, jack terminal 15, conductor 1828 (Fig. 28), armature 1849, jack terminal 35, conductor 402, armatures 549 and 558, and through the winding of relay 502 to battery. A branch of this circuit extends from armature 1847 through the winding of hold relay 1830 to battery. Relay 1830 at armature 1831 opens the circuit extending to the error key so that the operation of this key is ineffective whenever the transmitter cover is closed and at armature 1832 closes the circuit for energizing lever lock magnet 1912 to lock the levers and wipers in operated positions. Card check relay 511 is energized over conductors 405 or 406 dependent upon whether the sale is a charge or a cash sale as previously described, only in case all of the levers and the handle of the register are in off-normal positions. In case any one lever or the handle of the register should be in normal position the card check relay 511 is short circuited as follows: from ground by way of pin 111, conductor 460, terminal 15, through the handle off-normal springs 1923 or through any of the odd numbered wipers 1801 to 1815 in normal position connecting conductors 1817 and 1818 together to terminal 16, conductor 403 to the middle terminals of both windings of relay 511. Since the card check relay 511 is short circuited and does not energize, no circuit is completed for the hold magnet 66 with the result that the transmitter cover does not close and lock. This indicates to the cashier that the handle or some lever has not been operated or that the cards have not been properly inserted. When the error is corrected the cover is again closed and relays 502 and 511 energize. The hold magnet 66, the recording relay 510 or authorizing relay 509, and the plunger line relay 601 now energize as previously described. The circuit description from here on is the same as that described for either a cash or charge sale, as the case may be, and need not, therefore, be described here.

The transmitter transmits the cashier's or customer's number, the clerk's number, and two space codes as previously described, after which the wipers of switch S (Fig. 14) are in their thirteenth position ready to transmit the price of the article sold. As will be seen there are no price perforations in the bulk and yard goods card 46' and therefore the marking of the price code is taken from the banks of register comprising wipers 1807 to 1816, inclusive, which have marked the code price on their banks in accordance with the operated price levers. Since the price for the three and one-half yards of goods sold is $3.50 wipers 1807 and 1808 are in engagement with their zero bank contacts with the result that the conductors 4 and 6 of cable 404 are grounded as follows: from grounded conductor 407 to wipers 445 and 447 and the thirteenth bank contact engaged by said wipers, one of the conductors in cable 430 and one of the conductors in cable 431, jack terminal 1 and jack terminal 6, conductors 1877 and 1878 to the multipled bank contacts accessible to wipers 1807 and 1808 in zero position; through wiper 1807, and zero bank contact to jack terminal 13 which is connected to #4 conductor in cable 404 and through wiper 1807, zero bank contact to jack terminal 28 which is connected to #6 conductor in cable 404. The transmitting distributor, since the #4 and #6 conductors of cable 404 are grounded, now transmits the code 4—6 for the digit "0" after which the wipers of the switch S advance to their fourteenth position in the same manner as previously described.

In a similar manner the codes of the remaining price digits are transmitted by the transmitting distributor in accordance with the setting of the register price wipers 1809 to 1816, inclusive.

After transmitting the last digit of the sales price the punch steps to its thirtieth position as previously described. The wipers of the switch S are also stepped to position 19 as previously described and in positions 19 to 21, inclusive, cause the transmission of the codes indicating the amount or quantity of goods sold. In this case since only three and one half yards are sold then wipers 1801 and 1802 are in their zero position, wipers 1803 and 1804 in their #3 position, and wipers 1805 and 1806 in their #5 position. With the wipers of switch S in their nineteenth positions, the following circuit is closed for transmitting the code of digit "0": from grounded conductor 407, wipers 445 and 447 in engagement with their nineteenth bank contacts, one conductor of cable 457 and one conductor of cable 456, jack terminals 25 and 29, conductors 1871 and 1872 to the multipled bank contacts accessible to wipers 1801 and 1802; through wiper 1801 and zero bank contact to jack terminal 13 which is connected to #4 conductor in cable 404 and through wiper 1802 and zero bank contact to jack terminal 28 which is connected to #6 conductor in cable 404. In the same manner as previously described the transmitting distributor now sends the codes of the quantity digits which are 0—3—5 as determined by the setting of wipers 1801 to 1806, inclusive.

After transmitting the codes of the quantity digits the wipers of the switch S advance to their twenty-second position when the perforations in the bulk and yard goods card control the transmission of the remaining coded digits as previously described.

After transmitting the last coded digit in position 31 of switch S the trunk line conductor 581 is opened, as previously described, and line relay 508 deenergizes to deenergize hold relay 506. Responsive to the deenergization of relay 506, a circuit for energizing release relay 1820 may be traced as follows: from grounded conductor 427, armature 573, normally closed springs controlled by armature 544, armature 533, armature 517 and its working contact, armatures 522, 551, 562, 537 and 526, conductor 401, jack terminal 33, armature 1850 and its resting contact, and through the lower winding of release relay 1820 to battery. At armature 1821 relay 1820 closes an obvious circuit for operating the handle unlock magnet 1961, at armature 1822 closes a locking circuit through its upper winding from grounded handle off normal springs 1924, at armature 1823 prepares a circuit for release magnet 91, at armature 1824 closes an energizing circuit through the upper winding of relay 1840, and at armature 1825 opens a point in the circuit extending to the print magnet 82 in the transmitter. Handle unlock magnet 1961 upon energizing releases the handle to cause the quantity and price digits to be printed on the tape, advances the tape and prints the date as previously described. Relay 1840, upon energizing, at armature 1847 opens a point in the circuit to release magnet 1960, at armature 1848 completes a circuit for energizing the release magnet 91 of the transmitter from grounded armature 1823 by way of jack terminal 17 and conductor 428, and at armature 1849 disconnects the grounded conductor 460, terminating in jack 15 from hold relay 1830 and from conductor 402. The disconnection of ground from conductor 402 and the operation of the release magnet 91 causes the restoration of the transmitter cover and associated relays in the same manner as previously described with the exception that the print magnet 82 is not operated since its circuit was opened by relay 1820 at armature 1825. Relay 1830 deenergizes and opens the circuit to lever lock magnet 1912 which now deenergizes to remove the locking bar 1925 so that the levers may be restored. When the handle is fully restored off-normal springs 1924 open and off normal springs 1923 close. When springs 1924 open the locking circuit of relay 1820 is opened and said relay deenergizes. At armature 1823 relay 1820 opens the circuit to the release magnet 91 of the transmitter and said magnet deenergizes, and at armature 1824 opens the circuit of relay 1840 which deenergizes after an interval. All of the circuits and equipment of the register and transmitter are now in normal position and may be used on subsequent transactions.

Having described the operation of the register on a completed sales transaction a description will now be given of an incompleted bulk and yard goods sales transaction which may be caused by fault or by the credit clerk rejecting the sale. As previously described it will be remembered that on faulty transmission and check-back relays 502 and 506 deenergize and relay 504 energizes to signal the cashier and that the cashier then removes the telephone handset from the cradle to prepare the circuit for the release magnet 91 and when the attendant operates the push key 853 the line relay 508 deenergizes to complete the circuit for the release magnet 91. In a similar manner on a rejected charge sale it will be remembered that the credit clerk operates the call back key and relays 502 and 506 deenergize when signal relay 504 energizes thereby preparing the circuit for release magnet 91, when the cashier removes the handset from the cradle. When the credit clerk operates the reject key line relay 508 deenergizes to complete the circuit to release magnet 91. This circuit may be traced as follows:—from grounded conductor 427, armature 573, normally closed springs controlled by armature 544, armature 533, armature 517 and its resting contact, cradle springs 579, conductor 428, to the winding of release magnet 91 to battery. A branch of this circuit extends over conductor 428 to jack terminal 17 and by way of armature 1847 and through the winding of release magnet 1960 for energizing the release magnet 1960. At armature 1862 magnet 1960 completes a locking circuit for itself from grounded handle off-normal springs 1924 and at armature 1861 completes a circuit for operating the handle unlock magnet 1961. When the transmitter cover opens in response to the operation of the release magnet 91 relay 1830 deenergizes to unlock the levers as previously described. The operation of the release magnet 1960 prevents the advance of the tape and the printing operations as previously described when the handle unlock magnet 1961 is operated to restore the handle and levers to their normal positions. When the handle is fully restored springs 1924 open the locking circuit of magnet 1960 which now deenergizes and restores magnet 1961. The register is now in normal position and may be used on subsequent transactions, it being understood that the transmitter had released as previously described in response to the operation of the release magnet 91.

Having described the operation of the register during a bulk and yard goods sales transaction a description will now be given of its operation when an article sale is made or when a merchandise card, such as 46, is used. Since the merchandise card is completely perforated with all the required data none of the levers of the register need be positioned. The circuits are so arranged that the transmitter cover will not lock if any lever should be in an off normal position. In case any lever should be off normal the circuit for energizing relay 502 is not completed since the conductor 402 is therefore not grounded as will be seen from the following. When the transmitter cover is closed in this sale conductor 459 is grounded by card-check pin 110 instead of conductor 460. A circuit may now be traced from grounded conductor 459, jack terminal 34, conductor 1819, through the chain circuit comprising the normal positions and the even numbered wipers 1802 to 1816, inclusive, conductor 1826, and through the lower winding of relay 1840 to battery. Relay 1840 energizes and at armature 1841, 1842 and 1843 connects the jack terminal 28 to jack terminals 29, 30, and 31, thereby completing connections the same as if jumper 463 (Fig. 14) had not been removed. In a similar manner relay 1840 at armatures 1844, 1845 and 1846 connects the jack terminal 24 to jacks 25, 26, and 27, thereby completing connections the same as if jumper 464 had not been removed. At armature 1847 relay 1840 opens the circuit to release magnet 1960, at armature 1849 completes a circuit for energizing relay 1803 and its working contact, and grounds conductor 402 for energizing relay 502 and disconnects conductor 1828 at its resting contact, and at armature 1850 and its working contact connects jack terminal 33 by way of armature 1825 to jack terminal 32 the same as jumper 461 to prepare a circuit for the print magnet 82. Relay 1830 upon operating at armature 1831 opens the circuit to the error key and at armature 1832 closes the circuit for energizing lever lock magnet 1912. The lever lock magnet 1912 operates the locking bar 1925 to prevent the operation of any lever so that all the levers are locked in their normal positions. The transmitter transmits and releases in the same manner as previously described. When the transmitter cover opens ground is disconnected from conductor 459 with the result that relay 1840 deenergizes after an interval and opens the circuit of magnet 1912 which likewise deenergizes to unlock the levers. The bulk and yard goods register and the transmitter are now in their normal positions and may be used on subsequent calls.

On bulk sales the operation is the same as above described with the exception that the quantity levers 1918, 1919 and 1920 are operated in accordance with the number of bulk articles sold.

Having described the invention, what is considered new and is desired to have protected by Letters Patent will be set forth in the following claims:

1. In an electrical operated recording system for merchandising stores wherein articles of merchandise are recorded at the time of sale, means for electrically transmitting a plurality of series of code pulses from a sales floor to a recording position identifying a sales transaction, means responsive to the transmission of one series of code pulses for receiving and for retransmitting said series back to said sales floor with the pulses of the retransmitted code being concurrent with the pulses of the transmitted code, means responsive to the receipt of the retransmitted code for automatically causing the transmission of a second of said series of code pulses, and checking means at said sales floor operative only in case of a disagreement between the transmitted and retransmitted codes.

2. In an electrical operated recording system for merchandising stores wherein articles of merchandise are recorded at the time of sale, means for electrically transmitting code pulses from a sales floor to a recording position identifying a sales transaction, means responsive thereto for receiving and for retransmitting each code back to said sales floor with the pulses of the retransmitted codes being concurrent with the pulses of the transmitted codes, checking means at said sales floor operative only in case of a disagreement between the transmitted and retransmitted codes, and means for stopping further transmission of codes responsive to the operation of said checking means.

3. In an electrically operated authorizing system for merchandising stores wherein articles of merchandise are charged to customers at the time of sale, means for electrically transmitting indications from a sales floor to a credit department identifying a sales transaction, means for automatically and electrically checking the transmitted indications concurrent with such transmission, and means for automatically stopping further transmission of said indications as soon as any transmitted indication fails to check properly.

4. In a code transmitting system, a code receiving device operated concurrently with each code transmitted thereto for translating each code, a recorder operated concurrently with each transmitted code in response to and in accordance with each translated code, and checking means concurrently operated during each transmitted code and jointly controlled by the operation of said device and the operation of said recorder in response to each transmitted and translated code for checking the correct operation of said recorder.

5. In a transmitting system, a transmitting station and a receiving station, means for transmitting a code of pulses from the transmitting station to the receiving station, means in the receiving station responsive to said transmitted code for retransmitting said code back to the transmitting station for checking the same, said last means also translating said code into a different code and delivering the translated code to a recorder to operate the same, and means for stopping the transmission of a succeeding code from the transmitting station in case the resultant operation of said recorder disagrees with said transmitted code.

6. In a transmitting system, transmitting means for transmitting a plurality of codes from a transmitting point, a code receiving and retransmitting device operated in response to each code transmitted for concurrently retransmitting each such code back to the transmitting point for checking purposes and for translating each said transmitted code, a recorder operated in response to each translated code, a first checking means at the transmitting point operated in case any retransmitted code disagrees with the corresponding transmitted code, a second checking means in said device operated in case any recorded operation disagrees with the corresponding transmitted and translated code, and means responsive to the operation of either checking means for stopping further transmission of said codes.

7. The combination of a relay group and punch controlling magnets, of means for operating the relays in said group in various combinations, circuits controlled by said relays when operated in certain combinations for operating certain of said punch magnets in accordance therewith, and checking means jointly controlled by the operated relay combinations and the operated magnets for checking the correct operation of said magnets.

8. In an automatic accounting system, a marking machine having a carriage provided with a first normal position, a second normal position, operating positions, a restoring position, and a first and a second group of magnets, automatic means for connecting said first group magnets for use, means for automatically operating said first group magnets over said connections to operate said carriage step-by-step from its first normal position through its succeeding operating positions until said carriage reaches its restoring position, automatic means responsive to said carriage reaching its restoring position for automatically returning said carriage to its second normal position, circuit connecting means automatically operated responsive to said carriage being restored to its second normal position for disconnecting said first group magnets and for connecting said second group magnets for use, automatic means for thereafter automatically operating said second group magnets to operate said carriage step-by-step from its second normal position through its succeeding operating positions until said carriage again reaches its restoring position, said carriage restoring means again automatically operated responsive to the carriage reaching said restoring position for returning said carriage to its first normal position, and means for automatically releasing said circuit connecting means to disconnect said second group magnets.

9. In an accounting system wherein articles of merchandise are purchased on credit or with cash, authorizing trunks for use when articles are purchased on credit, authorizing switches having access to said authorizing trunks, recording trunks for use when articles are purchased with cash, recording switches having access to said recording trunks, transmitters having means for transmitting sales data over said trunks, and means common to said transmitters for distinguishing between a credit sale and a cash sale and for operating one of said authorizing switches to connect the transmitter with an idle authorizing trunk in case the transmitter is taken into use on a credit sale or for operating one of said recording switches to connect the transmitter wit han idle recording trunk in case the transmitter is taken for use on a cash sale.

10. In an accounting system wherein articles of merchandise are purchased on credit or with cash, authorizing trunks for use when articles are purchased on credit, authorizing switches having access to said authorizing trunks, recording trunks for use when articles are purchased with cash, recording switches having access to said recording trunks, transmitters having means for transmitting sales data over said trunks, means common to said transmitters for distinguishing between a credit sale and a cash sale and for operating one of said authorizing switches to connect the transmitter with an idle authorizing trunk in case the transmitter is taken into use in a credit sale or for operating one of said recording switches to connect the transmitter with an idle recording trunk in case the transmitter is taken into use on a cash sale, means for approving the sale in case it is a credit sale, and means responsive to said approval for reoperating said common means to operate one of said recording switches to connect the transmitter with an idle recording trunk.

11. In a transmitting system, a transmitting position, a transmitting device at said position, locking means in said device operated responsive to the closure of said device to its closed position for automatically locking said device in its closed position, a switch room, means responsive to the closure of said device for automatically operating said device to transmit predetermined data through the switchroom to a remote point, means for automatically unlocking said device to permit it to open in response to the completion of its transmitting operations, said device remaining locked in closed position in case said device fails to complete its transmitting operations, means for automatically notifying the attendant at the switchroom in case said device fails to complete its transmitting operations, and means jointly controlled by the switchroom attendant and the person at the transmitting position for unlocking said device.

12. In a transmitting system, a transmitting position, a transmitting device at said position, locking means in said device operated responsive to the closure of said device to its closed position for automatically locking said device in its closed position, a switch room, means responsive to the closure of said device for automatically operating said device to transmit predetermined data through the switchroom to a remote point, means for automatically unlocking said device to permit it to open in response to the completion of its transmitting operations, said device remaining locked in closed position in case said device fails to complete its transmitting operations, means for automatically notifying the attendant at the switchroom in case said device fails to complete its transmitting operations, means jointly controlled by the switchroom attendant and the person at the transmitting position for unlocking said device, and means controlled by the attendant at the switchroom for completing a talking circuit to said transmitting position.

13. In an accounting system wherein data identifying articles of merchandise purchased by customers is electrically transmitted from various sales positions and recorded at a central records room at the time of sale, trunks over which said data is transmitted during a sales transaction, communicating instrumentalities at each sales position and each trunk normally ineffective for communicating purposes, and means operative, in case of trouble during a sales transaction, for rendering the communicating instrumentalities, at the sales position which is transmitting this sales transaction, and the trunk which is being used, effective for communicating purposes between the cashier at this sales position and the central records room attendant.

14. In an accounting system wherein data identifying articles of merchandise purchased by customers is electrically transmitted from various sales positions and recorded at a central records room at the time of sale, trunks over which said data is transmitted during a sales transaction, communicating instrumentalities at each sales position and each trunk normally ineffective for communicating purposes, signalling means associated with each trunk, means responsive to faulty transmission or other trouble during a sales transaction for operating said signalling means to signal an attendant, and means controlled by said attendant for rendering only the communicating instrumentalities at the sales position transmitting this sales transaction and the trunk in use effective for communicating purposes between the sales floor and the attendant.

15. In an accounting system wherein data identifying articles of merchandise charged by customers is electrically transmitted from various sales positions and recorded at recording positions in a records room at the time of sale, trunks over which said data is transmitted during sales transactions; communicating instrumentalities individual to each sales position, individual to each recording position and individual to each trunk normally ineffective for communicating purposes; means for rendering the communicating instrumentalities at the sales positions and at the recording positions effective for communicating purposes between credit clerks and the cashier at the sales positions, and means for rendering the communication instrumentalities at the sales positions and at said trunks effective for communicating purposes between the cashier at the sales positions and a switch room attendant.

16. In a transmitter comprising three units, the first of said units including a circuit closing device having means for simultaneously preparing a plurality of circuits in accordance with prearranged data markings and a step-by-step switch for successively closing said prepared circuits, the second of said units including a start-stop distributor having means for transmitting codes in accordance with said successively closed circuits and said data markings, the third of said units including a relay group having means for controlling said step-by-step switch and said start-stop distributor, and jack mounted circuit connections connecting said three units together whereby any one of said units may be readily and easily disassociated from the other units for repair or replacement.

17. In a start-stop distributor, the combination of sets of transmitting springs and corresponding sets of receiving springs, of a plurality of cams on a rotatable shaft, each cam operating a set of transmitting springs and its corresponding set of receiving springs on a single rotation of said cam shaft, said transmitting springs permanently positioned with respect to said cams to fix the time said cams close said transmitting springs, and means for adjusting said sets of receiving springs as a unit with respect to said cams to vary the time said cams close said receiving springs.

18. In a start-stop distributor, the combination of sets of transmitting springs and corresponding sets of recording springs, of a plurality of cams on a rotatable cam shaft, each cam operating a set of transmitting springs and its corresponding set of receiving springs on a single rotation of said cam shaft, said transmitting springs permanently positioned with respect to said cams to fix the time said cams close said transmitting springs, means for adjusting said sets of receiving springs as a unit with respect to said cams to vary the time said cams close said receiving springs, and some of said sets of receiving springs being operated concurrently with the operation of some of said sets of transmitting springs during a single rotation of said cam shaft.

19. In a start-stop distributor the combination of sets of transmitting springs, corresponding receiving springs, a single cam shaft, a driving shaft, a motor for rotating said driving shaft, a start-stop magnet, a start-stop cam on said cam shaft, a friction clutch controlled by said start-stop magnet and said start-stop cam operatively associating and disassociating said driving shaft with said cam shaft to rotate said cam shaft whenever said magnet is operated, and a set of circuit closing cams on said cam shaft, each of said cams operating a set of transmitting springs and its corresponding set of receiving springs at different predetermined time intervals during a single rotation of said cam shaft.

20. In an accounting system, markings associated with merchandise for sale for identifying such merchandise, a transmitter, a device associated with said transmitter, levers in said device operated from their normal positions to different operated positions in a sales transaction in accordance with the quantity and the total sales price of the merchandise sold, circuit closing means operated by said levers to corresponding circuit closing positions to provide markings corresponding to the quantity and sales price of the merchandise sold, and means controlled by both said markings in response to the closure of said transmitter for automatically transmitting data corresponding to both said markings to identify the merchandise, the quantity and the total sales price.

21. In an accounting system, markings associated with merchandise for sale for identifying such merchandise, a transmitter, a device associated with said transmitter, levers in said device operated from their normal positions to different operated positions in a sales transaction in accordance with the quantity and the total sales price of the merchandise sold, circuit closing means operated by said levers to corresponding circuit closing positions to provide markings corresponding to the quantity and sales price of the merchandise sold, means controlled by both said markings in response to the closure of said transmitter for automatically transmitting data corresponding to both said markings to identify the merchandise, the quantity and the total sales price, type numerals positioned by said operated levers in accordance with the quantity and sales price of said merchandise, and means for automatically operating said device after transmission to issue a ticket printed with the quantity and the sales price of the merchandise sold.

22. In an accounting system, markings associated with merchandise for sale for identifying such merchandise, a transmitter, a device associated with said transmitter, levers in said device operated from their normal positions to different operated positions in a sales transaction in accordance with the quantity and the total sales price of the merchandise sold, circuit closing means operated by said levers to corresponding circuit closing positions to provide markings corresponding to the quantity and sales price of the merchandise sold, means controlled by both said markings in response to the closure of said transmitter for automatically transmitting data corresponding to both said markings to identify the merchandise, the quantity and the total sales price, type numerals positioned by said operated levers in accordance with the quantity and sales price of said merchandise, means for automatically operating said device after transmission to issue a ticket printed with the quantity and the sales price of the merchandise sold, and means operative in case of a fault or trouble for preventing the printing operation and the issuing of a ticket.

23. In an accounting system, a transmitter for transmitting sales data when locked in operated position, a device comprising a plurality of operable levers associated with said transmitter, each of said levers being operable from normal position to a plurality of different positions for indicating different data, and locking means in said transmitter operated only in case all said levers have been moved from their normal positions in response to the closure of said transmitter to lock said transmitter in operated position.

24. In an accounting system, a transmitter for transmitting sales data when locked in operated position, a device comprising a plurality of operable levers associated with said transmitter, each of said levers being operable from normal position to a plurality of different positions for indicating different data, locking means in said transmitter operated only in case all said levers have been moved from their normal positions in response to the closure of said transmitter to lock said transmitter in operated position, and means in said device operated responsive to the locking of said transmitter for locking said levers in their operated position.

25. In an accounting system, a transmitter for transmitting sales data when locked in operated position, a device comprising a plurality of operable levers associated with said transmitter, each of said levers being operable from normal position to a plurality of different positions for indicating different data, and locking means in said transmitter operated only in case all of said levers are in their normal positions in response to the closure of said transmitter to lock the transmitter in operated position.

26. In a device for recording and registering data, levers each manually operable from normal position to one of a plurality of different positions in accordance with different data, a print sector and circuit closing members individual to each lever, means for setting each sector and circuit closing member in positions corresponding to the data positions occupied by the operated levers, different data circuits completed by the operated circuit closing members in accordance with their occupied positions for registering the data, means for printing a ticket in accordance with the positions occupied by said sectors to record the data, and means for thereafter issuing the ticket.

27. In a registering and printing device, the combination of a plurality of electrical terminals on which numerical data is registered, means including sets of marking selectors for selecting and marking said terminals in combinations, a printing sector for each set of marking selectors and each sector having numerical type for printing numerical data on a ticket, means for differently positioning each set of marking selectors to always select and mark an equal plurality of terminals for each and every digit from 0 to 9, inclusive, and to select and mark differing combinations of said terminals by the different positioning thereof in accordance with the different digits, and means for differently positioning each printing sector to select the numeral type of the digit corresponding to the positioning of its corresponding set of marking selectors.

28. In a registering device, a plurality of electrical terminals on which numerical data is registered, means including sets of marking selectors for selecting and marking said terminals in combinations, and means for differently positioning each set of marking selectors to always select and mark an equal plurality of terminals for each and every digit from 0 to 9, inclusive, and to select and mark differing combinations of said terminals by the different positioning thereof in accordance with the different digits.

29. In a code transmitting system, means for automatically transmitting coded pulses, means for automatically and electrically checking each code of pulses concurrent with such transmission, and means for automatically stopping further transmission of coded pulses as soon as any transmitted code of pulses fails to check properly.

30. The combination of a relay group and a plurality of devices, of means for operating the relays in said group in various combinations, circuits controlled by said relays when operated in certain combinations for operating certain of said devices in accordance therewith, and checking means jointly controlled by the operated relay combinations and the operated devices for checking the correct operation of said devices.

31. The combination of a relay group and controlling magnets, of means for operating a plurality of said relays in different combinations, circuits controlled by said relays when operated in certain combinations for operating a plurality of said magnets in accordance with each such combination, other circuits controlled by said relays when operated in certain other combinations for operating only a single one of said magnets for each such other combination, and checking means jointly controlled by the operated relay combinations and the operated magnet or magnets for checking the correct operation of said magnets.

32. In a recording system, a machine having a carriage, means for automatically operating said carriage step by step from its initial position, carriage off-normal springs closed after the first step of said carriage, carriage restoring springs closed by said carriage after taking a predetermined number of steps, means automatically operated responsive to the closure of said restoring springs for only partially restoring said carriage until said off-normal springs open, automatic means responsive to the partial restoration of said carriage for again automatically operating said carriage in a second stepping operation to again close said off-normal springs and said restoring springs, and means automatically operated to fully restore said carriage to its initial position in response to only the second operation of said restoring springs.

33. In an automatic accounting system, a marking machine having a carriage provided with a normal position, an auxiliary normal position, and operating positions, marking means and a first and a second group of mark selecting means in said machine, means for automatically operating said carriage to operate and lock certain of said first group mark selecting means, said carriage moved step by step from its normal position through succeeding operating positions to select succeeding sub-groups of said mark selecting means until said carriage reaches a predetermined operating position, automatic means responsive to said carriage reaching said predetermined position for restoring said carriage to its auxiliary normal position without restoring any locked mark selecting means, automatic means responsive to said carriage reaching its auxiliary normal position for automatically operating said carriage to operate and lock certain of said second group mark selecting means, said carriage moved step by step from its auxiliary normal position through succeeding operating positions to select succeeding sub-groups of said mark selecting means until said carriage again reaches its predetermined position, and automatic means responsive to said carriage again reaching its predetermined position for operating the marking means selected by the operated and locked mark selecting means and for thereafter restoring all the locked mark selecting means by restoring said carriage to its normal position.

34. In a transmitting system, a first position, a second position, a transmitter at the first position, a recorder at the second position, a trunk comprising only two conductors for operatively connecting said transmitter to said recorder when the transmitter is taken into use, means including said transmitter for electrically transmitting coded data indications over only one of said conductors to said recorder, means for retransmitting back to said transmitter the said coded data over only the other of said conductors for checking purposes, a talking circuit including both said two conductors in series, and means for completing said talking circuit between said sales and recording positions.

35. In an electrically operated recording system for merchandising stores, transmitting positions at the sales floors and recording positions at the recording department in the store, a transmitting device including a transmitter and a start-stop distributor at each transmitting position, a receiving device including a recorder and a start-stop distributor at each recording position, means for automatically connecting a transmitting device with any one of said recording devices when a transmitting position is taken into use at the time of sale of an article of merchandise, means including said transmitter and distributor at the transmitting position for transmitting codes each comprising a plurality of pulses to the recording position identifying this particular sales transaction, means including said recorder and distributor at said recording position for recording the transmitted codes, and for retransmitting said codes back to the transmitting position, and checking means at said transmitting position operated only in case the transmitted codes disagree with the retransmitted codes.

36. In a transmitting system, a transmitting station, a receiving station, a pair of conductors connecting said transmitting station to said receiving station, means in said transmitting station for transmitting a code of pulses from the transmitting station to said receiving station over only one of said conductors, means at the receiving station responsive to said transmitted code for retransmitting said code back to the transmitting station over only the other of said conductors with the pulses of the retransmitted code being concurrent with the pulses of the transmitted code, and checking means at the transmitting station operative only in case of a disagreement between the transmitted and retransmitted codes.

37. In a transmitting system, a transmitting station, a recording position, an authorizing position, means including a pair of conductors for connecting said transmitting station to either said recording position or said authorizing position, means in said transmitting station for transmitting a code of pulses from the transmitting station to said recording position over only the first of said conductors if connected thereto or for transmitting a code of pulses from the transmitting station to said authorizing position over only the second of said conductors if connected thereto, means at the recording position responsive to said transmitted code for retransmitting said code back to the transmitting station over only the second of said conductors, means at the authorizing position responsive to said transmitted code for retransmitting said code back to the transmitting station over only the first of said conductors, and checking means at the transmitting station operative only in case of a disagreement between the transmitted and retransmitted codes.

38. The combination of a relay group and punch controlling magnets, of means for operating the relays in said group in various combinations, circuits controlled by said relays when operated in certain combinations for operating certain of said punch magnets in accordance therewith, a differential relay having two windings, a circuit for one winding of said relay completed by said operated relay combinations, a second circuit completed for the other winding of said relay by said operated punch magnets, an alarm, and means controlled by said relay for operating said alarm in case only one of said windings is operated alone.

39. In an automatic accounting system, a punching machine having a first and a second group of magnets, automatic means for connecting said first group magnets for use, means for automatically operating said first group magnets over said connections to operate said machine step-by-step, means for automatically restoring said machine, for disconnecting said first group magnets and for connecting said second group magnets for use, and means for thereafter automatically operating said second group magnets over said last connections to again operate said machine step-by-step.

40. In a transmitting system, a transmitting position, a transmitter at said position, a recorder, a trunk for connecting said transmitter to said recorder when the transmitter is taken into use, means including said transmitter for electrically transmitting coded data indications over said trunk to said recorder to operate said recorder, communicating instrumentalities at said position and said trunk normally ineffective for communicating purposes, and means operative only in case of transmission trouble or recording trouble for rendering said communicating instrumentalities effective for talking purposes over said trunk.

HAROLD C. ROBINSON.
LEITH JOHNSTON.